US006604998B1

(12) United States Patent
Singer et al.

(10) Patent No.: US 6,604,998 B1
(45) Date of Patent: Aug. 12, 2003

(54) MODIFIED POKER SYSTEM WITH COMBINATION OF MULTIPLE GAMES USING AT LEAST SOME COMMON CARDS AND METHOD OF PLAYING THE SAME

(75) Inventors: Anthony M. Singer, Ringwood, NJ (US); Howard M. Marks, Westport, CT (US)

(73) Assignee: PTT, LLC, White Plains, NY (US)

( * ) Notice: Subject to any disclaimer, the term of this patent is extended or adjusted under 35 U.S.C. 154(b) by 300 days.

(21) Appl. No.: 09/613,727

(22) Filed: Jul. 11, 2000

Related U.S. Application Data

(60) Provisional application No. 60/164,583, filed on Nov. 10, 1999.

(51) Int. Cl.[7] ........................ A63F 13/00; A63F 17/00; G06F 17/00

(52) U.S. Cl. ........................................... 463/13; 463/22

(58) Field of Search ................................ 463/1, 11–13, 463/19–22, 25, 30–31, 37, 40–42; 273/138–139, 273–274, 271, 292–293, 461

(56) References Cited

U.S. PATENT DOCUMENTS 4,071,247 A * 1/1978 Breslow ..................... 273/308
4,743,022 A 5/1988 Wood
4,948,134 A 8/1990 Suttle et al.
5,013,049 A 5/1991 Tomaszewski
5,100,137 A 3/1992 Fulton
5,118,109 A 6/1992 Gumina
5,163,131 A 11/1992 Row et al.
5,255,915 A 10/1993 Miller
5,294,128 A 3/1994 Marquez
5,314,194 A 5/1994 Wolf
5,382,025 A 1/1995 Sklansky et al.
5,407,199 A 4/1995 Gumina
5,415,404 A 5/1995 Joshi et al.
5,431,407 A 7/1995 Hofberg et al.
5,437,451 A 8/1995 Fulton
5,653,635 A * 8/1997 Breeding ..................... 463/11
5,882,259 A 3/1999 Holmes, Jr. et al.
6,007,424 A * 12/1999 Evers et al. .................. 463/13
6,176,781 B1 * 1/2001 Walker et al. ................ 463/13
6,179,293 B1 * 1/2001 Hedman ..................... 273/292
6,299,170 B1 * 10/2001 Yoseloff ..................... 273/292

OTHER PUBLICATIONS

Boxer, A. 1995. "Where Buses Cannot Go." IEEE Spectrum, pp. 41–45.
Barroso, L.A. et al. 1995. "RPM: A Rapid Prototyping Engine for Multiprocessor Systems." IEEE, pp. 26–34.

* cited by examiner

*Primary Examiner*—Kim Nguyen

(57) ABSTRACT

A video poker game system and method includes dealing a card to a player for placement into one position of a hand having a predetermined number of positions. The player then arranges the dealt card in one position of the hand with an object of obtaining a hand having cards placed in a predetermined order. These steps are repeated until all of the predetermined number of positions in the player's hand are filled with dealt cards. A first payout is awarded to the player if the dealt cards of the hand are arranged in the predetermined order. In addition, a second payout is awarded to the player if the dealt cards of the hand constitute a payable hand as determined according to a winning hand payout schedule. The system and method also allow the player to optionally play a number of other games of the game which may result in additional payouts.

94 Claims, 46 Drawing Sheets

MODIFIED POKER SYSTEM WITH COMBINATION OF MULTIPLE GAMES USING AT LEAST SOME COMMON CARDS AND METHOD OF PLAYING THE SAME

RELATED APPLICATION

This application claims priority from U.S. Provisional Application No. 60/164,583, filed Nov. 10, 1999, incorporated herein by reference.

TECHNICAL FIELD

The present invention relates generally to modified poker card games, and more into particularly, to a method, an apparatus, and a computer readable medium storing computer-executable instructions for playing a combination of modified poker games, in a local and/or global network environment.

BACKGROUND ART

The state gaming control boards of Nevada and New Jersey (which have traditionally been slow to approve any new games or gambling concepts) have changed their philosophy so dramatically that, today, they actively encourage the trial and acceptance of new games and gambling concepts. The problem with introducing new games has always been the basic criteria for mass-market gambling:

- Game rules must be easy to learn.
- Strategies must be easy to master and not favor "the expert" disproportionately.
- Games must have a short duration between the start (the bet) and the finish (the payoff).
- The payoff structure, that is, what can be won by a lucky player, must be enticing.
- The game must be fair; the casino should not have an unreasonable advantage.
- The game must be "secure, " that is, protected from cheating and tampering.
- The casino's "win" must be demonstrated to be worthwhile, that is, the "win per machine per month" must at least compare favorably to that of the "slots. "

Over the years, there have been many different types of games that have attempted to satisfy the demands of the gaming industry. These games have ranged the gamut from those involving great mental prowess to games involving merely chance. Obviously, a strong interest lies in games that create real excitement.

One such game is poker, a mainstay in the gambling world. Traditional five or seven card poker often uses the following rank order of winning hands from highest to lowest: royal flush, straight flush, four of a kind, full house, flush, straight, three of a kind, two pair, and "Jacks or better. " Typically, one or more players are each dealt a poker hand by one player who acts as the dealer. The player with the highest hand according to the established rank order wins.

"STUD" poker, one variation of five card poker, provides each player with five cards, forming a hand. If the players are separately playing against the dealer, naturally, each player attempts to beat the dealer or to obtain one of a predetermined collection of winning hands, such as those in the above-mentioned rank order. Often, a payoff for a given winning hand is inversely proportional to the probability of attaining that hand.

One disadvantage of "STUD" poker is that a player must single-handedly ascertain each and every possible winning card combination and its associated payoff. To the novice poker player, this myriad of winning combinations can seem intimidating and even overwhelming, and, to the detriment of the game owner, serve to discourage beginning players from playing.

Perhaps an even greater disadvantage of "STUD" poker is that a player has no opportunity to improve on a hand that has been dealt. As such, the outcome of a "STUD" poker game is based only on the initially dealt hand. Absolutely no control or decision making is required on the part of the player. Hence, a "STUD" poker player is often left with the helpless feeling that the outcome of the game depends only upon luck.

"DRAW" poker, on the other hand, permits a player to make a single discard, whereby one or more of the cards selected by the player are replaced by the dealer. A discard provides an opportunity for the player to increase the value of his hand. Typically, only one discard per round is permitted. Plainly, "DRAW" poker increases the probability of obtaining a winning hand. To offset the probability of an improved hand and the better chances of winning, often the dealer reduces the payoff for any such winning hand by a constant amount.

However, like "STUD" poker, a disadvantage of "DRAW" poker is that the player must single-handedly ascertain each and every possible winning card combination and its associated payoff. Thus, although a "DRAW" poker player is afforded an opportunity to exercise some control over the fate of the game, the complexity and large number of winning combinations is oftentimes enough to drive a beginning player away from the game, thus adversely affecting a game owner's business.

Also, conventional "DRAW" poker does not provide the benefit of awarding multiple payouts for a single hand. The effects of this drawback become apparent in the case of an exceptional poker hand, for example, four aces. In this instance, it would be advantageous to present a player with the opportunity to win multiple high-return payouts for obtaining this relatively rare hand. However, in conventional "DRAW" poker, a player has the opportunity to be rewarded only once, namely, after the draw, for achieving this exceptional hand.

Another disadvantage associated with conventional "DRAW" poker is its lack of incentive to pursue rare hands. To illustrate, on an initial deal of a 3, 4, 5, 6, and 10, the player is one card, namely a 7, short of a straight flush. On the draw, one strategy available to the player is to replace the 10 in hopes of completing the straight flush and receiving its relatively high payout. On the other hand, the player may wish to "play it safe" and replace multiple cards in hopes of receiving a lesser but more common hand, say a pair of 10's, in an attempt to return at least a portion of the ante. However, in conventional "DRAW" poker, a player may pursue only one of the two options. That is, the player is limited to pursuing either the rare hand and its exceptional payout or the common hand and its relatively smaller payout. The strategy of pursuing a rare hand while still maintaining an opportunity to return at least a portion of the ante is simply not an option in conventional "DRAW" poker.

Recently, electronic video poker gaming devices have been developed, placing traditional "STUD" poker and "DRAW" poker in an exciting multimedia environment. Various attempts have been made to enhance play of poker in the new environment over the years. Examples of such attempts are described in the following U.S. patent references, all of which are hereby incorporated by reference:

U.S. Pat. No. 4,743,022; Wood
U.S. Pat. No. 4,948,134; Suttle et al.
U.S. Pat. No. 5,013,049; Tomaszewski
U.S. Pat. No. 5,100,137; Fulton
U.S. Pat. No. 5,118,109; Gumina
U.S. Pat. No. 5,255,915; Miller
U.S. Pat. No. 5,294,128; Marquez
U.S. Pat. No. 5,314,194; Wolf
U.S. Pat. No. 5,382,025; Sklansky et al.
U.S. Pat. No. 5,407,199; Gumina
U.S. Pat. No. 5,415,404; Joshi et al.
U.S. Pat. No. 5,431,407; Hofberg et al.
U.S. Pat. No. 5,437,451; Fulton
U.S. Pat. No. 15,882,259; Holmes, Jr.

Yet, these attempts suffer from flaws similar to those of traditional poker games. That is, heretofore, the gaming environment has frustrated poker players. Seemingly frequent losing hands, and, in turn, seemingly frequent lost wagers, detract from the optimal gaming environment. Worse still, depending on the type of poker, players have little or no control over the eventual outcome of a hand.

For example, U.S. Pat. No. 5,882,259 discloses a method of playing a variation of an electronic video poker game. This modified poker game basically modifies the traditional manner of playing electronic video draw poker by adding a payout based on the initial five card hand that is displayed to the player when the player activates a "Deal" button on the electronic gaming machine. Thus, the player plays a single game and has the opportunity to win an additional reward or payout. Specifically, the player is initially dealt a first hand of cards. With this first hand of cards, a first winning amount or extra payout is made according to whether the first hand of cards matches generally a single or limited predesignated hand or arrangement of cards. After awarding this first winning amount, if one is due, the game continues as a standard "DRAW" poker game. Namely, the player discards any number of cards in an attempt to obtain a winning poker hand or to improve an already winning poker hand. Subsequently, the discarded cards, if any, are replaced with replacement cards to form a second hand of cards. Then, this second hand of cards is compared with a standard or conventional "DRAW" poker payout schedule to determine the amount of any final payout. Thus, this patent provides combining the known games of draw poker in combination with a stud-like game used to match a single or limited predesignated arrangement of cards into a single game with multiple chances of winning.

Referring to FIG. 1, the '259 patent provides three or more 7s, at 10, as one example of a predesignated arrangement of cards required for receiving the first or extra payout. With this aptly named "Bonus Poker with 7s" variation, a player receives a first payout if the predetermined hand of three or more 7s are dealt in the first hand. After paying any extra payout, the game continues with the player discarding and subsequently replacing any cards to form a second or final hand of cards, which is used to award the conventional "DRAW" poker payout. Thus, if a player is initially dealt a first hand of three 7s, a 3, and an ace, the player would receive the first payout, in this case 30 coins for receiving a hand meeting the requirements of the predesignated arrangement, in this case, three 7s. Continuing with this illustration, if the player replaced the 3 and the ace with a 4 and a 5, resulting in a final hand of three 7s, a 4 and a 5, the player would receive a conventional "DRAW" poker payout for a three-of-a-kind.

Another example of the '259 game is described with reference to FIGS. 2–4. In this particular variation of the '259 game, the player chooses the five predesignated cards, as well as the order of the hand, required for receiving the extra payout. To win the extra payout in this variation, each of the five cards must be dealt with at least three of the cards being in the order selected by the player. As depicted in FIG. 2, the player selects the five predesignated cards 22 by touching a touch sensitive screen 20. In this case, the player has selected the king of hearts as the first card in the hand, the jack of clubs as the second, the 2 of clubs as the third, the 7 of hearts as the fourth, and the 6 of spades as the fifth and final card of the predesignated hand. Referring to FIG. 3, screen 35 depicts each of the possible winning hands. Thus, as an example, the player would win the payout shown at 34 for attaining any of the hands listed at 36.

Play then proceeds by dealing the player's first hand. As shown in FIG. 4, the dealt hand matches the predesignated cards not only in the cards selected but also in the order selected. Thus, the first or extra payout is awarded to the player. Afterwards, the game continues as a conventional "DRAW" poker game with a player discarding and replacing cards from the first hand to form a second hand, and subsequently awarding a payout based on the cards contained in the newly formed "DRAW" poker hand.

Referring back to FIG. 1, this variation of the '259 game also awards a lesser extra payout amount if the first hand contains each of the player's predesignated cards but has less than three cards in the order selected by the player. Thus, as shown in FIG. 1, although a dealt hand may have less than three cards in the order designated by the player, the payout shown at 12 is nevertheless awarded.

The '259 game fails to address the difficulties associated with traditional "STUD" and "DRAW" poker games. For example, because the '259 game merely adds an extra single hand or limited hand payout to a conventional "DRAW" poker game, the ultimate payout amount is still determined by a separate payout schedule, in addition to the "DRAW" poker payout schedules. Thus, a novice player is still faced with the formidable task of ascertaining the additional limited winning card combination and its associated payoff. Without an easy to learn component or aspect, it is conceivable that a beginning player may avoid the '259 game in favor of a simpler and easier to learn game.

In addition, little or no control or strategy is required to win the extra payout because the player merely selects the limited arrangement of cards to be matched, or even worse, has the cards determined in advance by the game owner. Outside of the draw and the selection of the predetermined cards, no interaction during the game is required on the part of the player. Without a dynamic and interactive component, this method strengthens the impression that the player has little or no control over the game's ultimate outcome. Furthermore, to the novice player, the owner-determined predesignated winning hands are in some cases just as difficult to remember and comprehend in combination with the conventional "DRAW" poker winning schedules.

Also, the '259 game provides no feature which rewards multiple payouts for a single exceptional hand and has no insurance aspect which encourages attempts to obtain these exceptional hands. Thus, as with standard "DRAW" poker, a player would rarely attempt to obtain an exceptional hand for fear of losing an opportunity to return a portion of his wager, and even if such an exceptional hand were to be obtained, the player would be limited to a single payout.

Furthermore, the '259 game is a single game that appears to allow only a single bet to be placed and is limited to only two payouts. Consequently, the '250 game lacks flexibility and does not result in as much excitement as games having more than two payouts.

Accordingly, it is desirable to provide an improved combination of modified poker games that creates a higher perceived sense of winning than conventional poker games. The player ought to feel that he or she is winning more often, through multiple winning opportunities, and that the runs of wins are extended relative to conventional poker games.

It is also desirable to provide an improved combination of modified poker games that enables the player to exhibit some control over at least a portion of the eventual outcome of the total payoffs in a round of poker. It would be even more desirable to award the payouts based on strategic choices of card placements and other interactions. Furthermore, it is desirable to provide an improved combination of modified poker games that incorporates games that are simple enough to attract the attention of novice players and yet also contain games that are sophisticated enough to maintain the interest of poker veterans.

Additionally, it is desirable to provide an improved combination of modified poker games that affords a player an opportunity to develop a strategy which may be used to reap the benefit of several relatively high payouts based on obtaining a single exceptional hand. Relatedly, it is also desirable to provide an improved combination of modified poker games which provides a player with the flexibility and with the encouragement or incentive to attempt to obtain such an exceptional hand through for instance allowing the player to bet on several games and by offering more than two payouts per play and where the multiple payouts do not involve inconsistent winning strategies.

SUMMARY OF THE INVENTION

It is a feature and an advantage of the present invention to provide an improved combination of modified poker games that creates a higher perceived sense of winning, through, for example, multiple winning opportunities than conventional poker games.

It is another feature and advantage of the present invention to provide an improved combination of modified poker games that enables the player to exhibit some control over at least a portion of the eventual outcome of the total payoffs in a round of poker, based on skillful choices of card placements.

It is another feature and advantage of the present invention to provide an improved combination of modified poker games that is simple enough to attract the attention of novice players and yet is sophisticated enough to maintain the interest of poker veterans.

It is another feature and advantage of the present invention to provide an improved combination of modified poker games which affords a player an opportunity to develop a substantially consistent strategy which may be used to reap multiple relatively high payouts based on a single exceptional hand.

It is another feature and advantage of the present invention to provide an improved combination of modified poker games which provides a player with the encouragement or incentive through, for example, a related side game, to attempt to obtain an exceptional hand.

To achieve the above and address other problems of the prior art, the present invention provides an improved and novel method, system, and computer readable medium storing computer executable instructions for playing a card game. In one embodiment, the present invention commences with dealing a card from at least one deck of cards to a player, for placement into one position of a card hand having a predetermined number of positions. The dealt card is then arranged, by the player, in only one position of the predetermined number of positions of the card hand responsive to an ordered ranking of one of lowest ranking to highest ranking and highest ranking to lowest ranking. These steps are repeated until all of the predetermined number of positions have been filled with the dealt cards. Subsequently, a first portion of a payout or a first payout is awarded to the player if the dealt cards of the card hand have been arranged in the ordered ranking. Similarly, a second portion of the payout or a second payout is awarded to the player if the dealt cards of the card hand comprise a predetermined combination of cards resulting in a payable hand as determined according to a winning hand payout schedule.

In another embodiment, the method, system, and computer readable medium storing computer executable instructions for playing a card game of the present invention commences also with dealing a card. The dealt card is then arranged in only one position in a card hand having a predetermined number of available positions. These steps are repeated until the predetermined number of available positions have been filled with the dealt cards. Next, at least one payout is awarded if the dealt cards in the positions have been arranged in at least one predetermined order.

In yet another embodiment, the method, system, and computer readable medium storing computer executable instructions for playing a card game of the present invention includes selecting a target card having at least one target characteristic. This embodiment continues with dealing a card having at least one card characteristic. The dealt card is subsequently arranged in only one position in a card hand having a predetermined number of available positions. These steps are repeated until the predetermined number of available positions have been filled with the dealt cards including the card dealt in the dealing step. At that time, a first payout is awarded if the dealt cards in the positions have been arranged in a predetermined order. In addition, a second payout is awarded if at least one card characteristic of at least one of the dealt cards matches the at least one target characteristic. Finally, a third payout is awarded if the dealt cards in the card hand meet predetermined criteria.

In still yet another embodiment, the method, system, and computer readable medium storing computer executable instructions for playing a card game of the present invention includes wagering on one or more of a first, second and third card games. The game then continues with selecting, if a wager was made on the first card game, a target card having at least one target characteristic. A card having at least one card characteristic is then dealt. The dealt card is arranged in only one position in a card hand having a predetermined number of available positions. These steps are repeated until the predetermined number of available positions have been filled with the dealt cards. A first payout is awarded if at least one card characteristic of at least one of the dealt cards matches the at least one target characteristic and if a wager was made on the first card game. The invention then awards a second payout if the dealt cards in the positions have been arranged in a predetermined order and if a wager was made on the second card game. A third payout is awarded if a wager was made on the second card game and if the dealt cards in the hand meet predetermined criteria. Next, the invention includes optionally discarding one or more cards of the hand if a wager was made on the third card game. From there, the invention includes replacing, if a wager was made on the third card game, any discarded cards with an equal number of replacement cards, wherein the replacement cards and the cards which were not discarded together constitute a second card hand of cards. Lastly, the invention includes awarding, if a wager was made on the third card game, a fourth payout if the cards in the second card hand of cards meet another predetermined criteria which optionally correspond to the first predetermined criteria.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects of the present invention will be evident to those of ordinary skill, particularly upon consideration of the following detailed description of the preferred embodiments.

NOTATIONS AND NOMENCLATURE

The detailed descriptions which follow may be presented in terms of program procedures executed on computing or processing systems such as, for example, a stand-alone gaming machine, a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

BEST MODE FOR CARRYING OUT THE INVENTION

Figure 1:
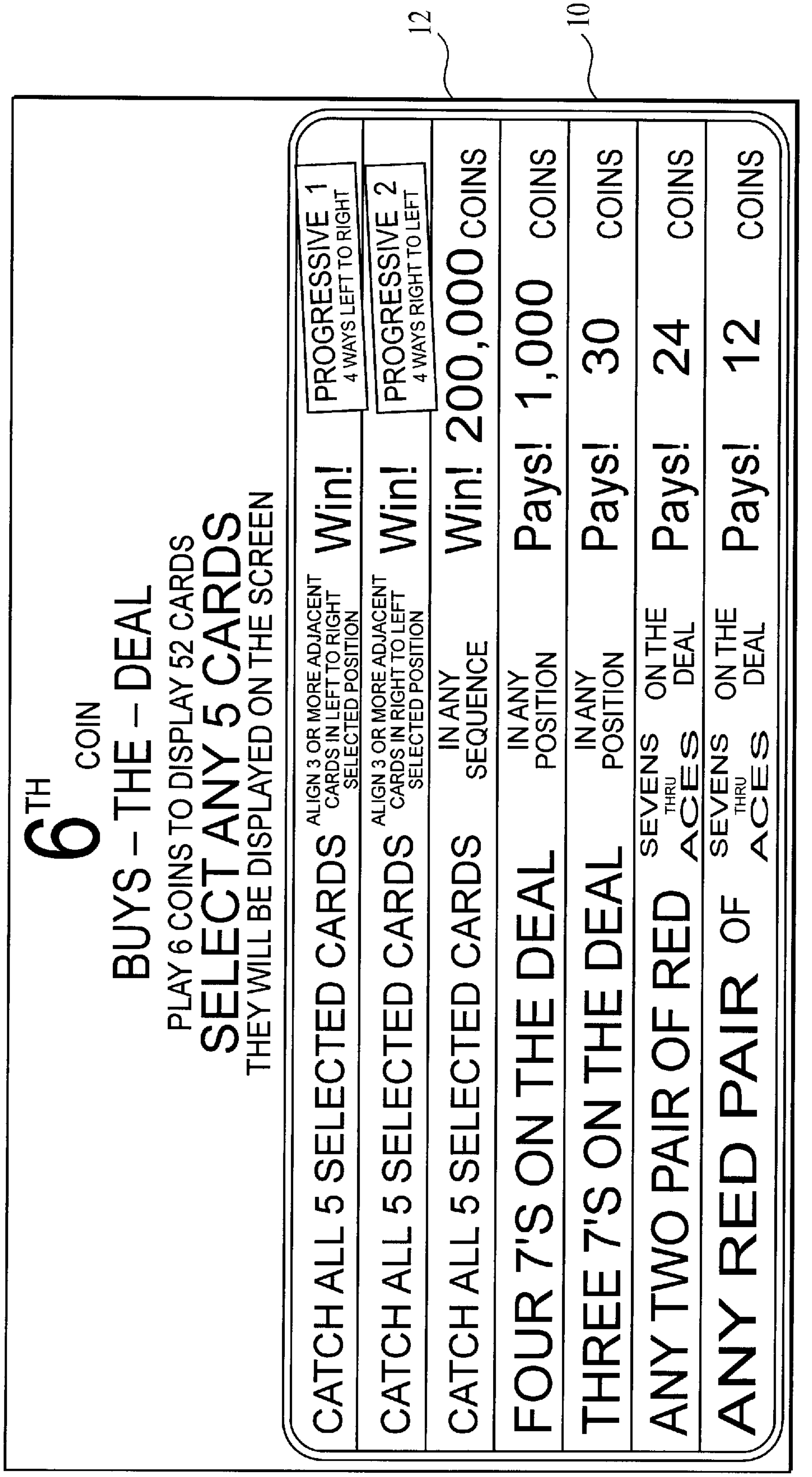
FIG. 1 PRIOR ART
FIGS. 1–4 illustrate a prior art modified poker game.
Figure 2:
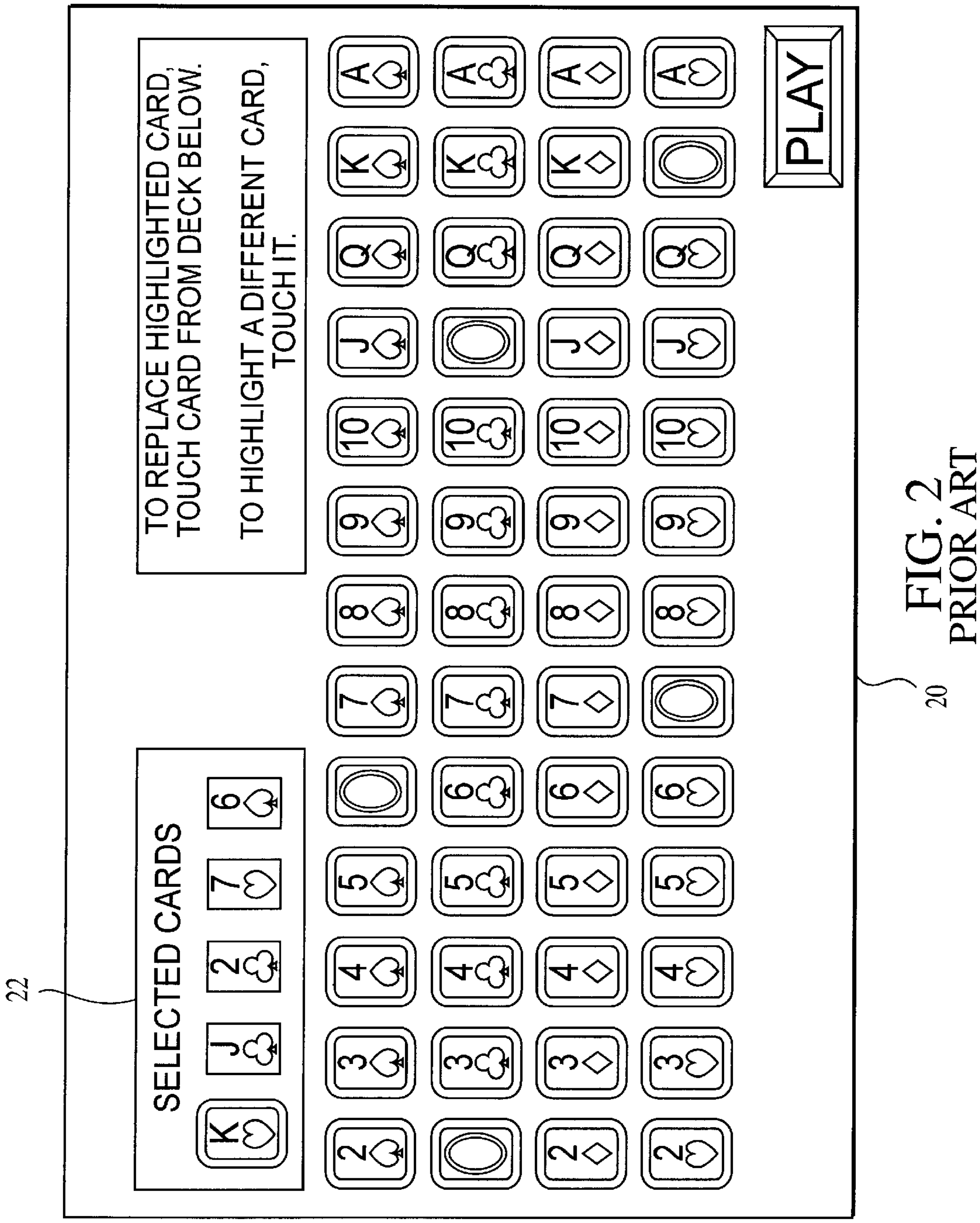
FIG. 2 PRIOR ART
Figure 3:
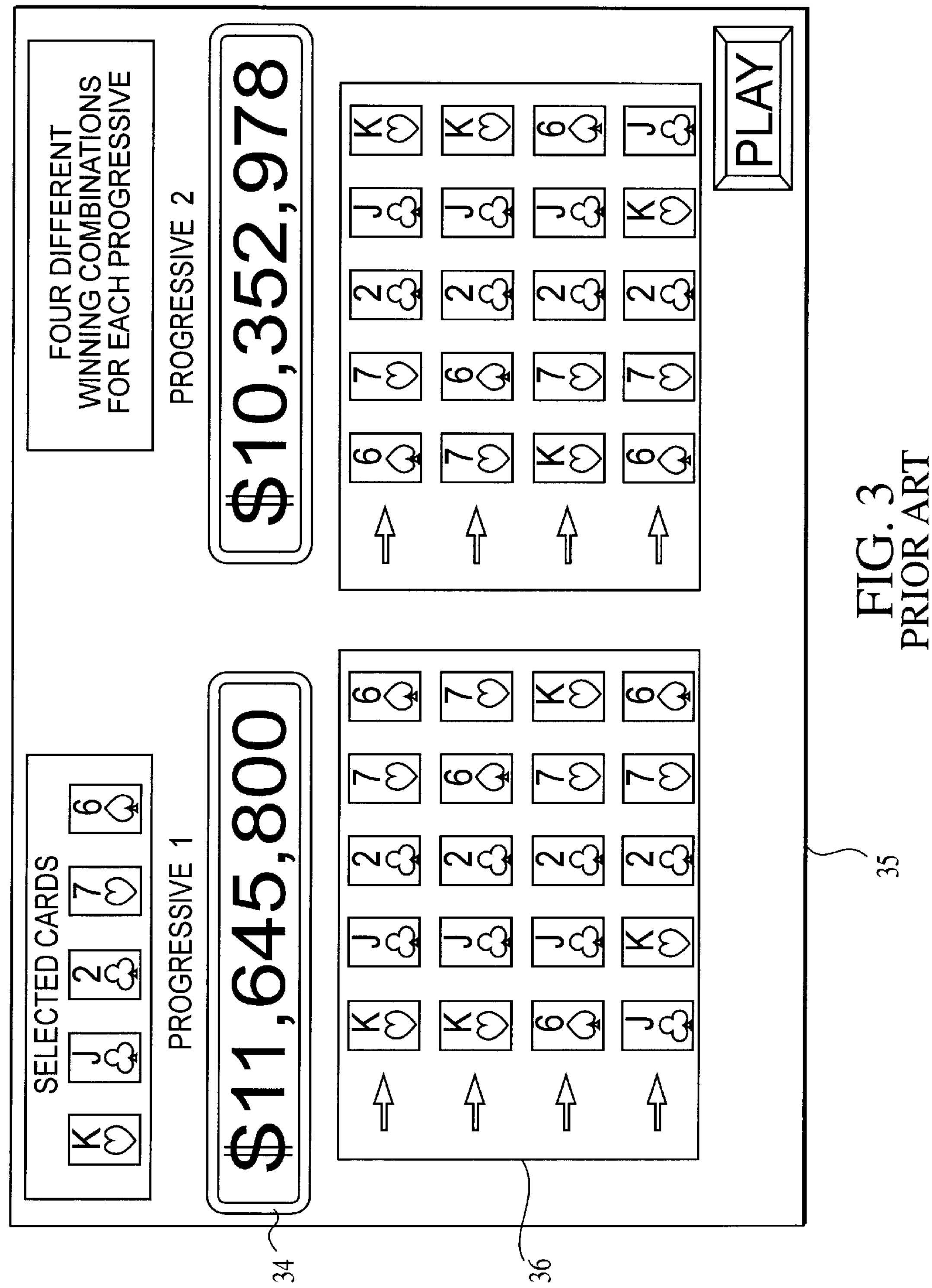
FIG. 3 PRIOR ART
Figure 4:
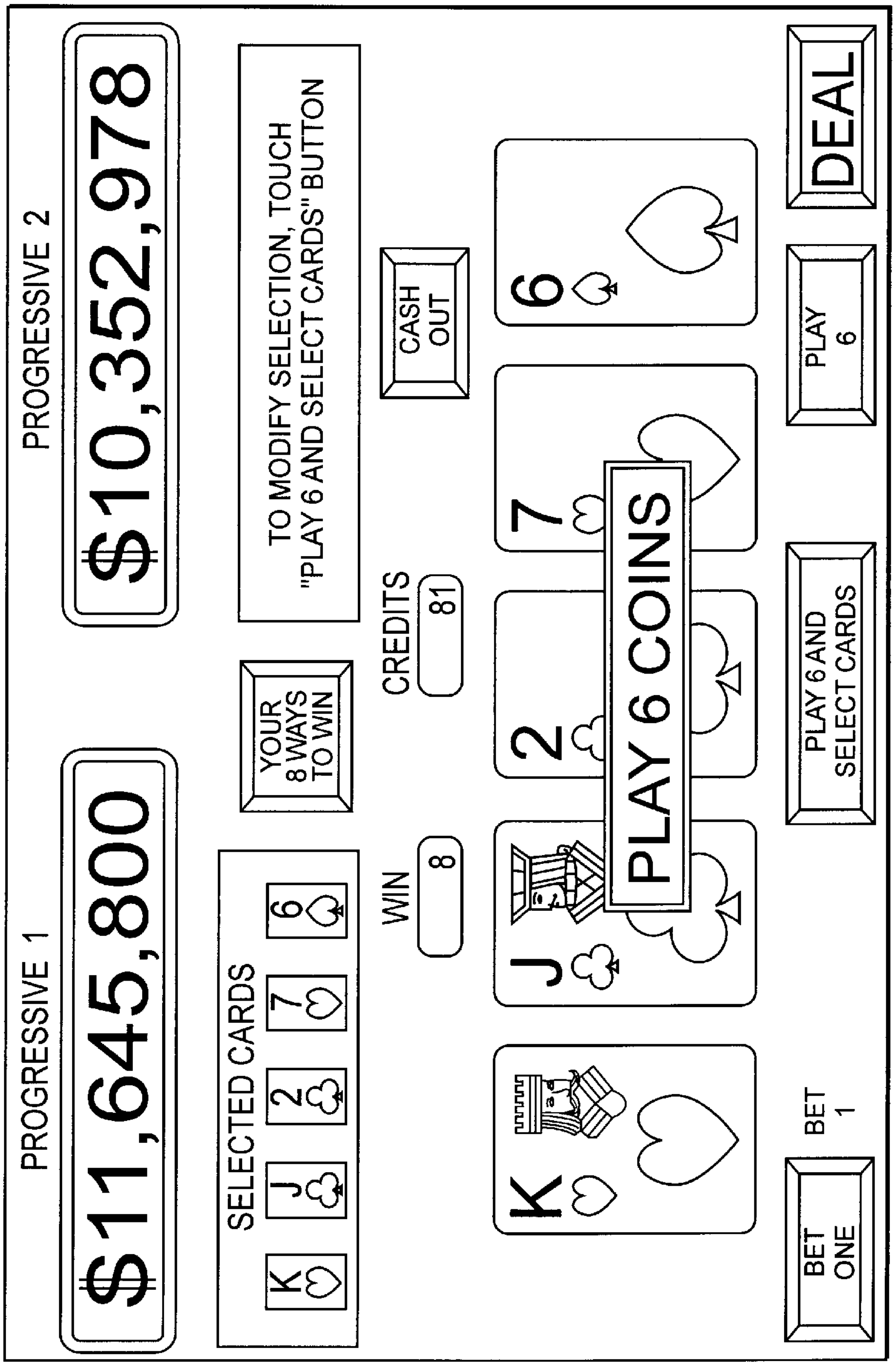
FIG. 4 PRIOR ART

The following describes the basic components and rules for playing a combination of modified poker games optionally implemented on a computer system. This combination of modified poker games creates a higher perceived sense of winning than conventional poker games through provision of, for example, multiple winning opportunities via multiple discrete games with optional discrete wagers for each game. In this regard, this combination of modified poker games offers a payout for a matching game, an ordering game, and a double bonus draw poker game, games that advantageously, according to the invention, do not have inconsistent game strategy.

To implement such a feature, a player selects or elects which games to be played simply by wagering on the desired games and by refraining from wagering on the undesired games. This combination of games or three way poker optionally includes the ability for the player to actively select one or more games to be connected or related together via one or more selection buttons, or other standard selection means. This combination of modified poker games additionally offers a dynamic and interactive play by enabling the player to exhibit control over at least a portion of the eventual outcome of the total payoffs based on skillful or strategic choices of card placements. Furthermore, whereas some of the games, such as for instance the matching game and/or the ordering game, are simple and exciting enough to attract the attention of novice players others, such as for instance the ordering game and/or double bonus draw poker, are also sophisticated enough to maintain the interest of poker veterans. These multiple games are combined or tied together through use of a single partial or complete dealt hand. As a result, the player has an opportunity to develop a strategy which may be used to reap multiple relatively high payouts on a single exceptional hand, for instance, first in the in-order round and then in the double bonus draw poker round. On a similar note, since multiple games may optionally be played, a player may be encouraged to attempt to obtain an exceptional hand in one game as a result of the insurance offered by the possibility of obtaining a return on at least a portion of the ante from the remaining games.

In accordance with the principles of the present invention, this combination of modified poker games basically includes several or two or more distinct games into a logical or natural sequence. In one embodiment, three individual games constitute or comprise the combination of modified poker games of the present invention: a matching game; an ordering game; and double bonus draw poker. In the matching game, the player selects a card as the "lucky card. " The player's hand is then dealt, and a payout is advantageously awarded if any of the characteristics of the dealt cards match the corresponding characteristics of the player's lucky or matching card. Variations on this basic theme include awarding payouts based on suit matches and/or matches based on rank. For instance, lesser payouts may be made by dealing three or more cards having the same suit as the matching card or by dealing one or more cards having the same rank. Examples of payouts for the matching card game are depicted at 1270 in FIG. 12*d*.

As to the second game, the ordering game basically awards a payout based on a combination of two distinct payout tables based on, for example, in one embodiment of the invention, a STUD poker five-card hand and a separate bonus if the cards in the hand are arranged according to a predetermined sequence optionally even if the player does not achieve a payable or winning hand for the STUD poker game. More specifically, as each card is dealt, the player places or arranges the card in one position in the hand representing a specific location or sequence. This procedure is repeated until the player's hand is complete. In most cases, the player's hand will be made up of five cards. In other variations, seven or any other number of cards may be used. In any event, after the player's hand is complete, the cards are compared with a winning schedule, for instance at 1280 in FIG. 12*e*, and a payout is made if the player has obtained a winning hand. Additionally, if the cards have been arranged in a particular sequence, in this case increasing rank sequence, the player is also awarded an in-order bonus. Examples of these in-order bonus payouts are also depicted in FIG. 12*e*. In this particular example, the predetermined sequence allows an Ace to be high or low (i.e., greater than a king or less than a 2) or optionally set as one of high or low and optionally allows cards having equal ranks to be placed adjacent to one another without "breaking the sequence" (e.g., identical ranks may be placed next to each other in a hand and still remain "in order"). Furthermore, although the above specifics are utilized in this particular embodiment, other variations are also possible. For instance, instead of using increasing rank order, a decreasing rank order may be used. Also, Aces may be held to a single value and wild cards may be included. Similarly, sequences dependent upon the suits (e.g., in-order and in a single suit) or upon the particulars of the ranks (e.g., in-order using only even numbered cards, etc. ) may also be implemented.

As to the third game in this embodiment/example, the player starts a game of, for example, standard double bonus draw poker by receiving a poker hand as per the discussion above or through some other similar process or the like. Play begins in this new game with the player selecting and discarding any, all, or none of the cards in the player's hand. As with standard draw poker, cards are discarded with an object of obtaining or improving a winning draw poker hand. After any discards are made, the player is dealt replacement cards to form a new second hand. Then, a payout is made for any winning hand based on a winning schedule, an example of which is depicted at 1290 in FIG. 12*f*.

Advantageously, any or all of these games may optionally be played in a single playing session based on player selection. That is, the game or games to be played are optionally selected by the player. In one embodiment, the player simply makes a wager on each game that he or she wishes to play. As one example, the player deposits a wager amount and divides this amount among each of the desired games. Thus, in this particular example, the player may insert (or simulate the insertion of) three dollars or credits into the slot of a system or gaming machine implementing the instant invention, and wager one dollar on each game, thereby allowing the player to play each game. Similarly, the player may insert three dollars and wager all three dollars on the matching game and refrain from playing the in-order and double bonus draw poker games. Another alternative is that the player specifies different denominations for each game to be played ahead of time, or alternatively designates credits to each game as each game progresses. Thus, the present invention contemplates in accordance with one embodiment, the feature of allowing the player to individually select specific games to play and/or wager.

In accordance with one aspect of the invention, by combining these games, the instant invention furthers several of the objects of the present invention. In particular, by winning in the matching game, the player would receive the insurance of being assured of returning at least a portion of his or her ante or wager. Hence, with that knowledge, namely knowing that at least a portion of his or her wager is being returned, a player may be more likely to attempt to obtain a relatively rare hand during, for example, the double bonus draw poker phase of the game.

Figure 5A:
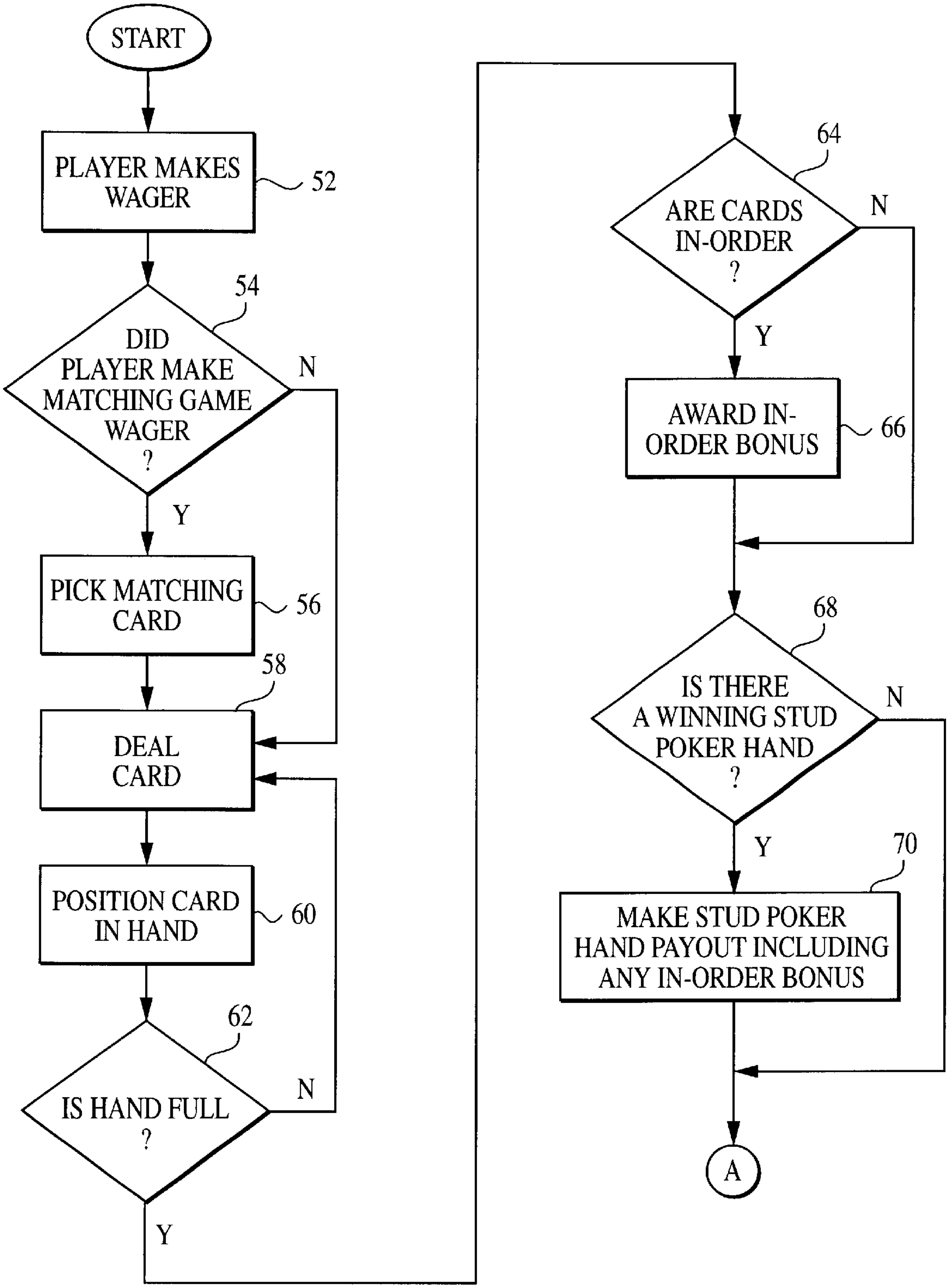
FIGS. 5*a*–5*b* are flowcharts depicting one example of a computer implemented process for implementing the combination of modified poker games of the present invention.
Figure 5B:
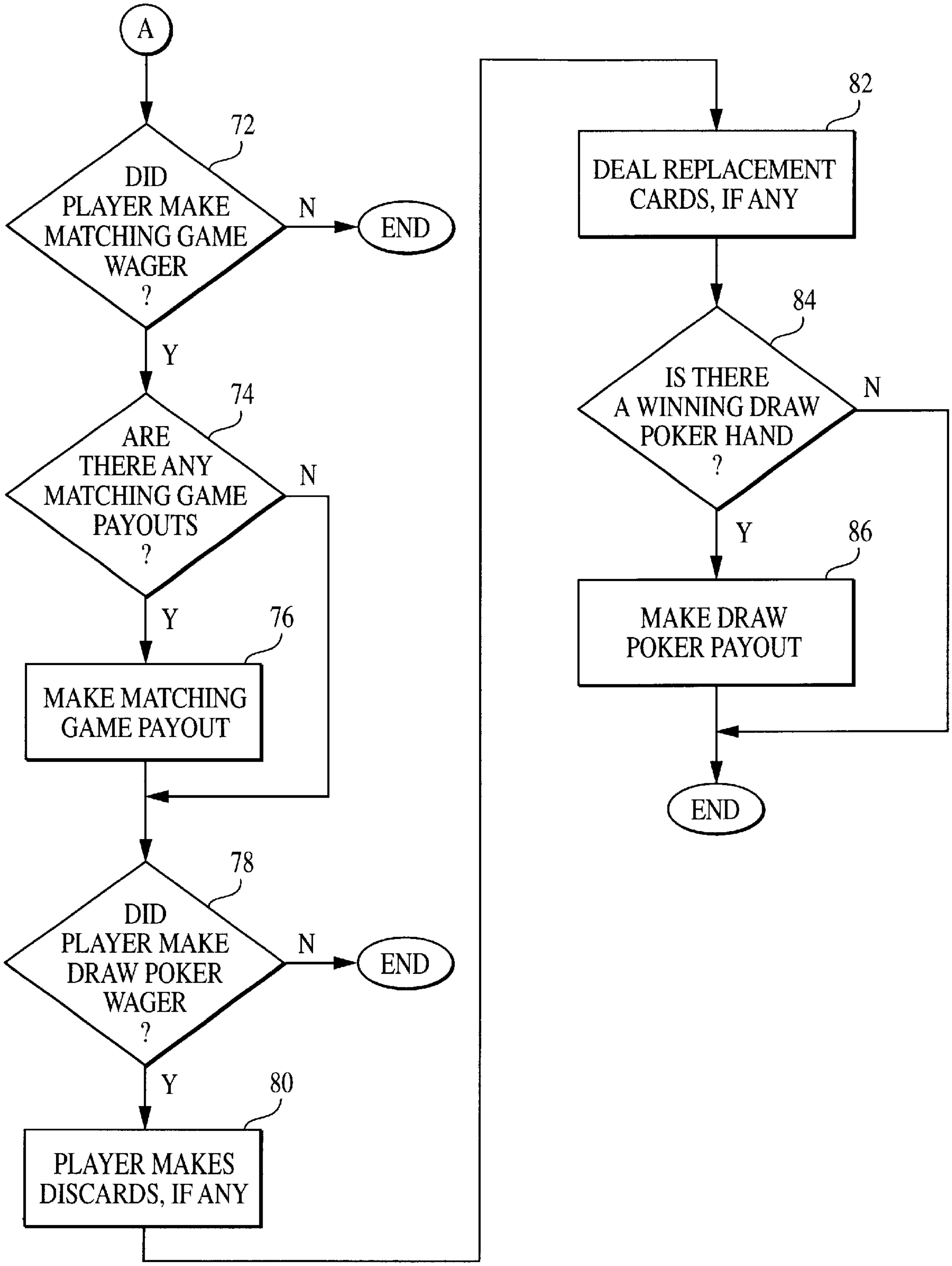

According to the principles of the present invention, a flowchart depicting one example of a process used to implement the combination of modified poker games is illustrated in FIGS. 5*a*–5*b*. Initially, the player wagers optionally on each of the games he or she wishes to play 52 or a single wager covers all games based on a predetermined denomination. In this embodiment, the player may elect to play any of: the ordering game; the ordering game and the matching game; or the ordering game, the matching game, and double bonus draw poker. Thus, as mentioned above, the player could insert an amount to be wagered and distribute the amount via, for instance, one or more buttons on the gaming machine according to which game(s) he or she wishes to play. Of course, other combinations of the three games may alternatively be played.

Then, a determination is made as to whether the player made a matching card wager 54. If the determination indicates that a matching card wager was indeed made, the player is prompted to select a matching card 56. The actual selection may occur through any standard suitable device including for instance one or more buttons, a touch sensitive screen, a mouse, a keyboard or any other suitable means or the like. In the alternative, a random card may be generated by the system.

After a matching card is selected by the player, or if a matching card wager was not previously made at 52, in which case a matching card selection is not made, a card is dealt to the player 58. This dealt card is then positioned in the player's hand by the player 60. Hence, in a five card hand, the first card dealt to the player could be placed in any available position. Subsequent cards, obviously, could be placed in any position not already occupied by a previous card. This process is repeated until the hand is full 62. As previously mentioned, although a typical hand is comprised of five cards, any number of cards may optionally be utilized.

Processing of the next game continues with a determination of whether the cards were arranged into a predetermined sequence that receives and awards points and/or payment 64. If the determination indicates that the cards are indeed arranged in the predetermined sequence, a corresponding payout or bonus, for example, is awarded 66. In contrast, if the cards are not arranged in the predetermined sequence, no payout is made. Furthermore, although "sequence" is used throughout the discussion, it is to be understood that any arrangement of cards (whether they are in order or not) may be utilized. For example, for purposes of this invention, the out-of-sequence hand 3, Ace, 5, 2, 7 in accordance with one embodiment of the invention may be construed as a predetermined sequence without departing from the principles of the invention. Sequence may optionally be determined based on other predetermined ranking schemes. Similarly, the ranking schemes need not require all cards in the hand to be in-order, but only a portion of the cards out of the complete cards in the hand.

From there, the cards are checked for a winning Stud poker hand 68. A conventional winning Stud poker schedule, including payouts for: royal flush; straight flush; four aces; four 2s, 3s, or 4s; four 5s and a king; full house; flush; straight; three of a kind; two pair; or sevens or better; or any other standard similar or suitable payout schedule may be used. If the comparison reveals that a winning Stud poker hand has been obtained, the corresponding payout, award or points is made 70.

After awarding any Stud poker payouts, the process optionally determines again whether a matching card wager was made 72. Alternatively, the results from the previous determination 54 may be used instead of performing this additional determination 72. If a matching card wager was not previously made, processing and the game optionally end. However, if the determination indicates that a matching card wager was made, processing continues with a determination as to whether any matching card payouts or awards exist 74. In particular, in this embodiment payouts are depicted in FIG. 12*d* and include a payout for obtaining three or more cards having the same suit as the matching card and/or one or more cards having the same rank as the matching card. Additionally, an extra bonus may be awarded for actually drawing the matching card itself. Other payouts or awards may be arranged based on the matching card as well. After awarding any additional matching card payout 76, processing continues with a determination of whether a double bonus draw poker wager was made 78. If not, processing and the game optionally end.

On the other hand, if a double bonus draw poker wager was made, the player discards any, all, or none of his or her cards 80. Next, cards are dealt to replace any discarded cards 82 thereby forming a second or draw poker hand. This second hand is then compared with a winning draw poker schedule 84, which may be for example the schedule depicted in FIG. 12*f* including payouts for: royal flush; straight flush; four aces; four 2's, 3's, or 4's; four 5's and a king; full house; flush; straight; three of a kind; two pair; or Jacks or better; or any other similar or suitable payout schedule. If the comparison indicates that a winning draw poker hand has been dealt, the corresponding payout is made 86. Subsequent to making the payout or if no winning hand was obtained, the game terminates.

In this and other embodiments of the present invention, any number of decks may be used. For instance, one deck may be used for all three games, or a new deck may be used with each game. Furthermore, although a standard fifty-two card deck was illustrated in the previous example, one or more decks of cards having any number of cards may be used. For example, a deck having one or more wild cards or jokers may be used, as well as a deck having less than fifty-two cards.

Figure 6A:
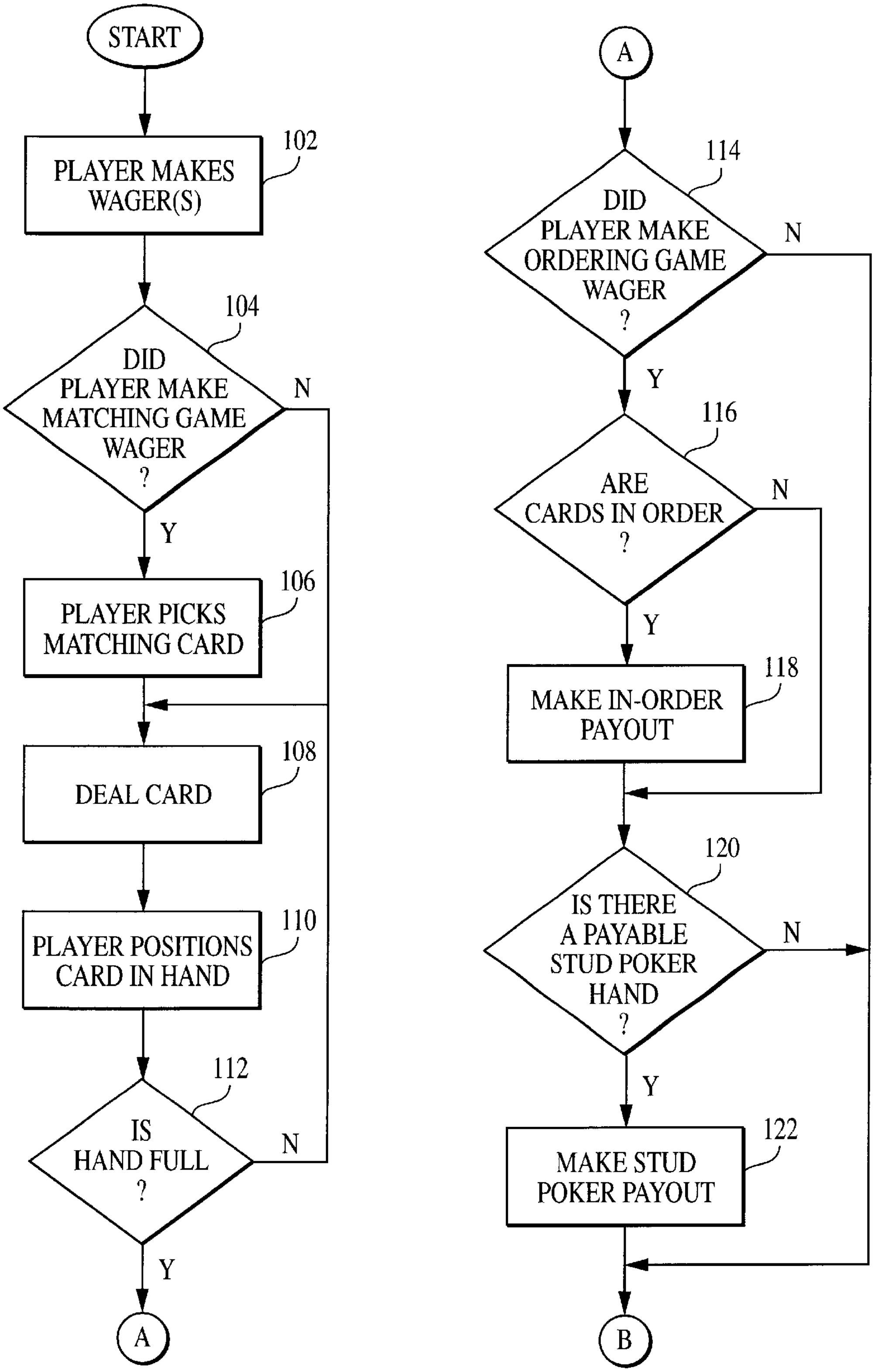
FIGS. 6*a*–6*b* are flowcharts depicting another example of a computer implemented process for implementing the combination of modified poker games of the present invention.
Figure 6B:
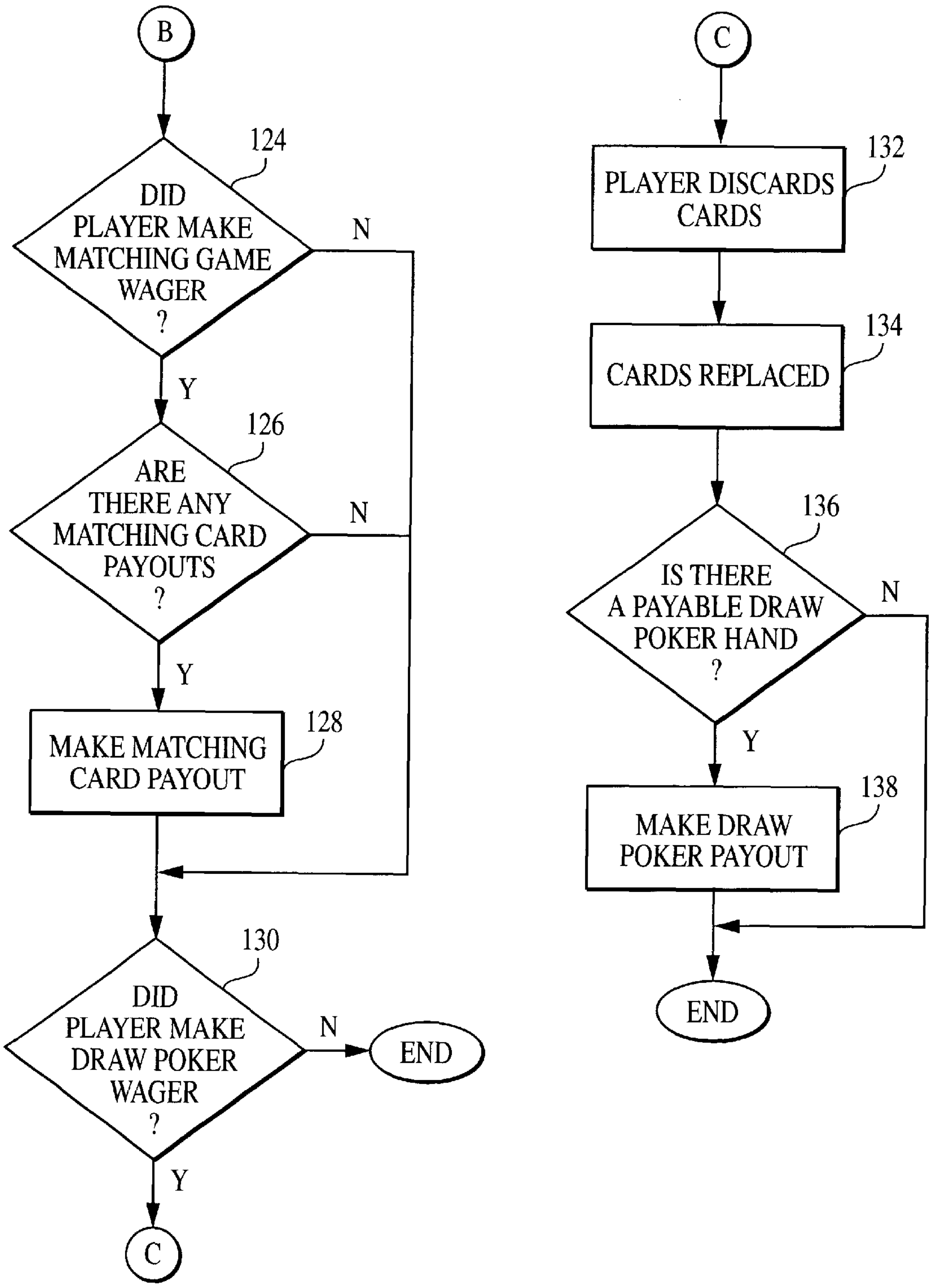

In accordance with the principles of the present invention, another flowchart depicting another example of a process used to implement the combination of modified poker games is illustrated in FIGS. 6*a*–6*b*. In this alternate embodiment, the player may elect to play any one, two or all of the ordering game, the matching game, and double bonus draw poker. As with the above embodiment, the player initially wagers in the manner discussed above on each of the games he or she wishes to play 102.

Then, a determination is made as to whether the player made a matching card wager 104. If the determination indicates that a matching card wager was indeed made, the player is prompted to select a matching card 106. After selecting a matching card, or if a matching card wager was not previously made at 102, in which case a matching card selection is not made, a card is dealt to the player 108. This dealt card is then positioned in the player's hand by the player 110. This process is repeated until the player's hand is full 112.

Processing continues with a determination of whether the player made an in-order wager 114. If so, the hand is examined to determine whether the cards were arranged into a predetermined sequence 116. If the determination indicates that the cards are indeed arranged in a predetermined sequence, a corresponding payout or bonus is awarded 118. In contrast, if the cards are not arranged in the predetermined sequence, no in-order payout is made.

From there, the cards are checked for a winning Stud poker hand 120. If the comparison reveals that a winning Stud poker hand has been obtained, the corresponding payout is made 122. In this example, stud poker is played by wagering on the in-ordergame. However, in other embodiments it is possible to separate the ordering game from stud poker and require wagers to be placed on each or a predetermined minimum for all games to require the player to play all the games in the combination. After awarding any Stud poker payouts or if an ordering game wager was not previously made by the player, the process optionally determines again whether a matching card wager was made 124. If the determination indicates that a matching card wager was made, processing continues with a determination as to whether any matching card payouts exist 126. After awarding any matching card payouts 128 or if a matching card wager was not previously made, processing continues with a determination of whether a double bonus draw poker wager was made 130. If not, processing and the game end.

On the other hand, if a double bonus draw poker wager was made, the player discards any, all, or none of his or her cards 132. Next, cards are dealt to replace any discarded cards 134 thereby forming a second or draw poker hand. This second hand is then compared with a winning draw poker schedule 136. If the comparison indicates that a winning draw poker hand has been dealt, the corresponding payout is made 138. Subsequent to making the payout or if no winning hand was obtained, the game terminates. Note, that other variations of the combination of modified poker games are also possible, where two or more games store all or a portion of the cards in common.

Figure 7A:
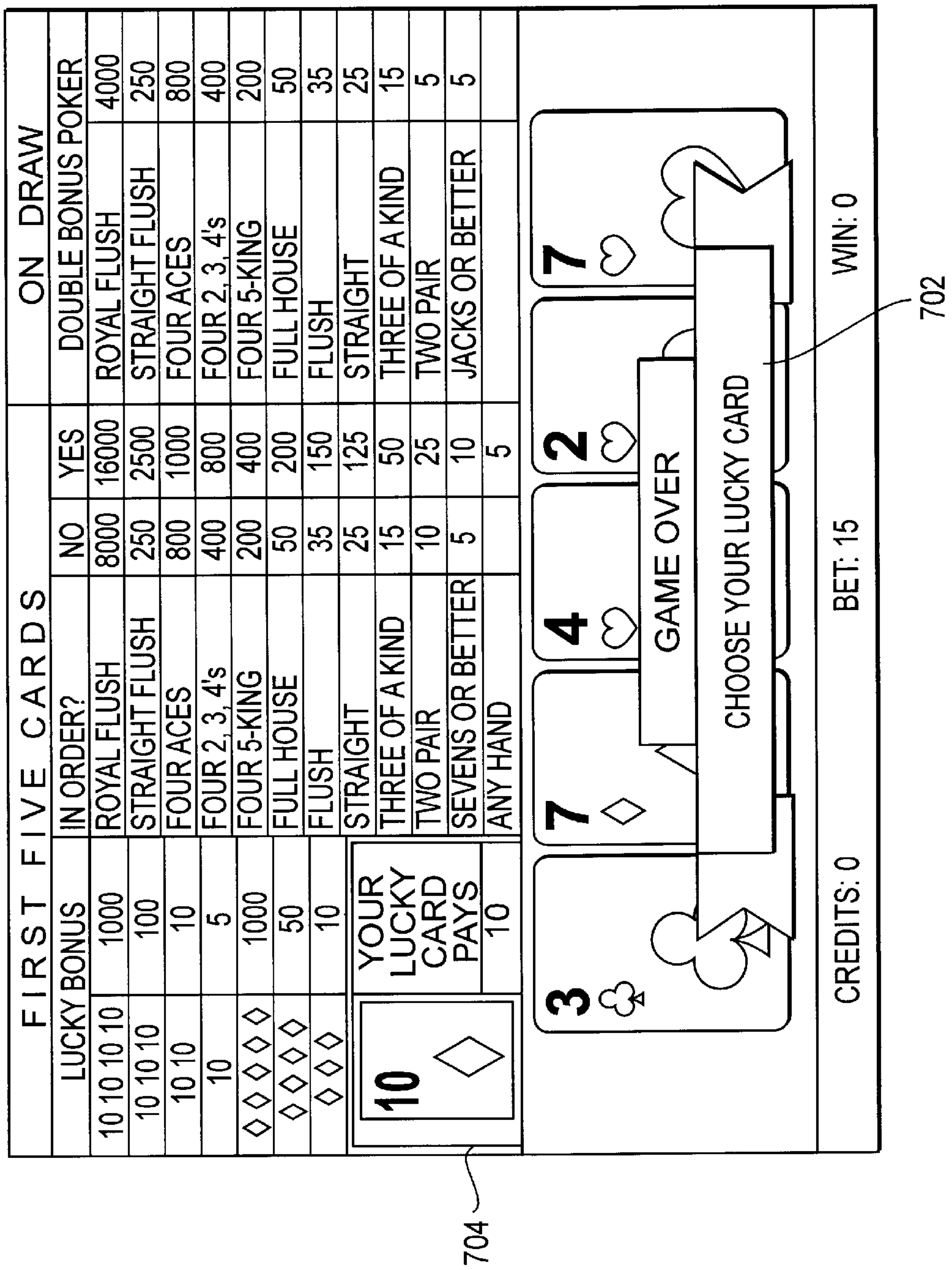
FIGS. 7*a*–7*k* illustrate an example of a game of modified poker according to the principles of the present invention with a payout for obtaining a matching card during a matching game.
Figure 7B:
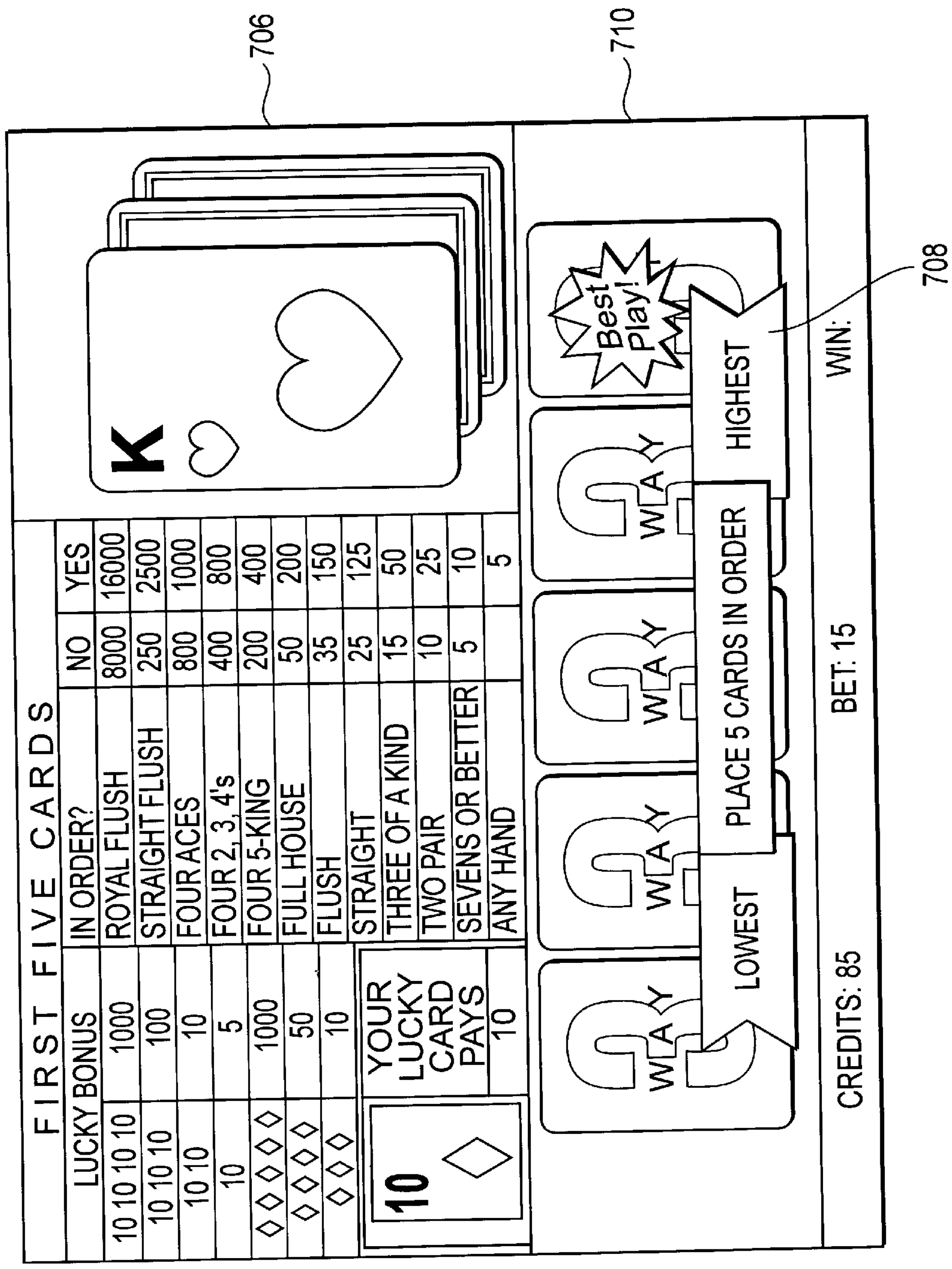

Having described examples of processes for implementing the combination of modified poker games, an example of a complete game is now described with reference to FIGS. 7*a*–7*k*. In this example, the player has wagered five credits on each of the three games, as evidenced in the instant example by the highlighted three payout screens. At the onset, as shown in FIG. 7*a*, the player is prompted to select a matching card at 702. In this case, the player selects via, for instance, a button or the like, the 10 of diamonds 704. As shown in FIG. 7*b*, a first card 706 is then dealt by the system or gaming machine with an instruction to the player to "Place 5 Cards In Order" from "Lowest" to "Highest" at 708. Here, the King of diamonds is dealt and in this example, a suggestion indicated by "Best Play" 710 is made by the system to place the card in the rightmost position.

Figure 7C:
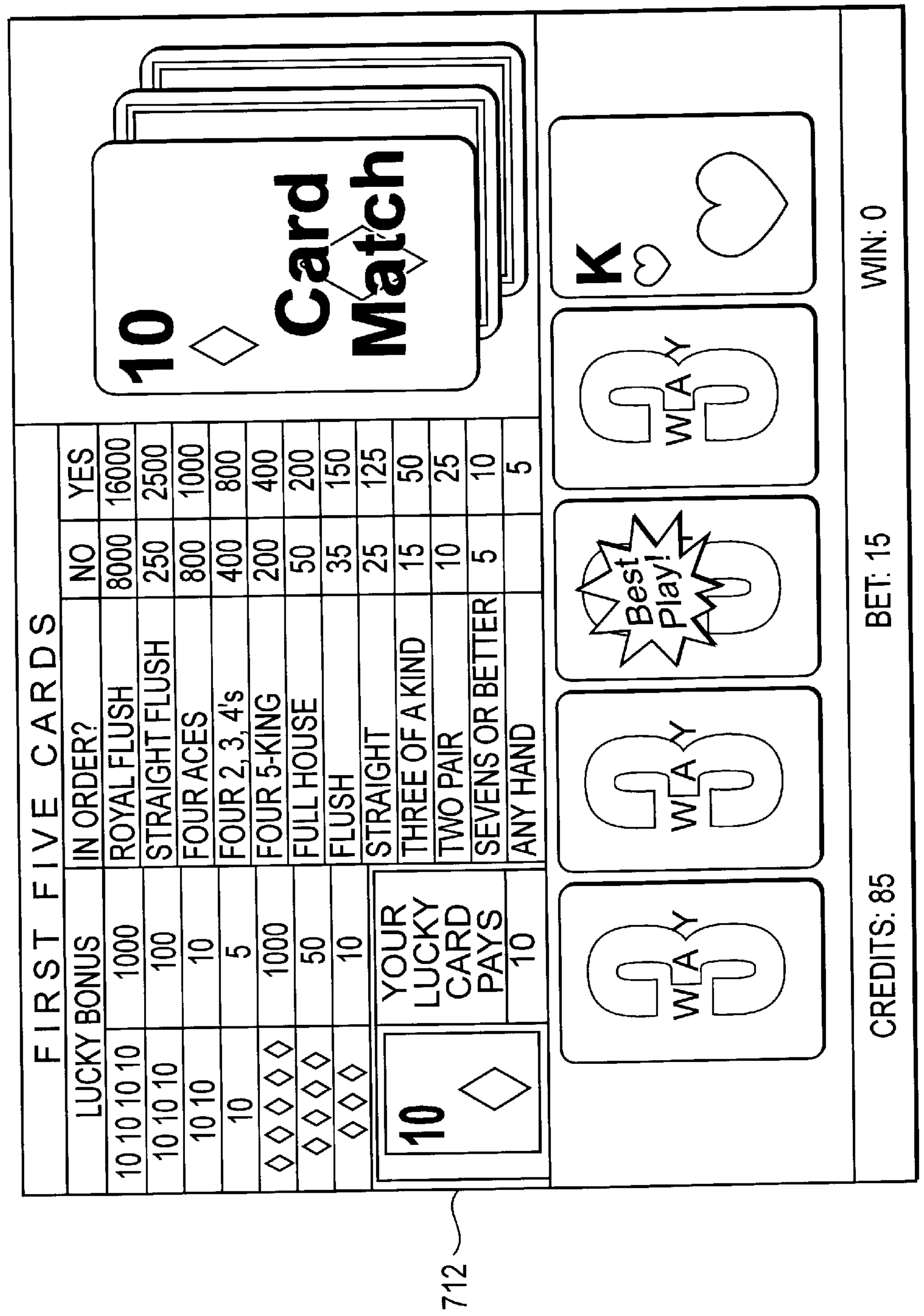

By using, for example, a button or a touch sensitive screen, the player in FIG. 7*c* places the first card into the rightmost position. The system then deals the second card, which in this case happens to match the player's matching card. As such, the player earns a bonus of 10 credits as evidenced in the "Lucky Bonus" schedule 712.

Figure 7D:
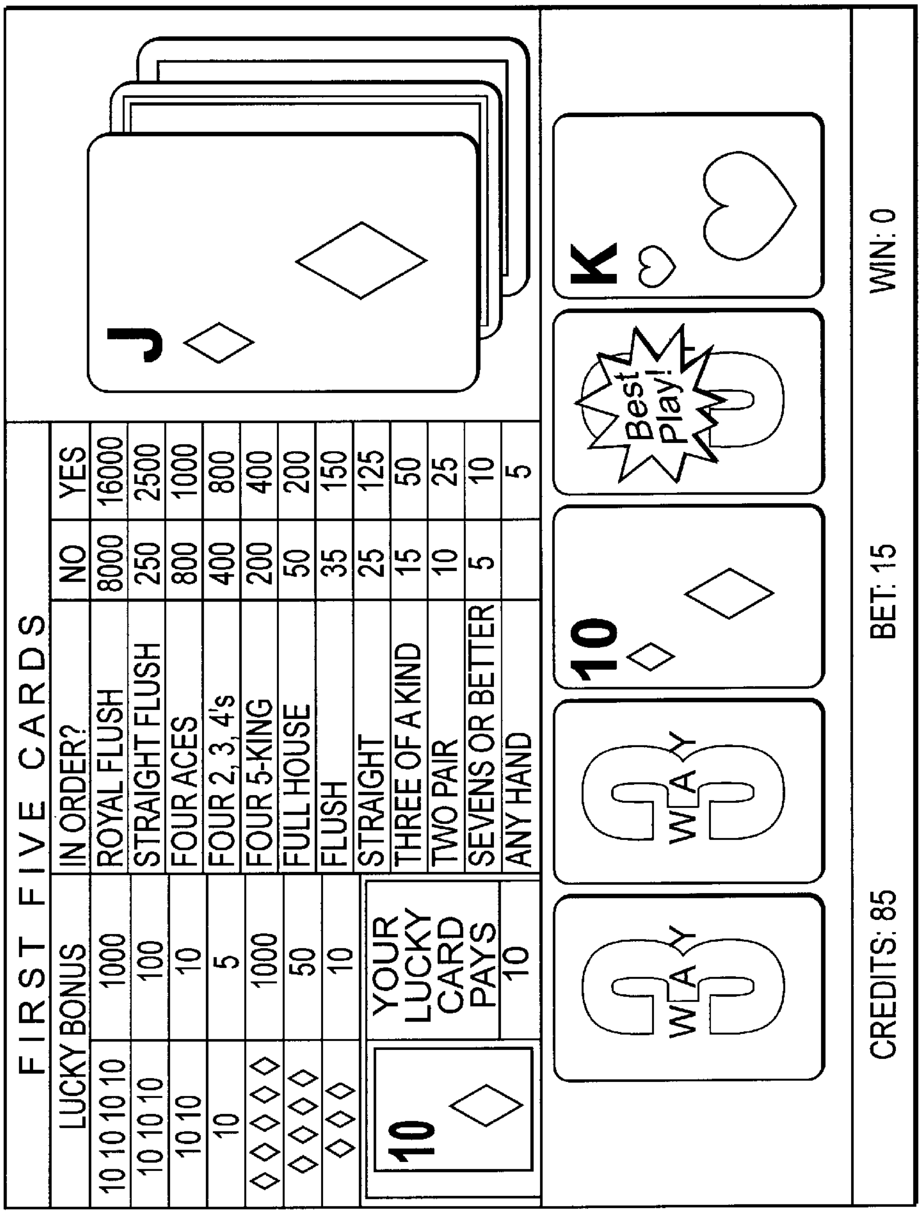
Figure 7E:
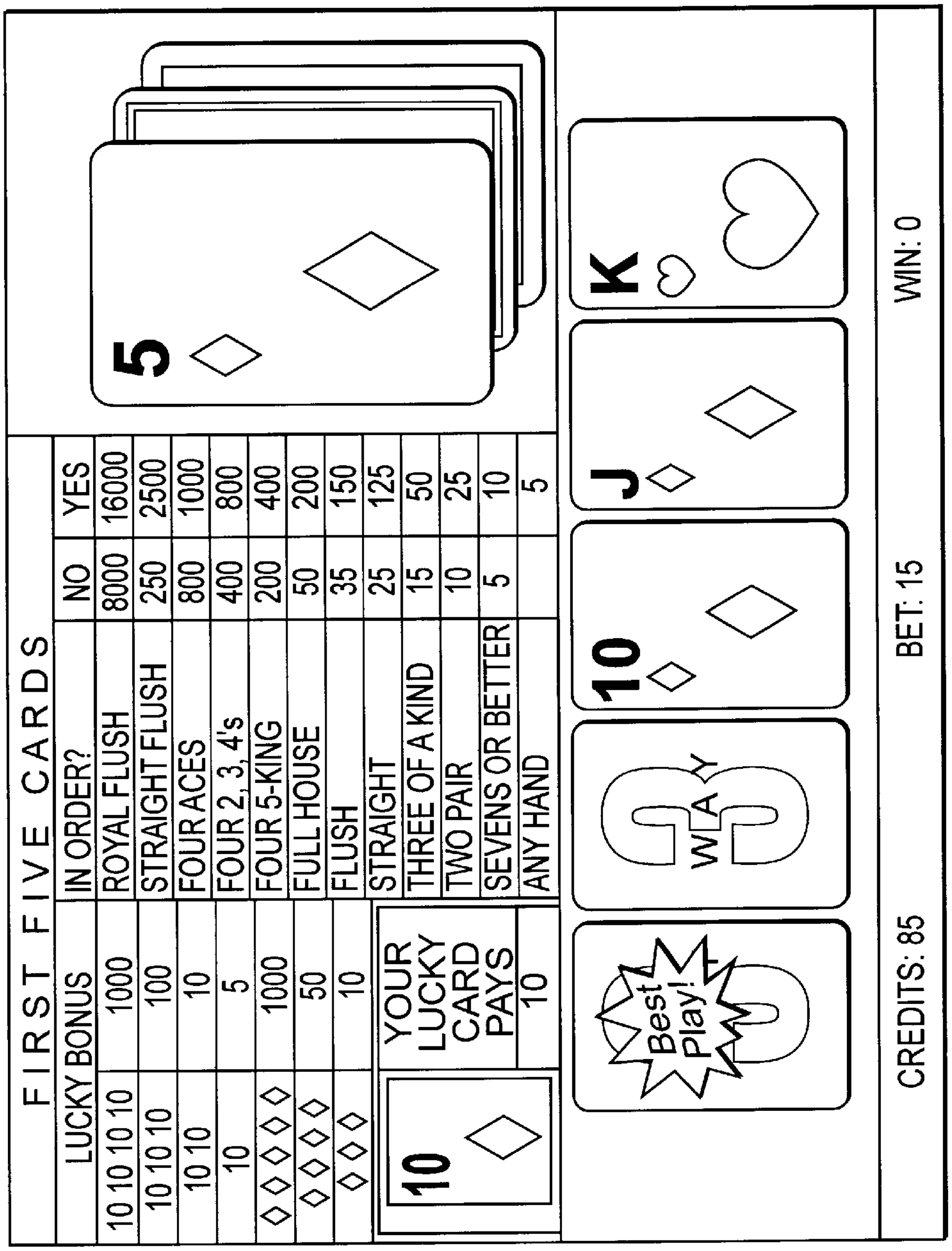
Figure 7F:
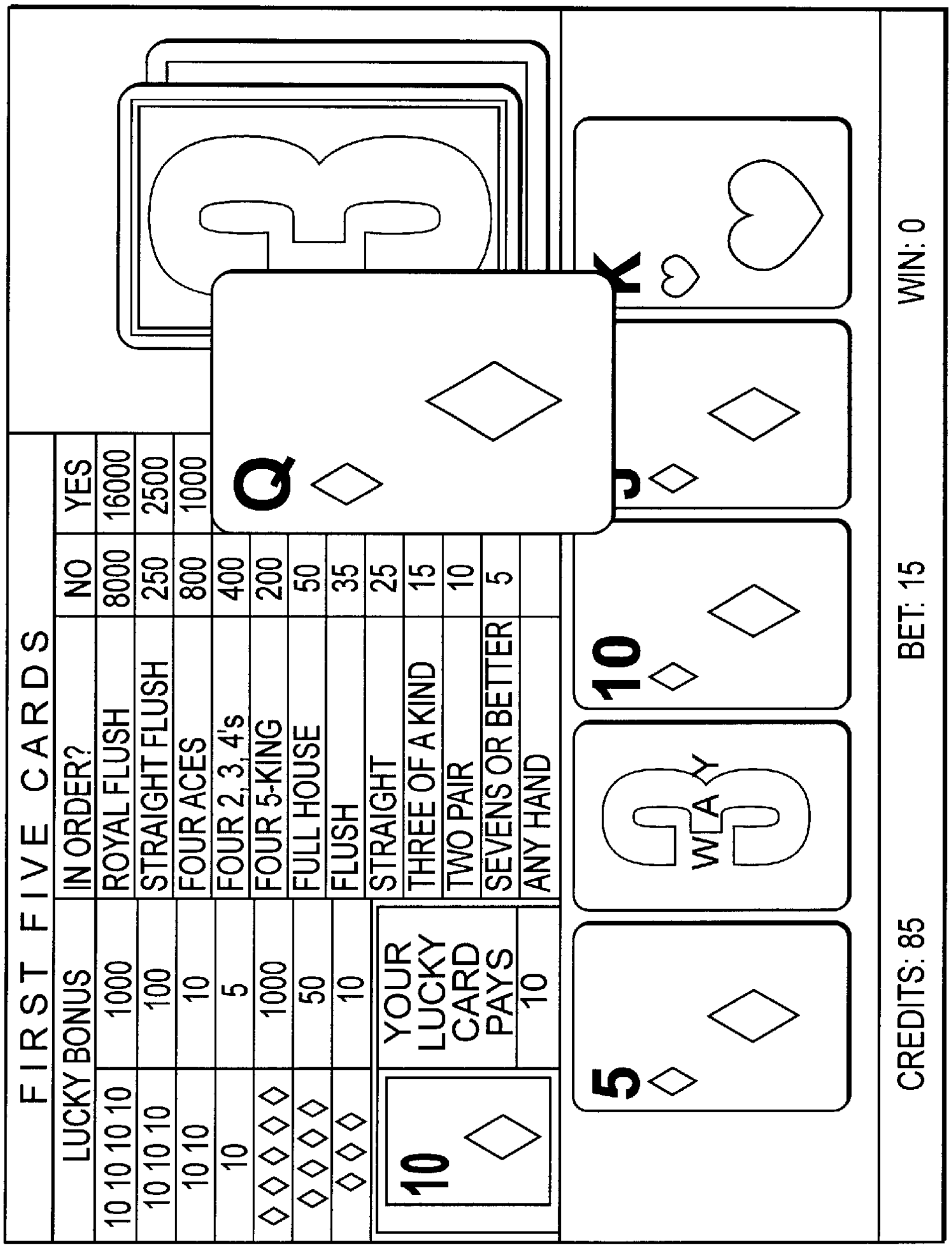
Figure 7G:
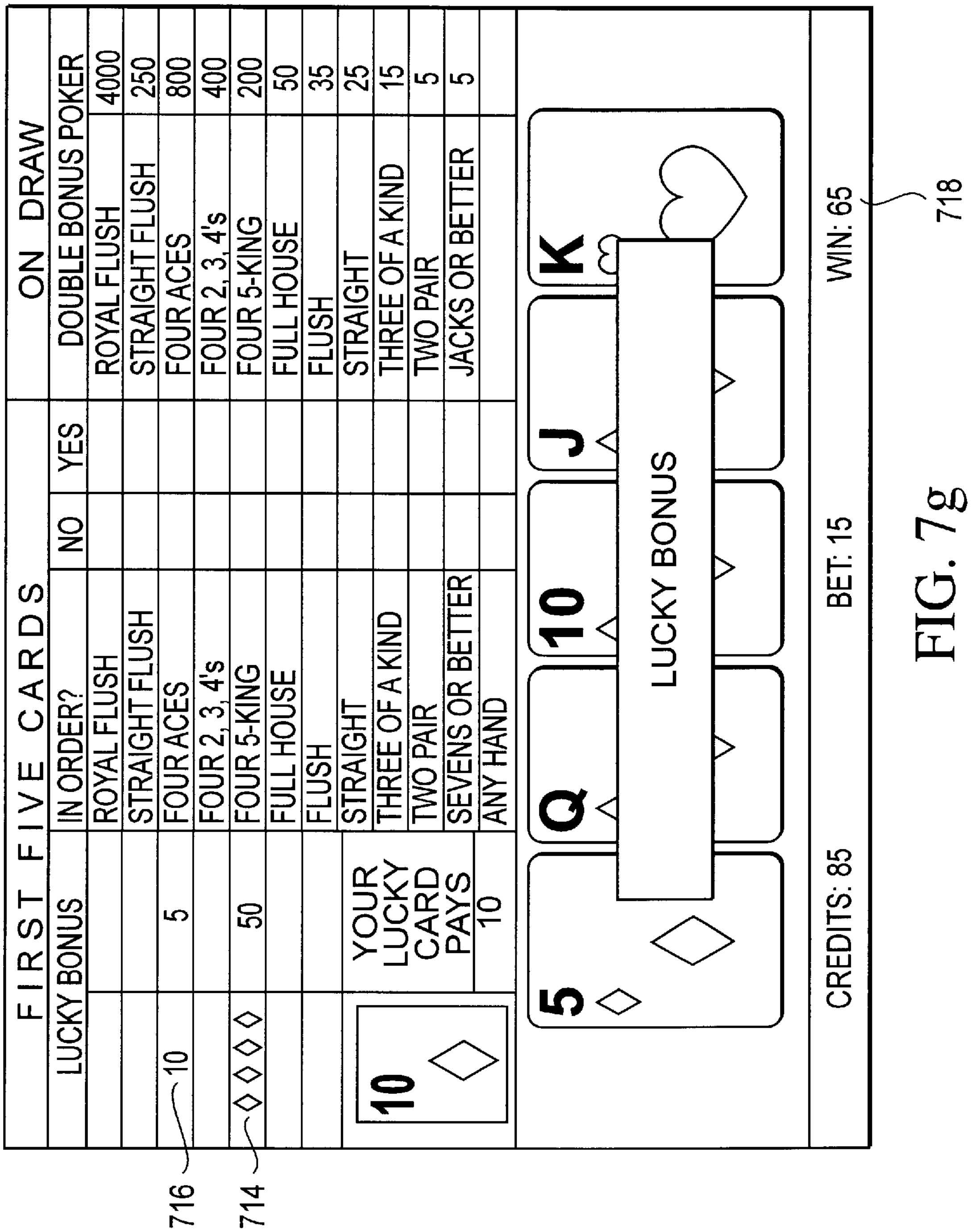

After placing the second card in the middle position in FIG. 7*d*, play continues in FIGS. 7*e*–7*g* with the system dealing and the player placing cards until the hand is full. In this example, although the player has failed to place the cards in increasing rank order (i.e., the Queen is interposed between the 5 and the 10), the player has managed to obtain four cards having the same suit as the matching card and one card having the same rank as the matching card, thereby entitling the player to matching card payouts of 50 and 5 credits respectively as shown in the Lucky Bonus payout table at 714 and 716. This 55 credit payout is summed with the matching card bonus of 10 for drawing the matching card itself resulting in a total payout of 65 credits at 718.

Figure 7H:
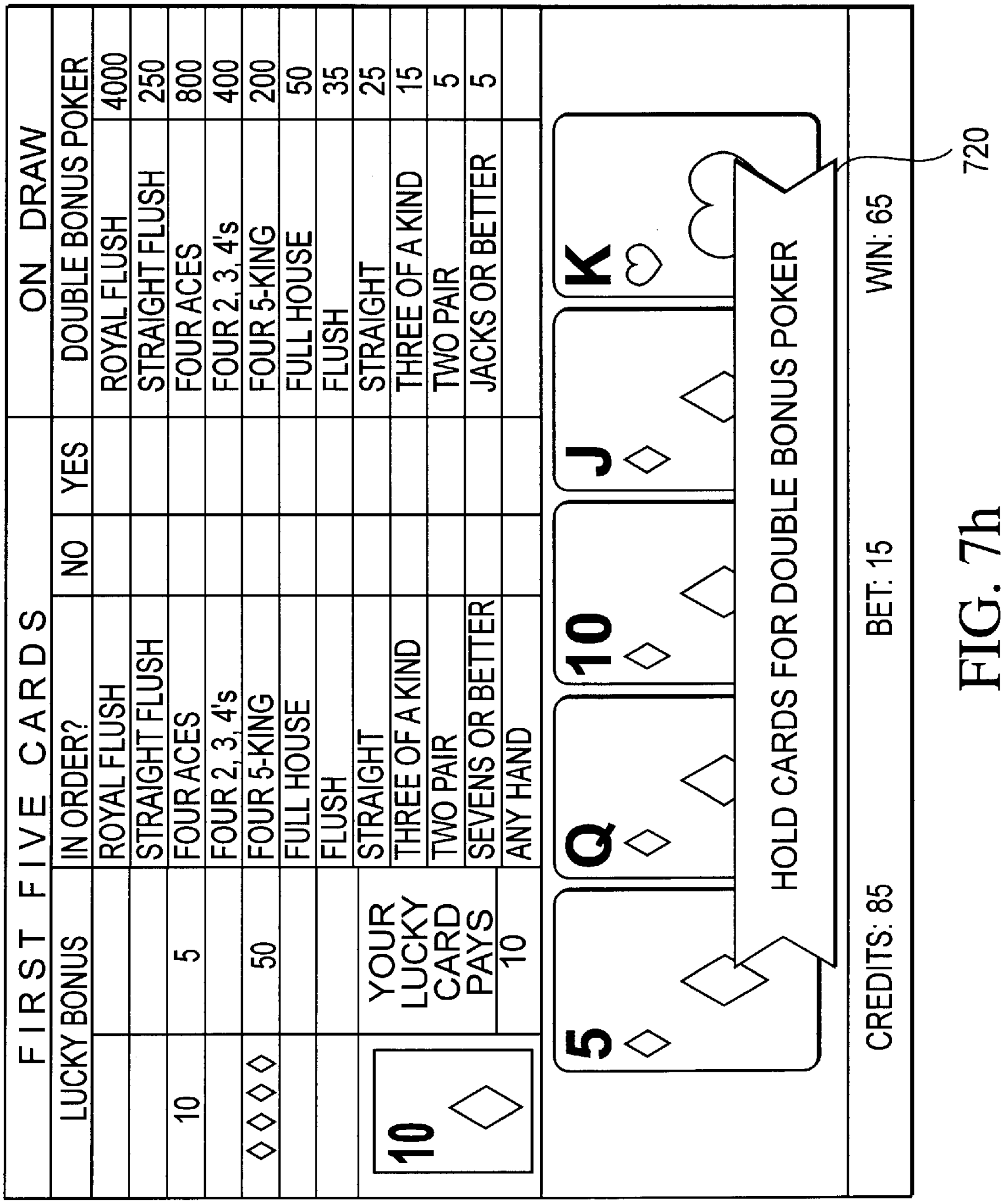
Figure 7I:
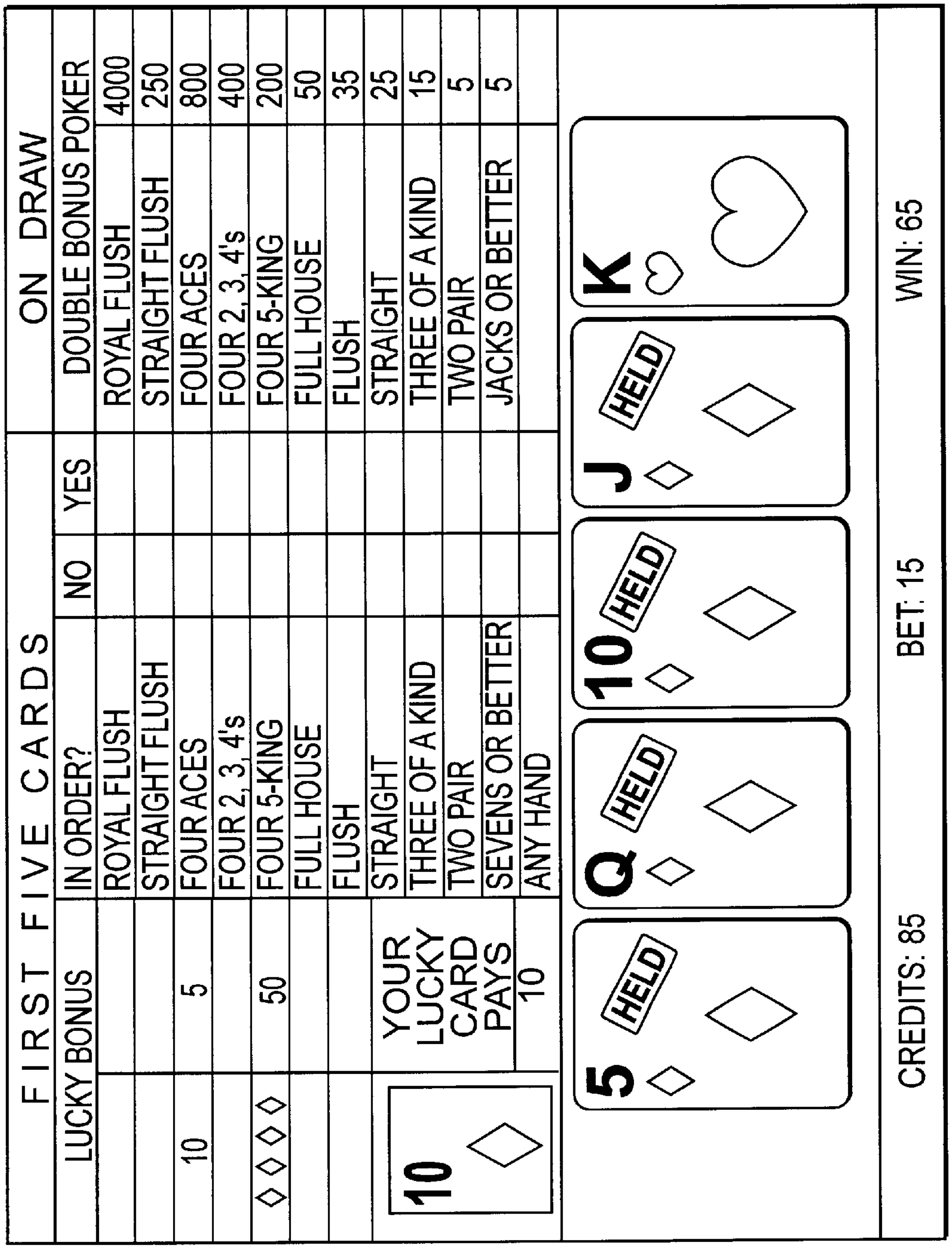
Figure 7J:
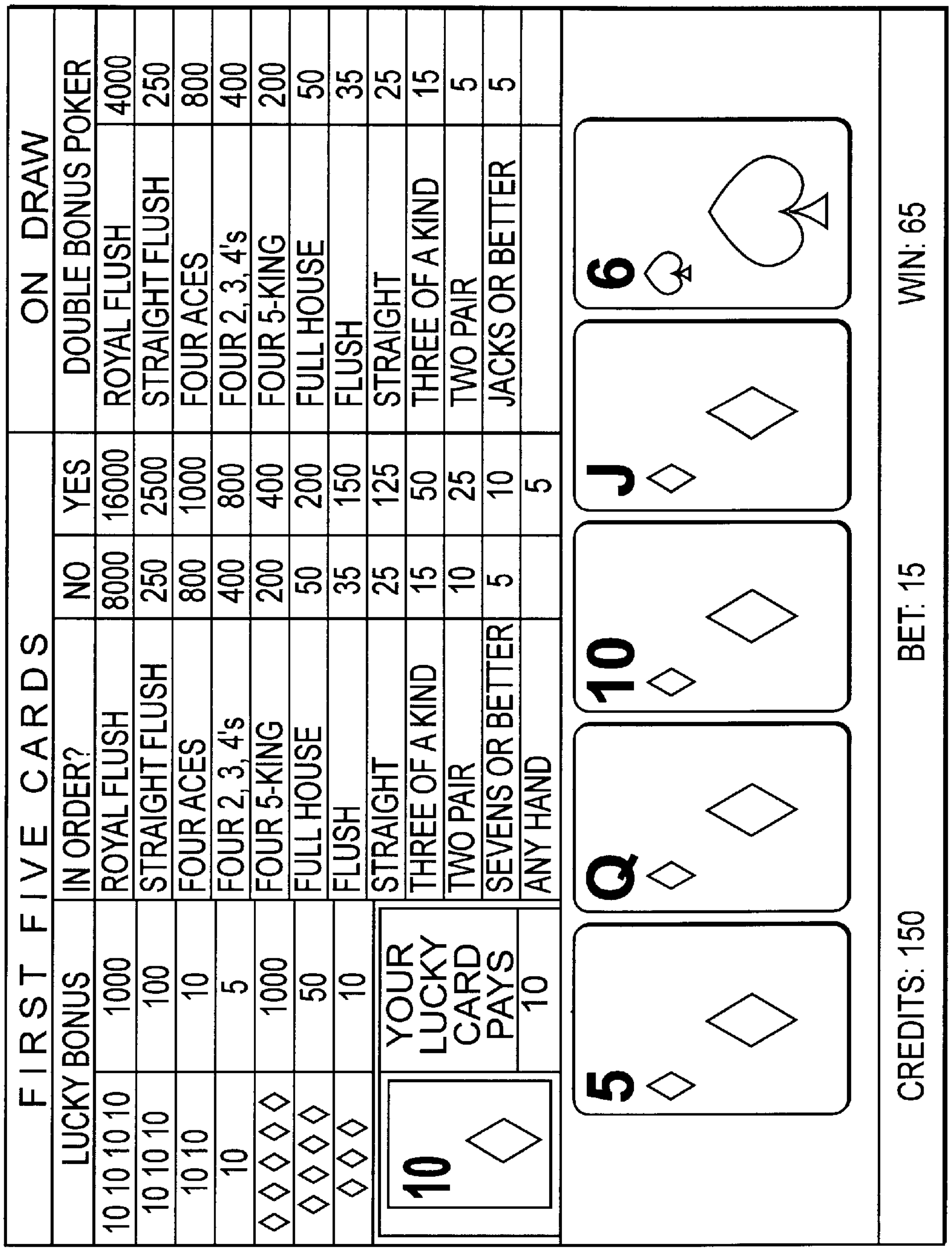
Figure 7K:
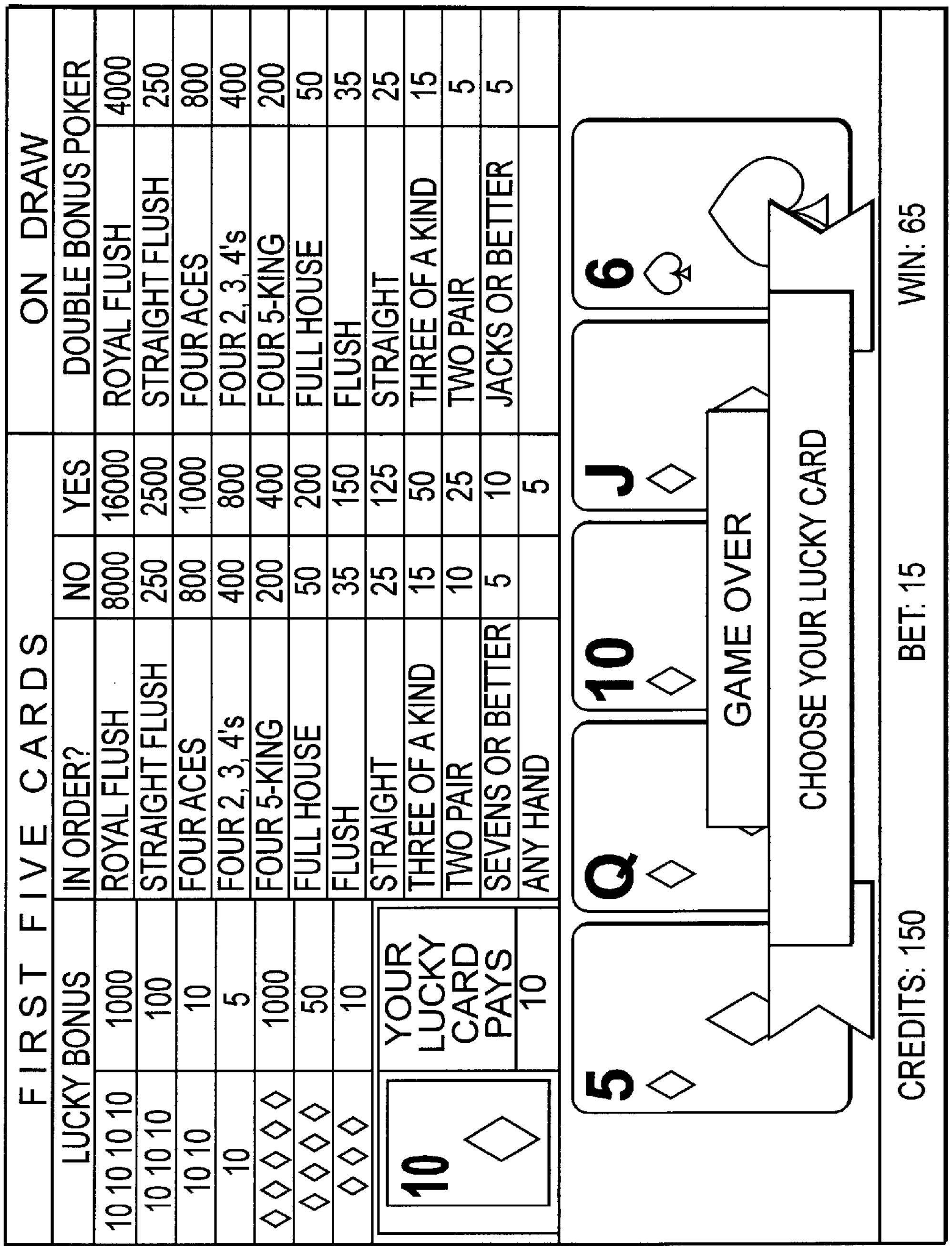

In FIG. 7*h*, play continues with the system prompting the player to "Hold Cards for Double Bonus Poker" at 720. As shown in FIG. 7*i*, the player holds the 5 of diamonds, the Queen of diamonds, the 10 of diamonds, and the Jack of diamonds, choosing to discard the King of hearts. In FIG. 7*j*, the replacement card 6 of spades is dealt leaving the player without a winning double bonus draw poker hand. This game concludes in FIG. 7*k* indicating that the game has ended.

Figure 8A:
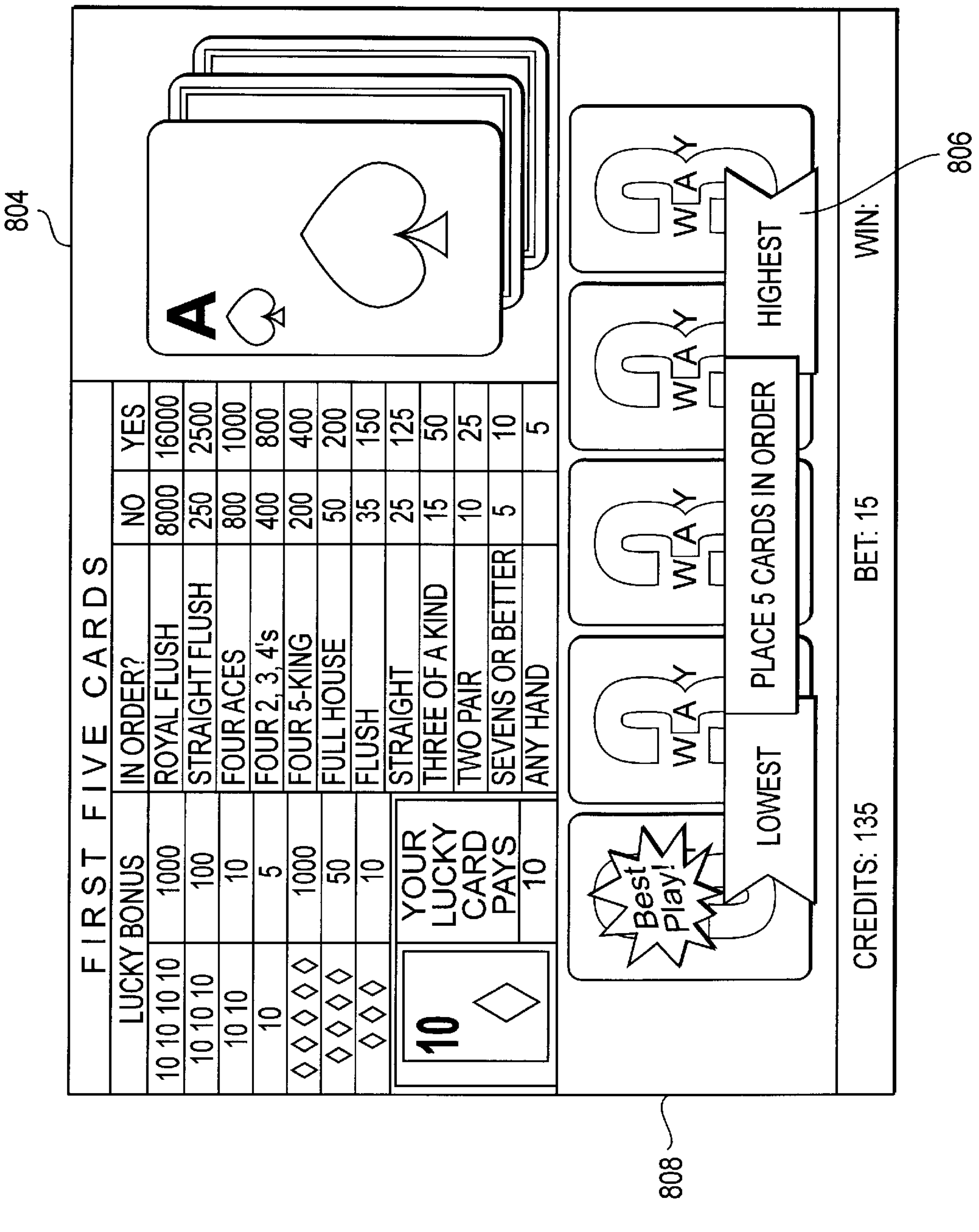
FIGS. 8*a*–8*h* illustrate another example of another game of modified poker according to the principles of the present invention with a payout for an in-order bonus during an ordering game.
Figure 8B:
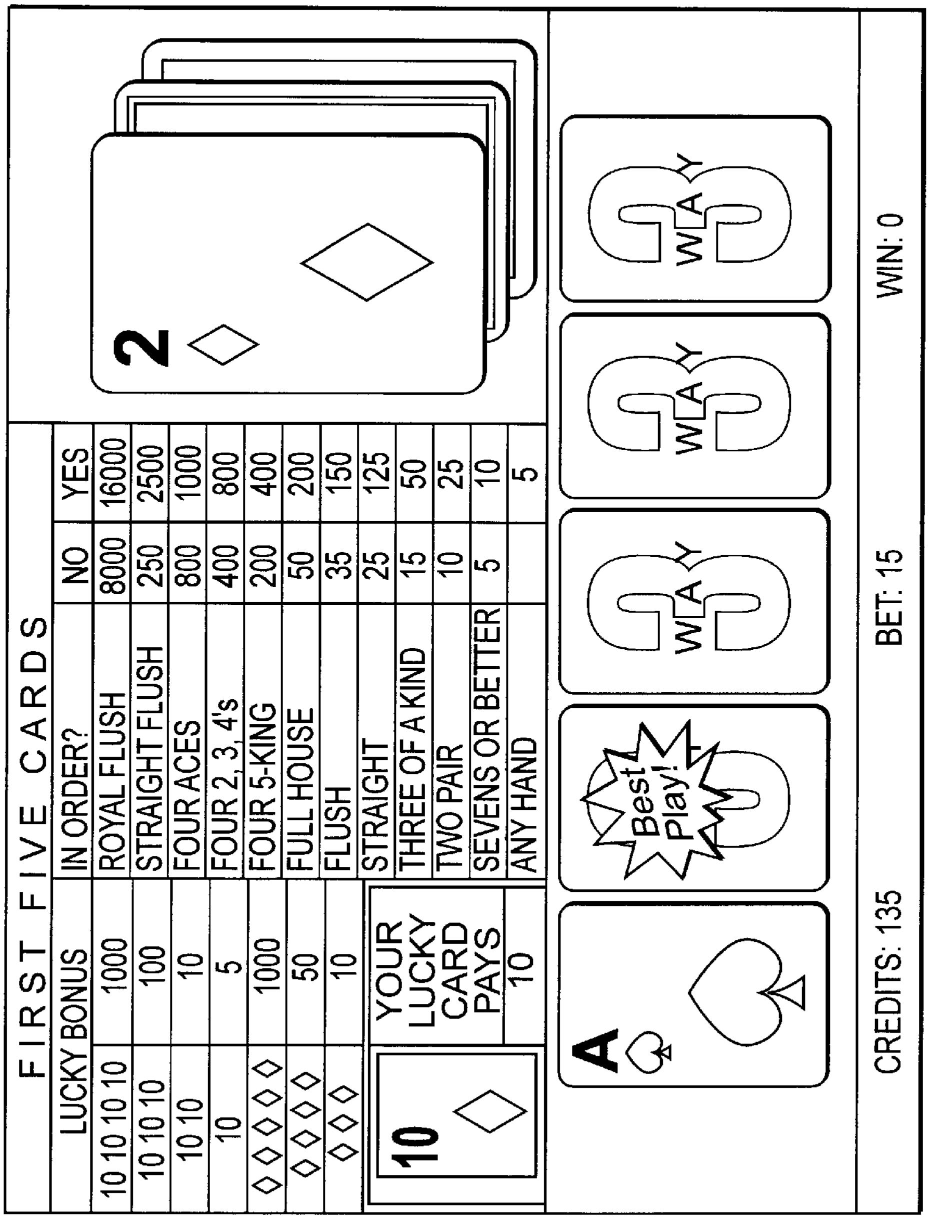
Figure 8C:
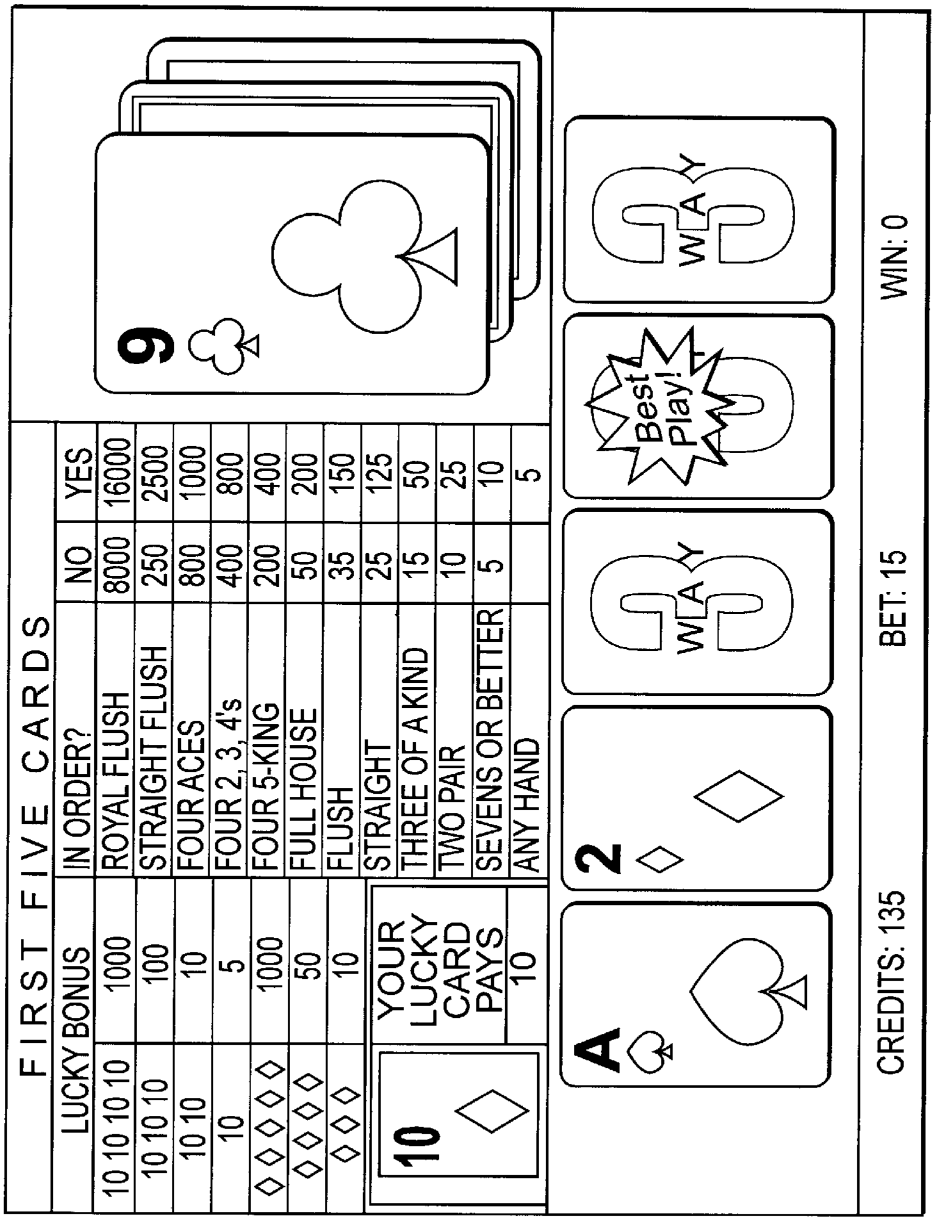
Figure 8D:
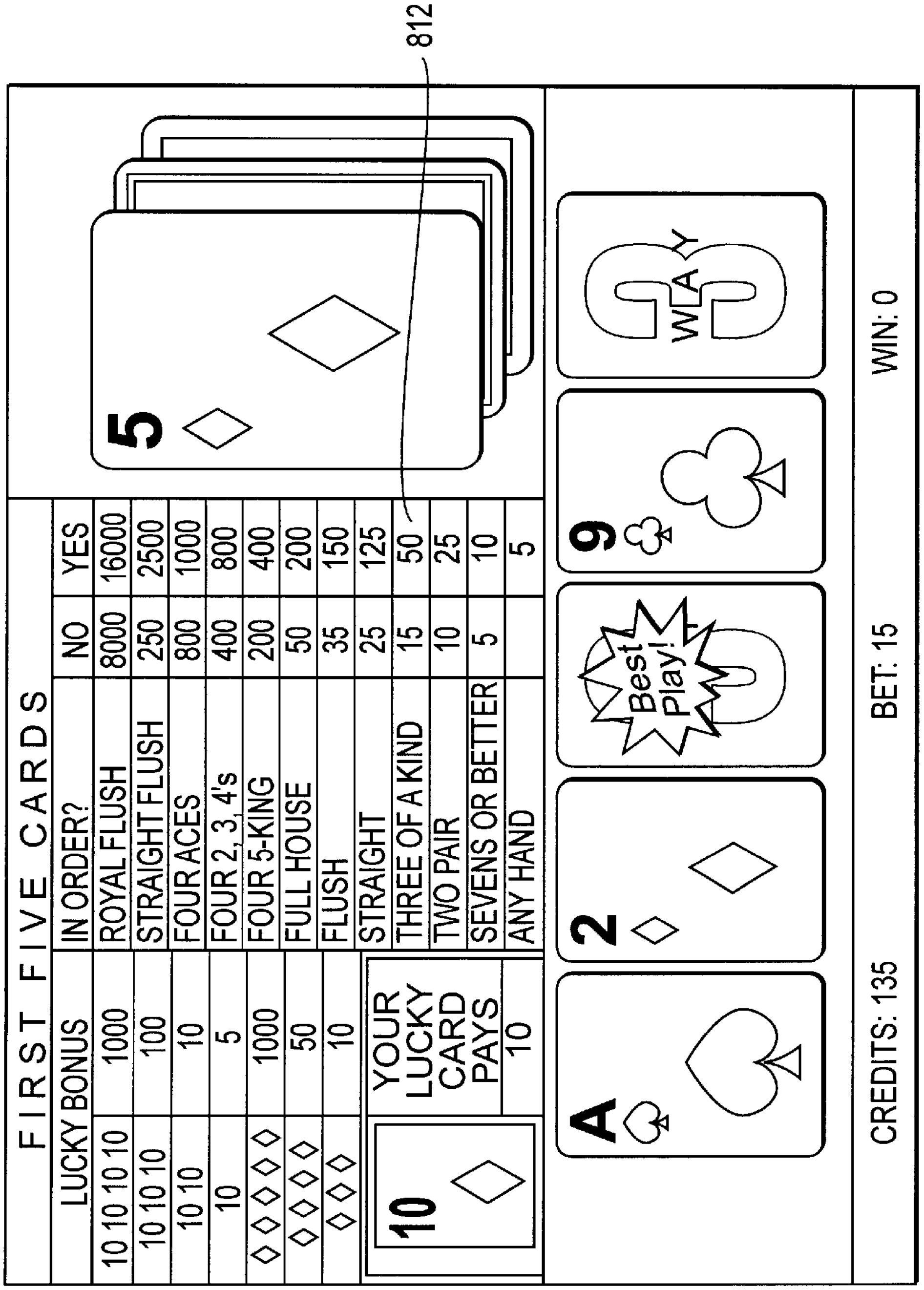
Figure 8E:
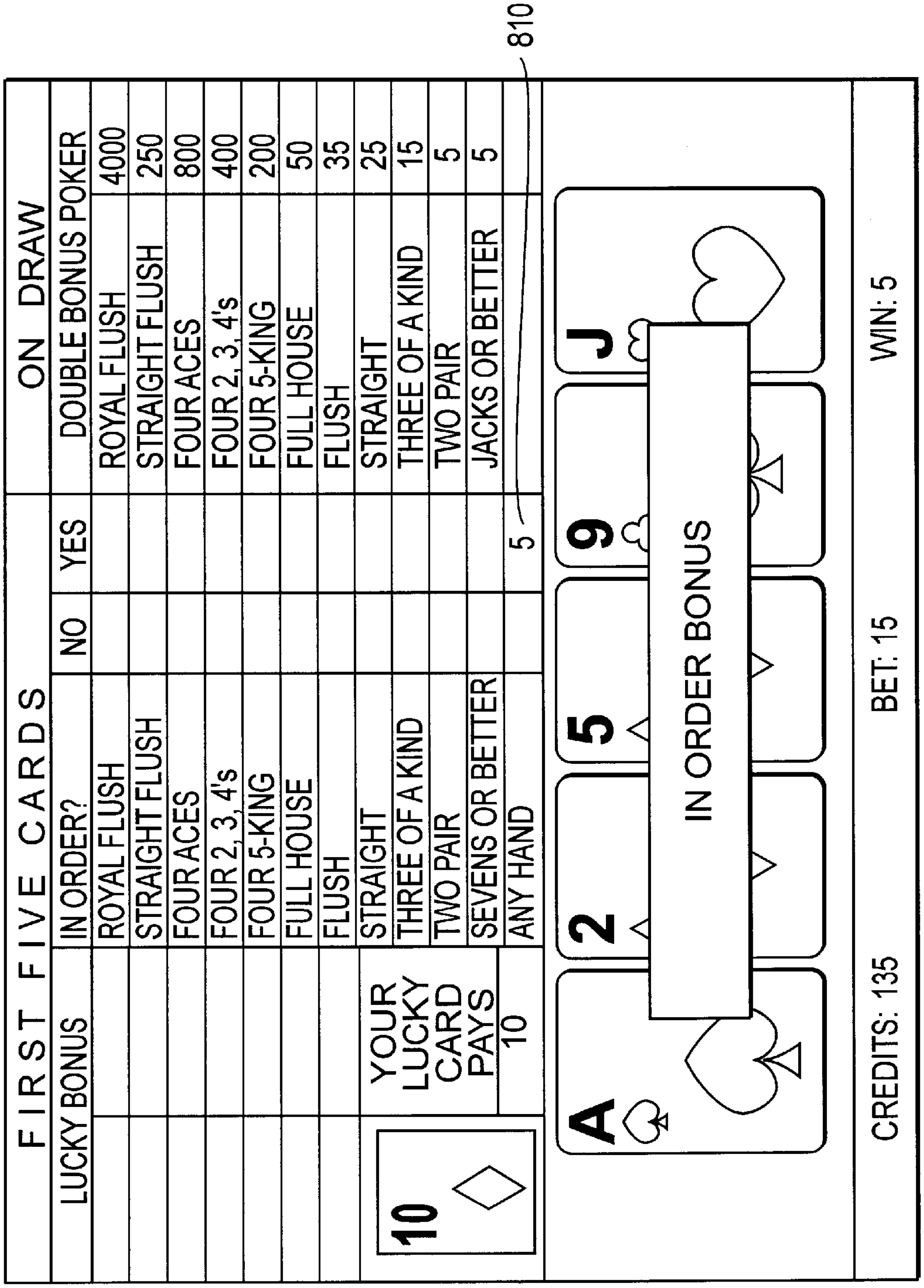

An example of another complete game is now described with reference to FIGS. 8*a*–8*h*. In this example, the player has again wagered five credits on each of the three games. In this case, the player has again selected the 10 of diamonds as the matching card. As shown in FIG. 8*a*, a first card 804 is dealt by the system or gaming machine with the player instructed to "Place 5 Cards In Order" from "Lowest" to "Highest" at 806. Here, the Ace of spades is dealt and, in this example, a suggestion indicated by "Best Play" 808 is made by the system to place the card in the leftmost position.

Play then continues in FIGS. 8*b*–8*e* with the system dealing and the player placing cards until the hand is full. In this example, the player has placed the cards in increasing rank order (i.e., Ace, 2, 5, 9 and the Jack), thereby entitling the player to the in-order bonus for "any hand", as shown in the Lucky Bonus payout table at 810. In contrast, referring back to FIG. 8*d* at 812, if the player had obtained a winning stud poker hand, for example for a three of a kind, in addition to the in-order bonus, he or she would have won a total of 50 credits.

Figure 8F:
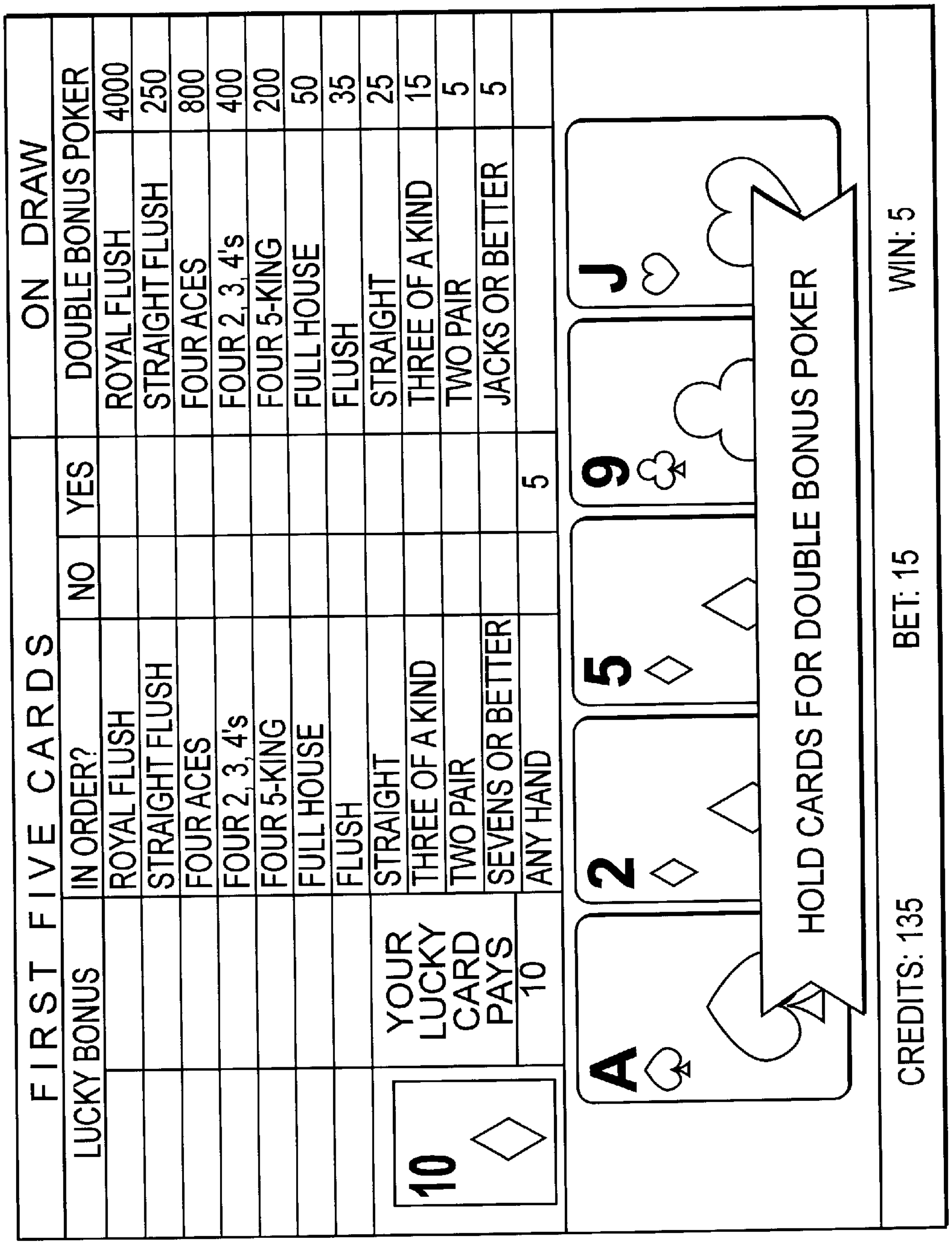
Figure 8G:
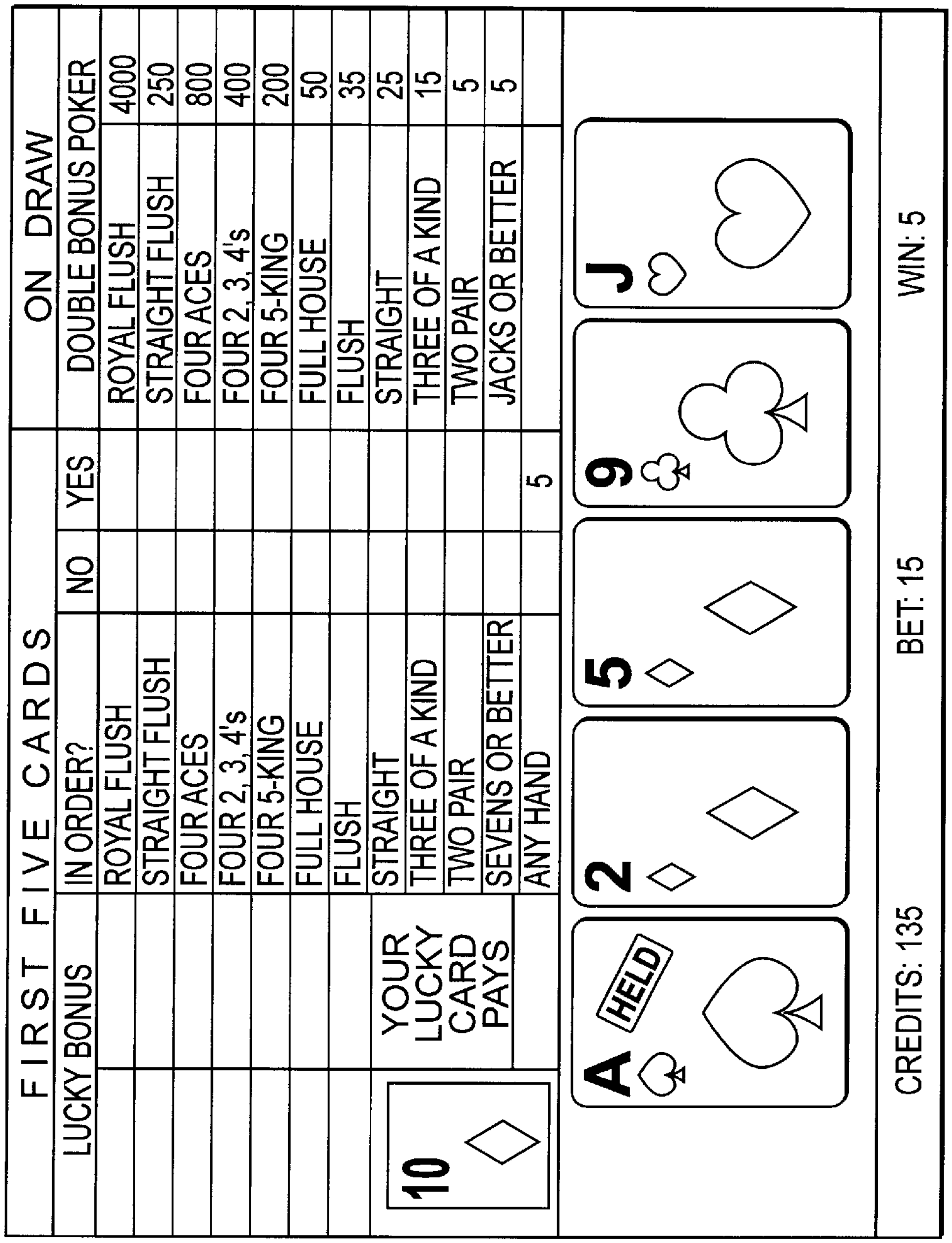
Figure 8H:
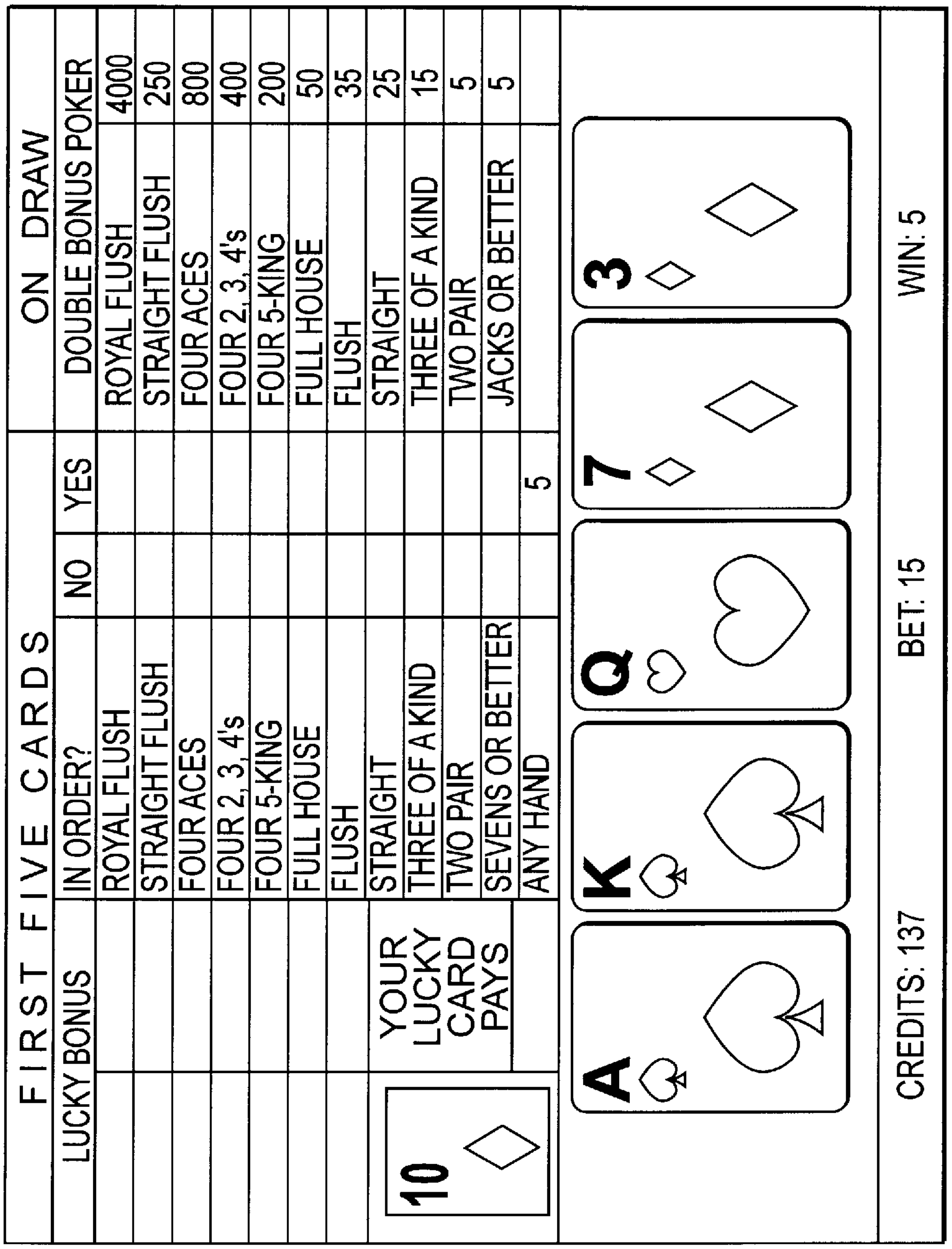

In FIG. 8*f*, the system prompts the player to "Hold Cards for Double Bonus Poker" for draw poker play. As shown in FIG. 8*h*, the player holds the Ace of spades and chooses to discard the remainder. In FIG. 8*i*, replacement cards are dealt leaving the player without a winning double bonus draw poker hand.

Figure 9A:
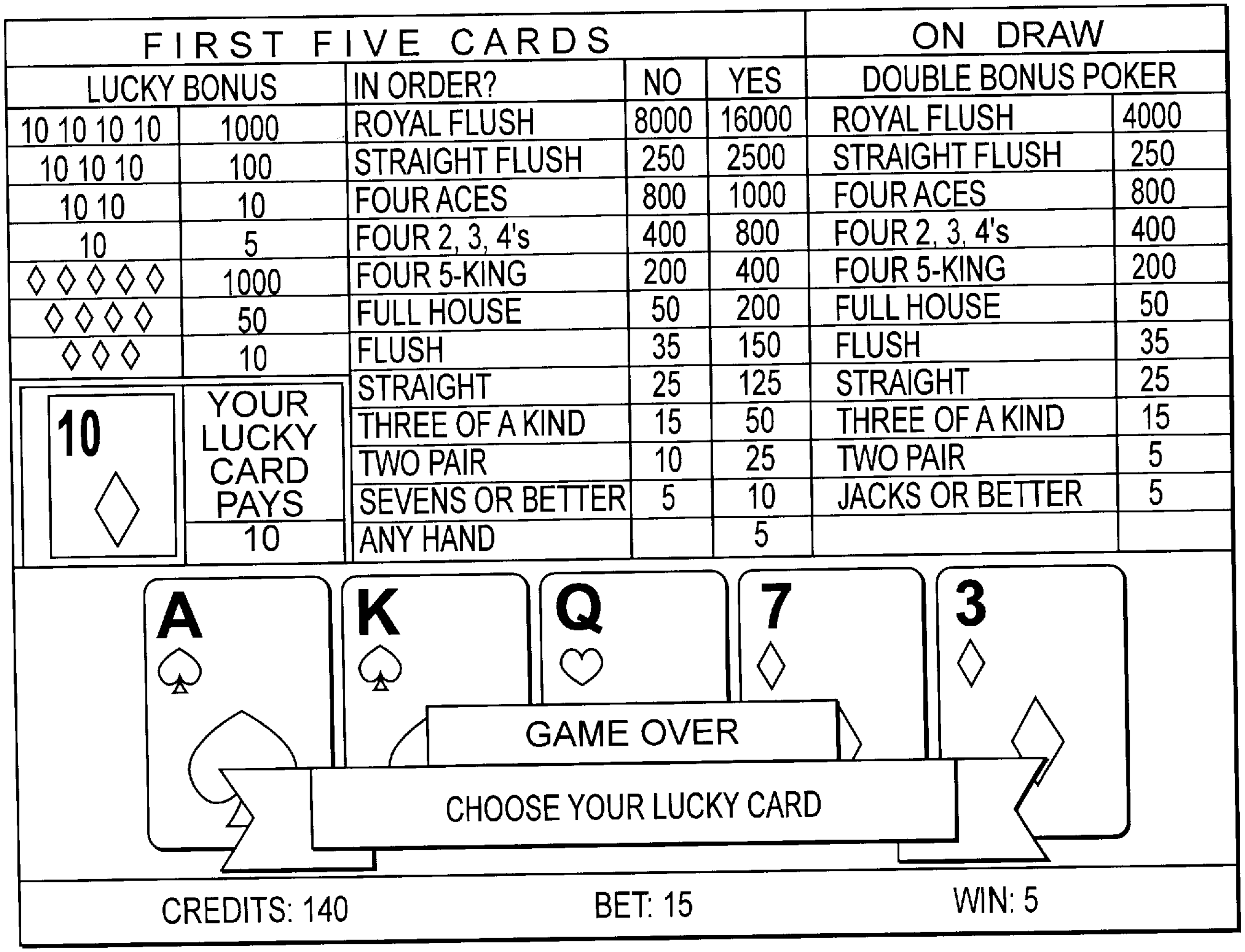
FIGS. 9*a*–9*h* illustrate yet another example of yet another game of modified poker according to the principles of the present invention with a payout for obtaining a straight during double bonus draw poker.
Figure 9B:
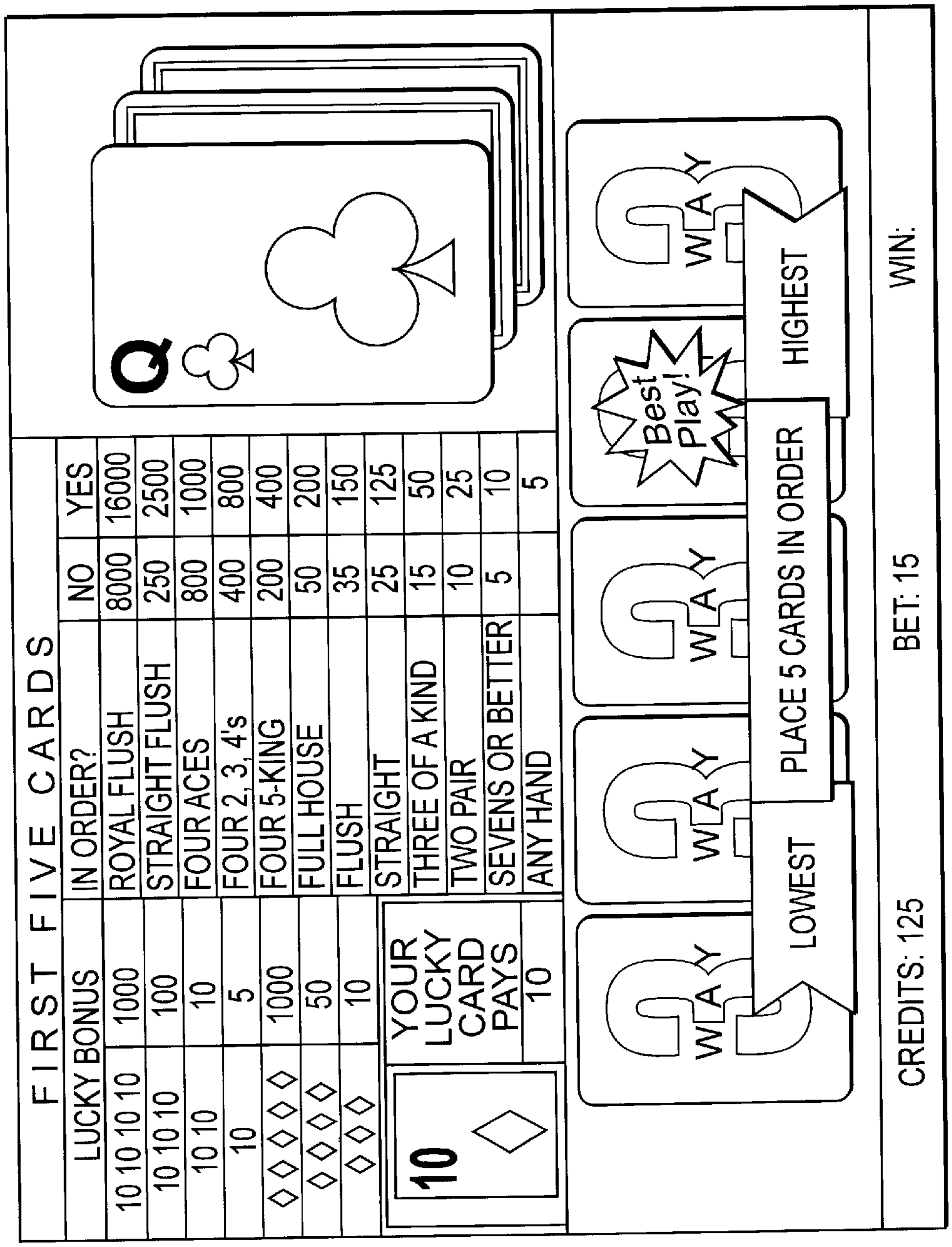
Figure 9C:
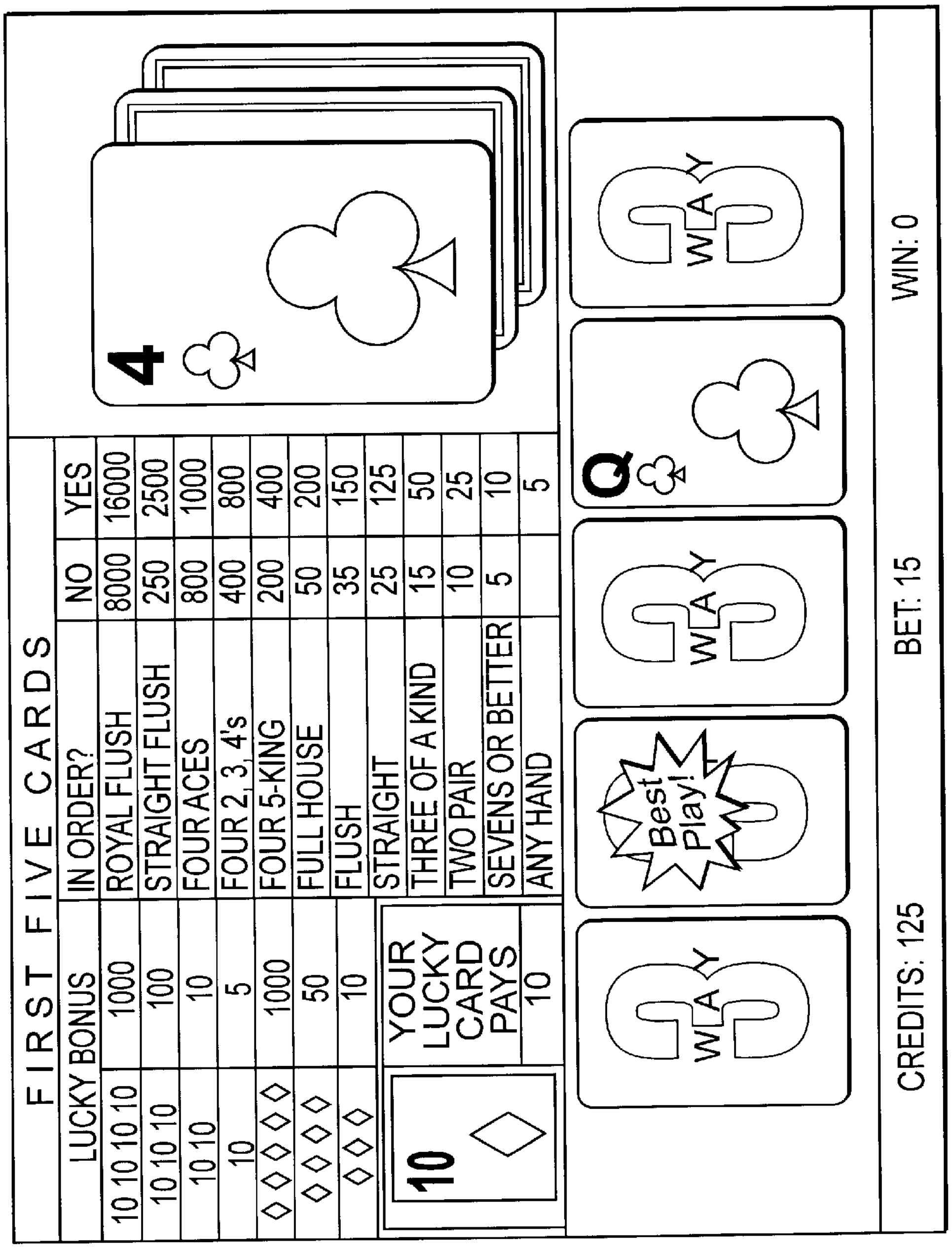
Figure 9D:
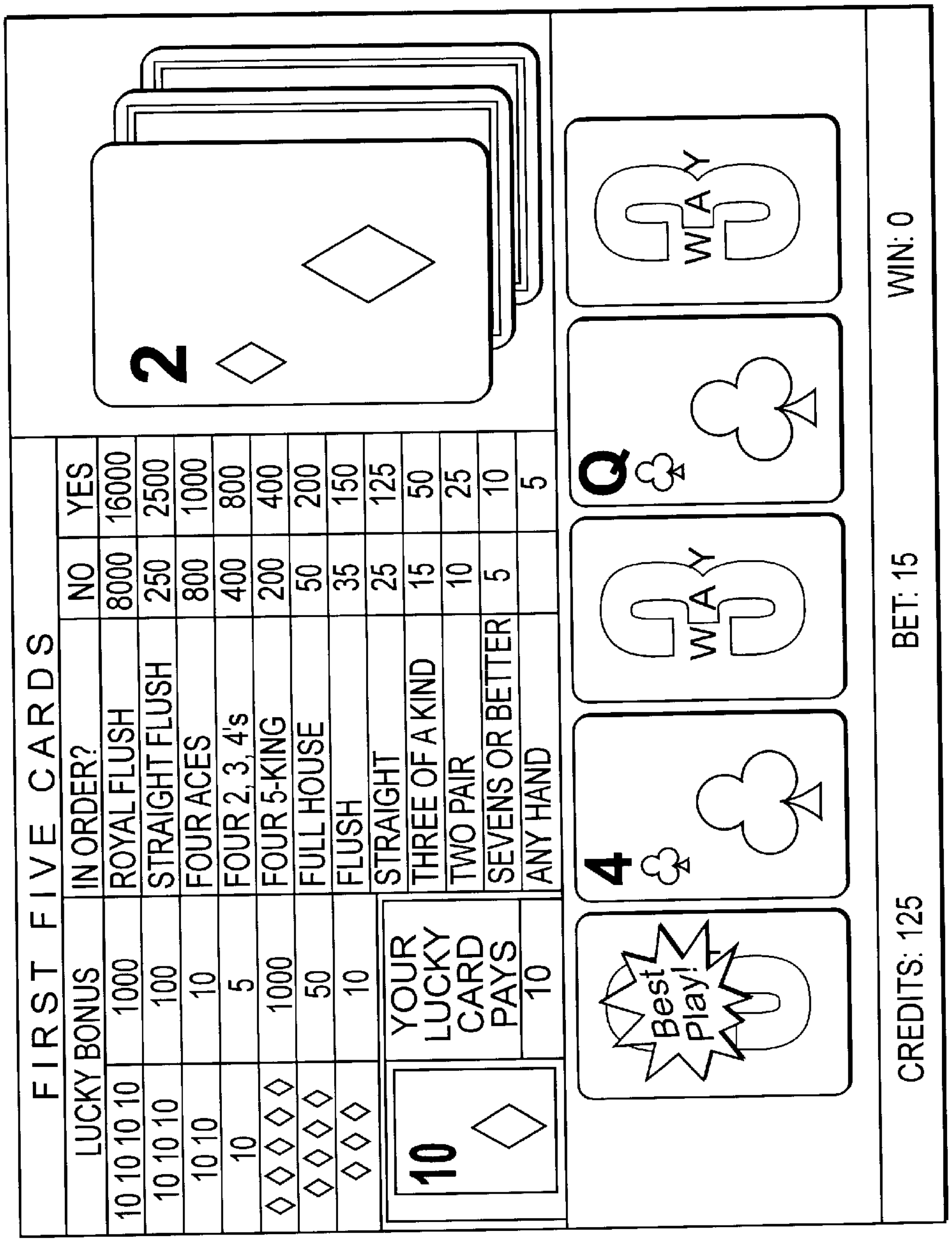
Figure 9E:
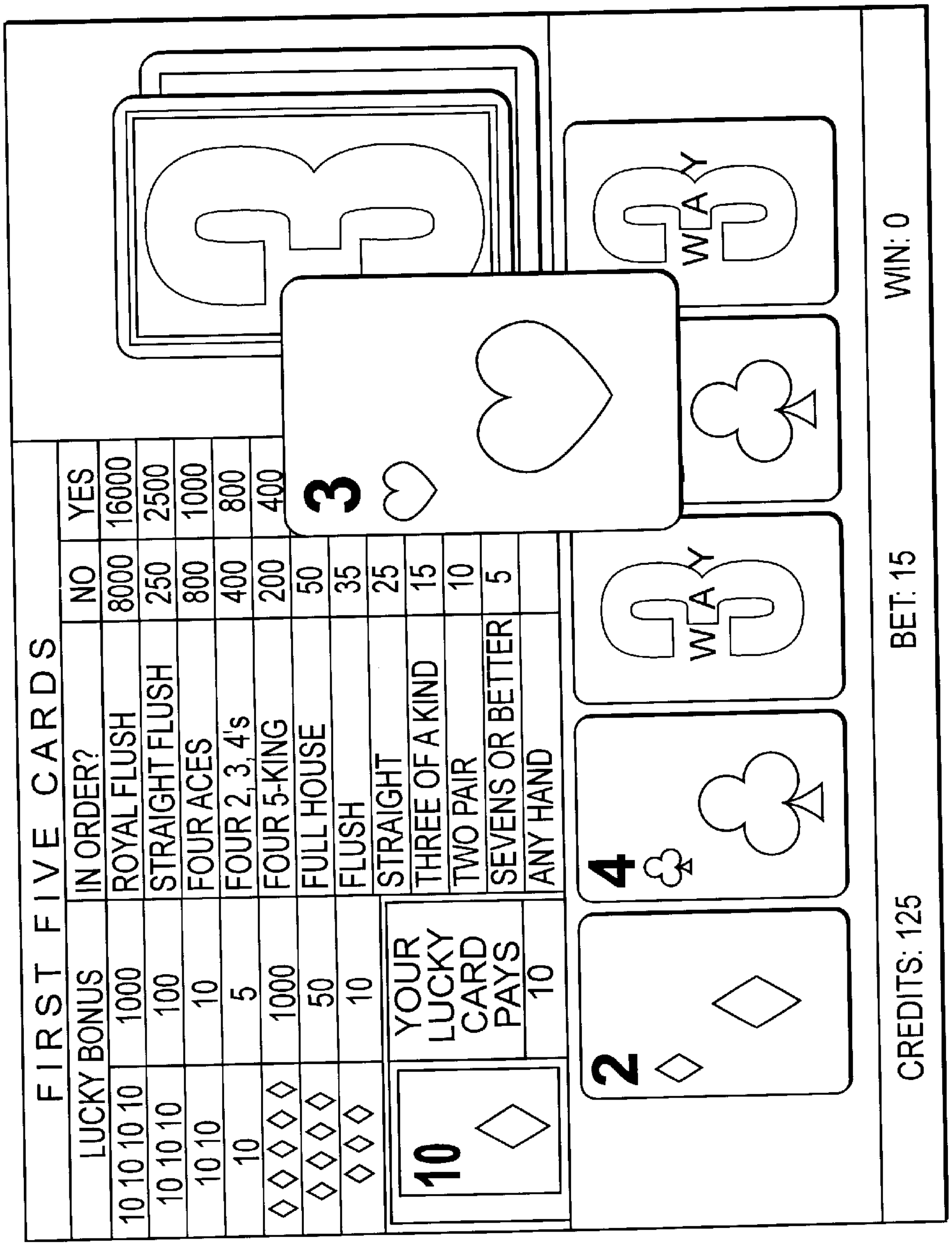
Figure 9F:
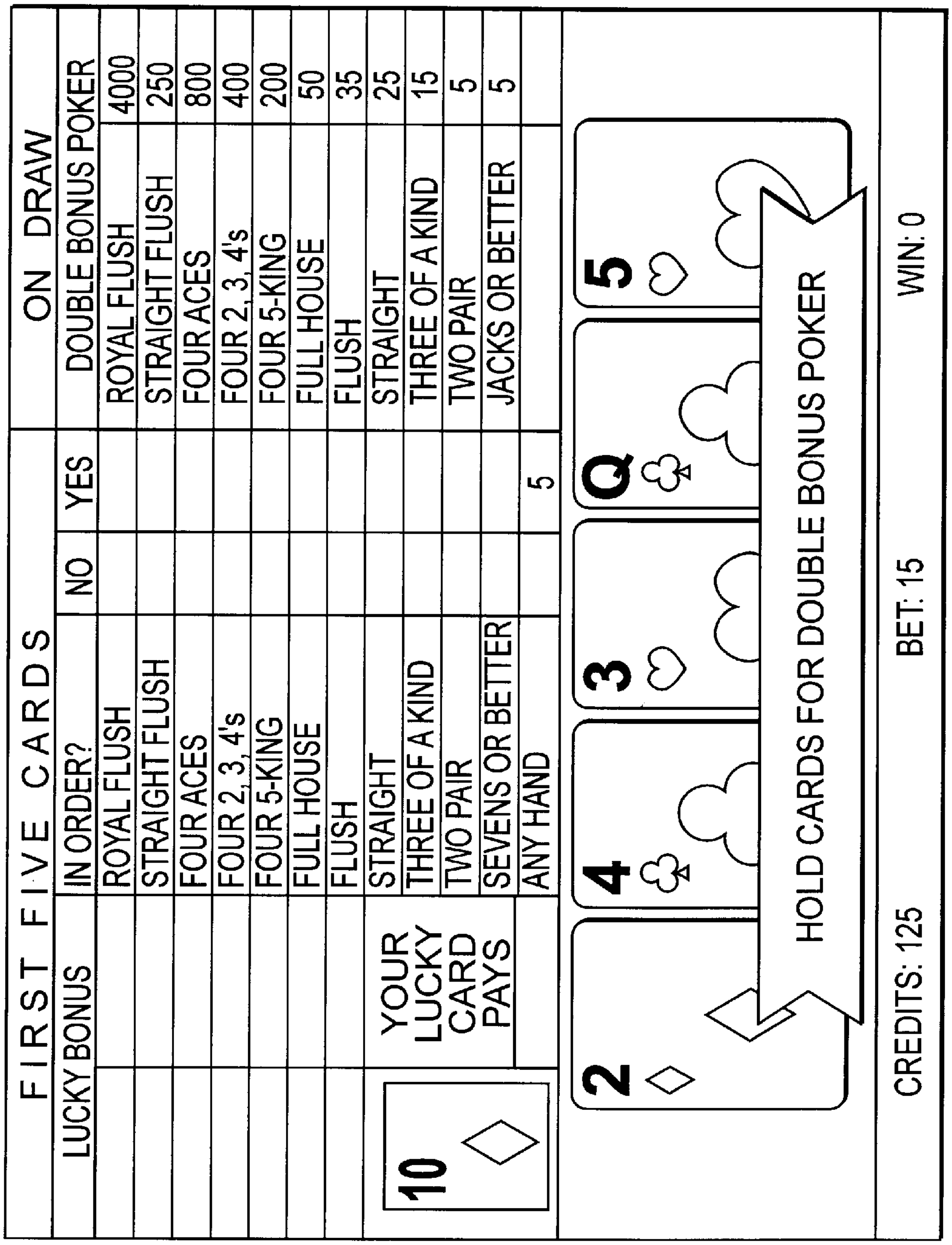
Figure 9G:
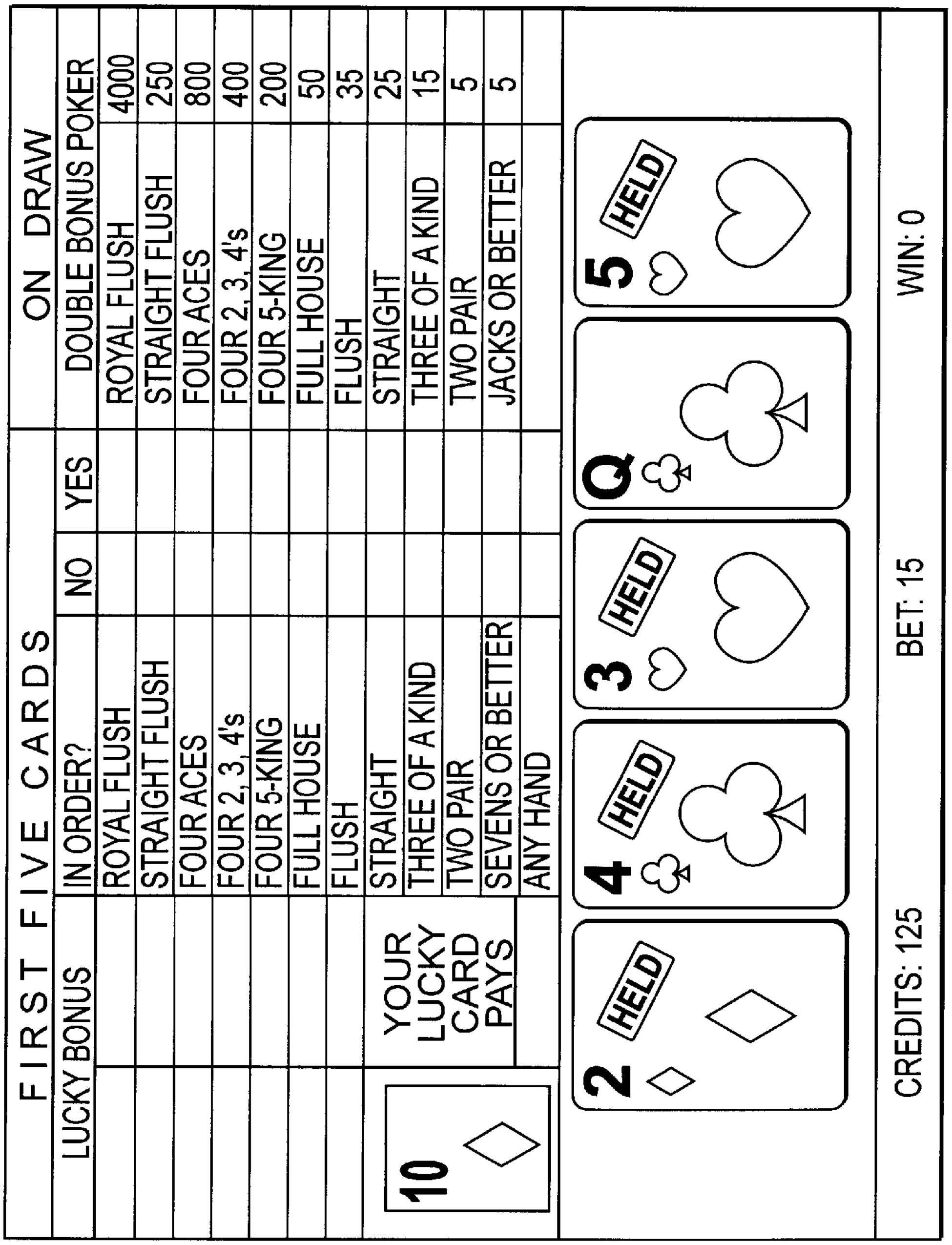
Figure 9H:
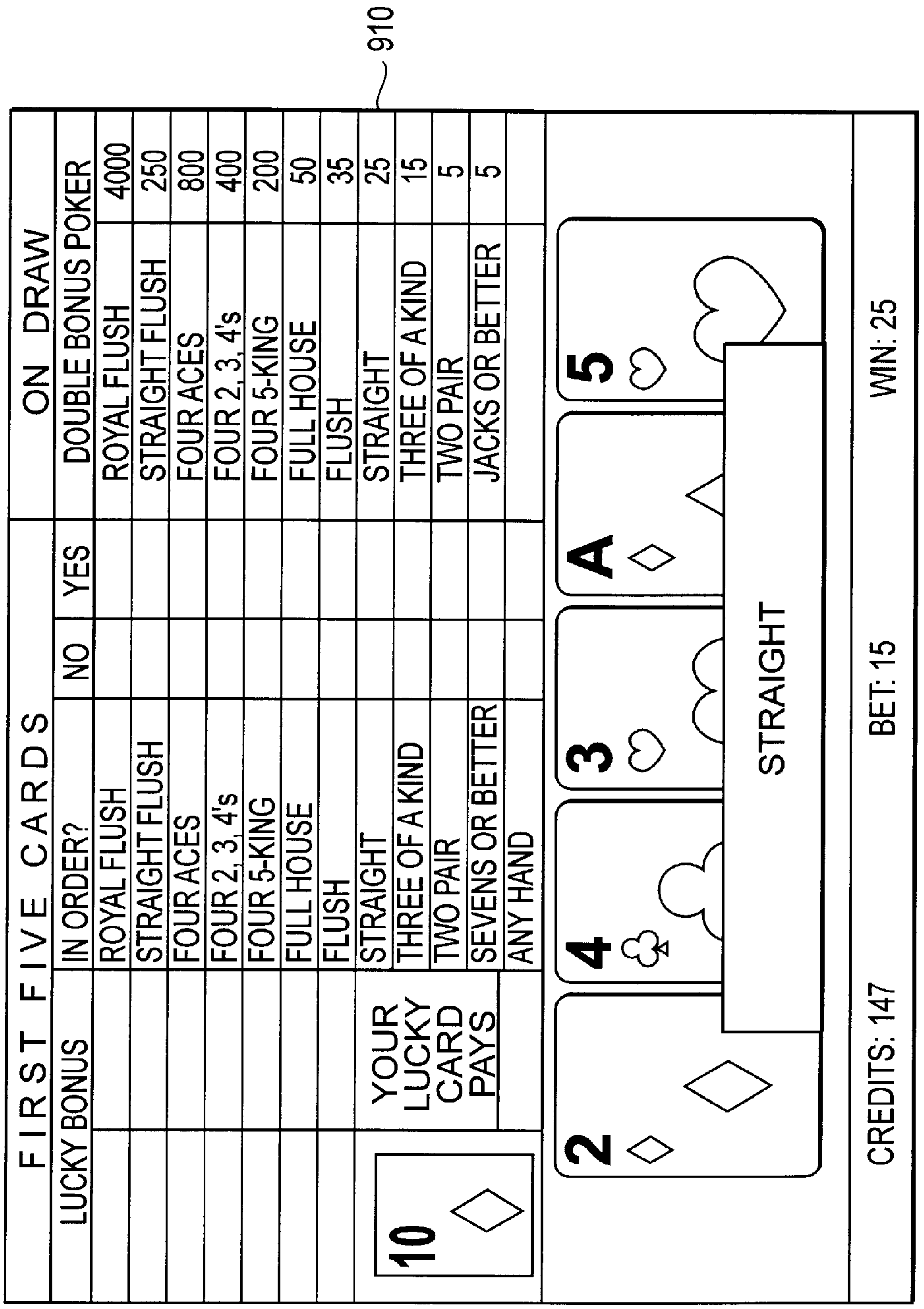

An example of yet another complete game is now described with reference to FIGS. 9*a*–9*h*. In this example, the player has, like the above examples, wagered five credits on each of the three games and selected a matching card of the 10 of diamonds. Referring to FIGS. 9*a*–9*e*, play then proceeds in the manner described above with the system dealing and the player placing cards until the hand is full. In this example, as evident from the hand depicted in FIG. 9*f*, no matching card or in-order payouts are earned. The player is then prompted to "Hold Cards for Double Bonus Poker". As shown in FIG. 9*g*, the player holds the 2 of diamonds, the 4 of clubs, the 3 of hearts, and the 5 of hearts, choosing to discard the Queen of clubs. In FIG. 9*h*, a replacement card Ace of diamonds is dealt leaving the player with a winning double bonus draw poker hand of a straight and a corresponding payout of 25 credits is awarded, as evidenced at 910.

Figure 10:
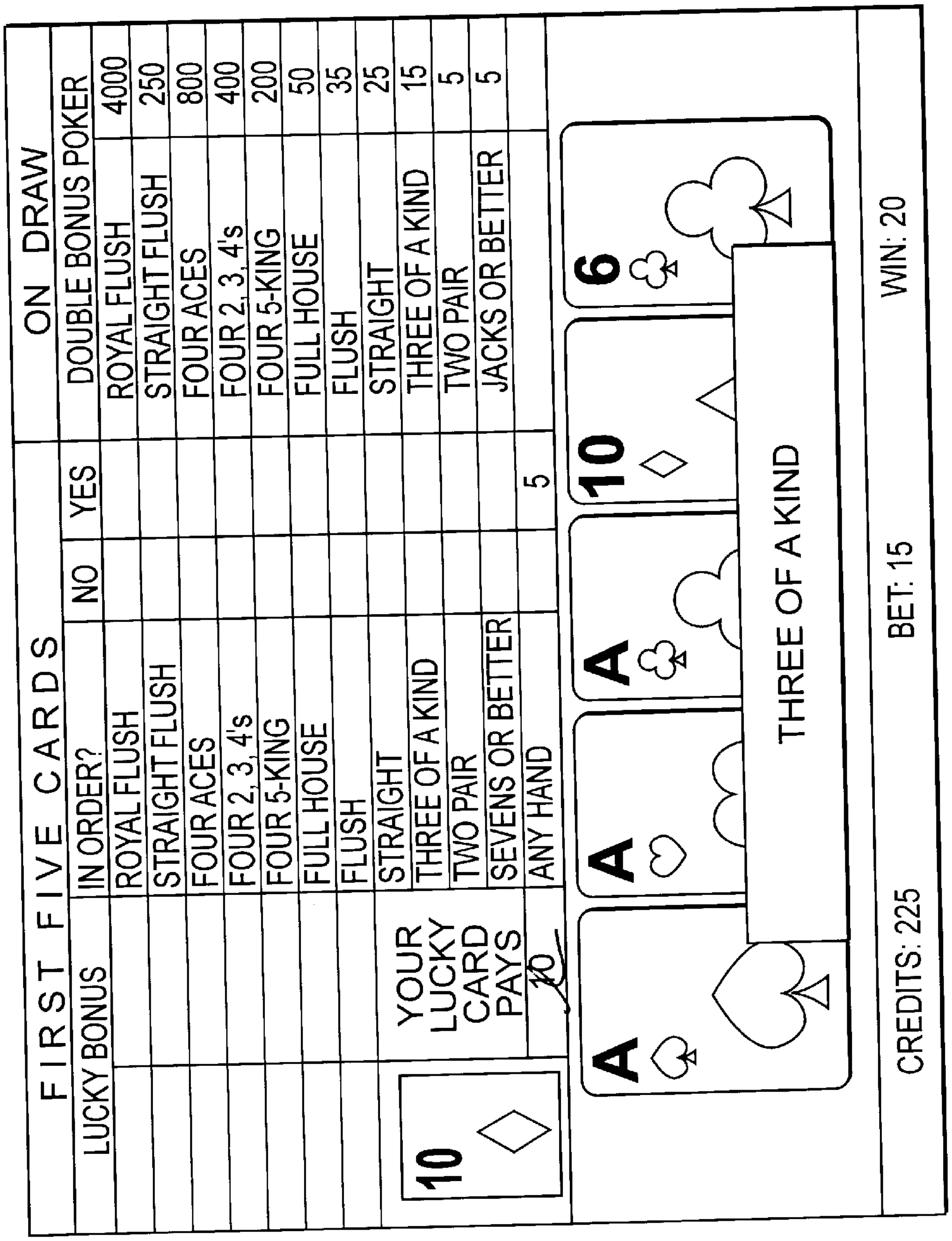
FIG. 10 illustrates an example of multiple payouts for an in-order bonus during an ordering game and for obtaining a three-of-a-kind during double bonus draw poker.
Figure 11:
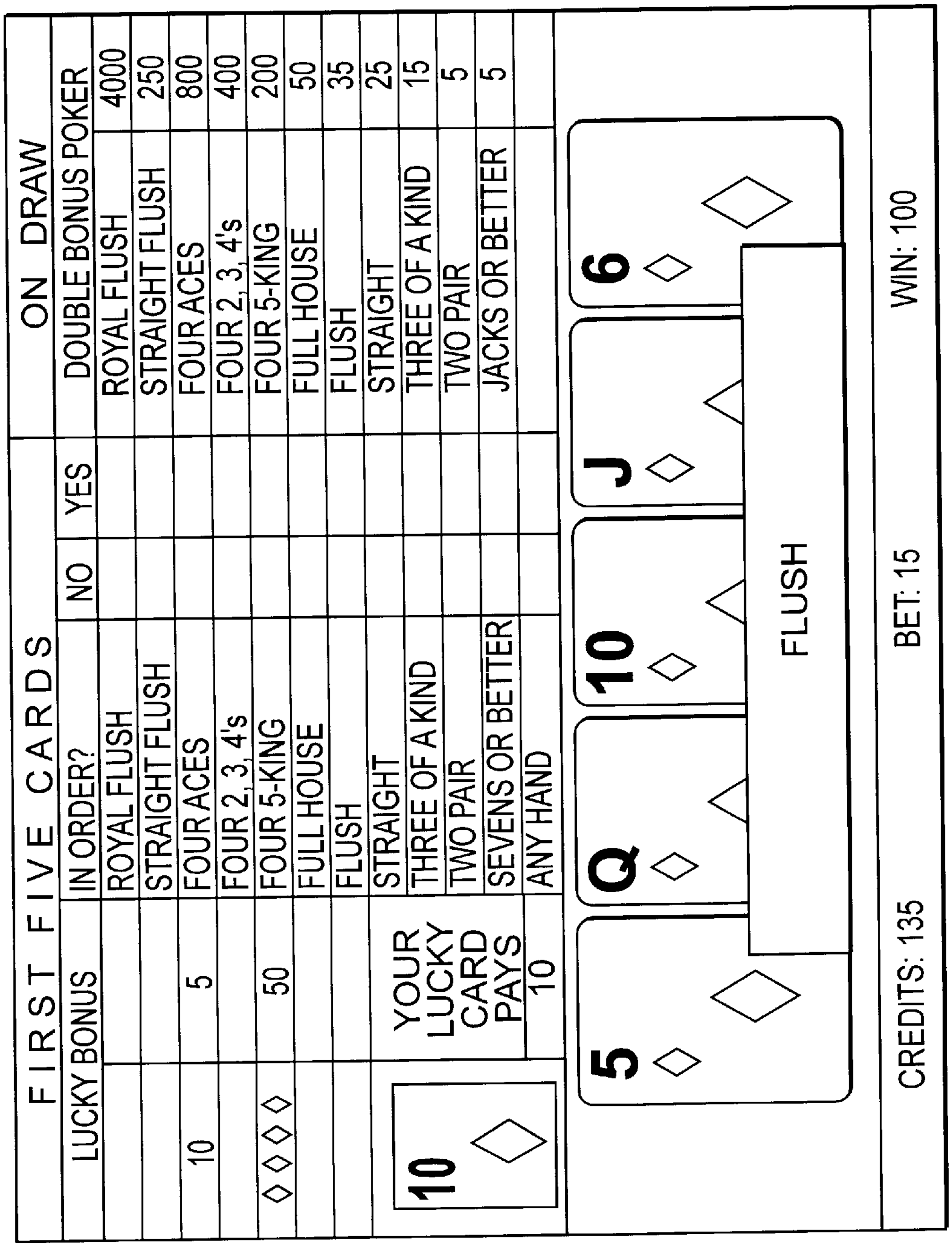
FIG. 11 illustrates an example of multiple payouts for obtaining a matching card during a matching game and for obtaining a flush during double bonus draw poker.

FIGS. 10 and 11 depict examples of two payout screens in accordance with the principles of the present invention. In FIG. 10, a payout for a three of a kind during double bonus draw poker is obtained in addition to an "any hand" in-order bonus. As such, the player receives a total payout of 20 credits. Also, it should be noted that the in-order payout was made according to a previous hand, which was altered in the draw during double bonus draw poker play, and not according to the hand currently depicted.

Similarly, FIG. 11 depicts a payout for obtaining a flush (35 credits) as well as for the matching card payouts of drawing the matching card (10 credits), for drawing five cards having suits matching the suit of the matching card (50 credits), and for drawing one card matching the matching card in rank (five credits). As a result, the player receives a total payout amount of 100 credits.

FIGS. 12*a*–12*f* illustrate the various combinations of games that may be played by the player. As discussed above, the player may opt to play a game simply by wagering on that particular game. Thus, to play the matching game and double bonus draw poker, the player would place bets only on the matching game and double bonus draw poker. Furthermore, in these examples, a particular game or component is indicated as being active (i.e., has received a wager) when its payout screen has been highlighted. Thus, a dark screen indicates that the game is not active or was not wagered on by the player.

Figure 12A:
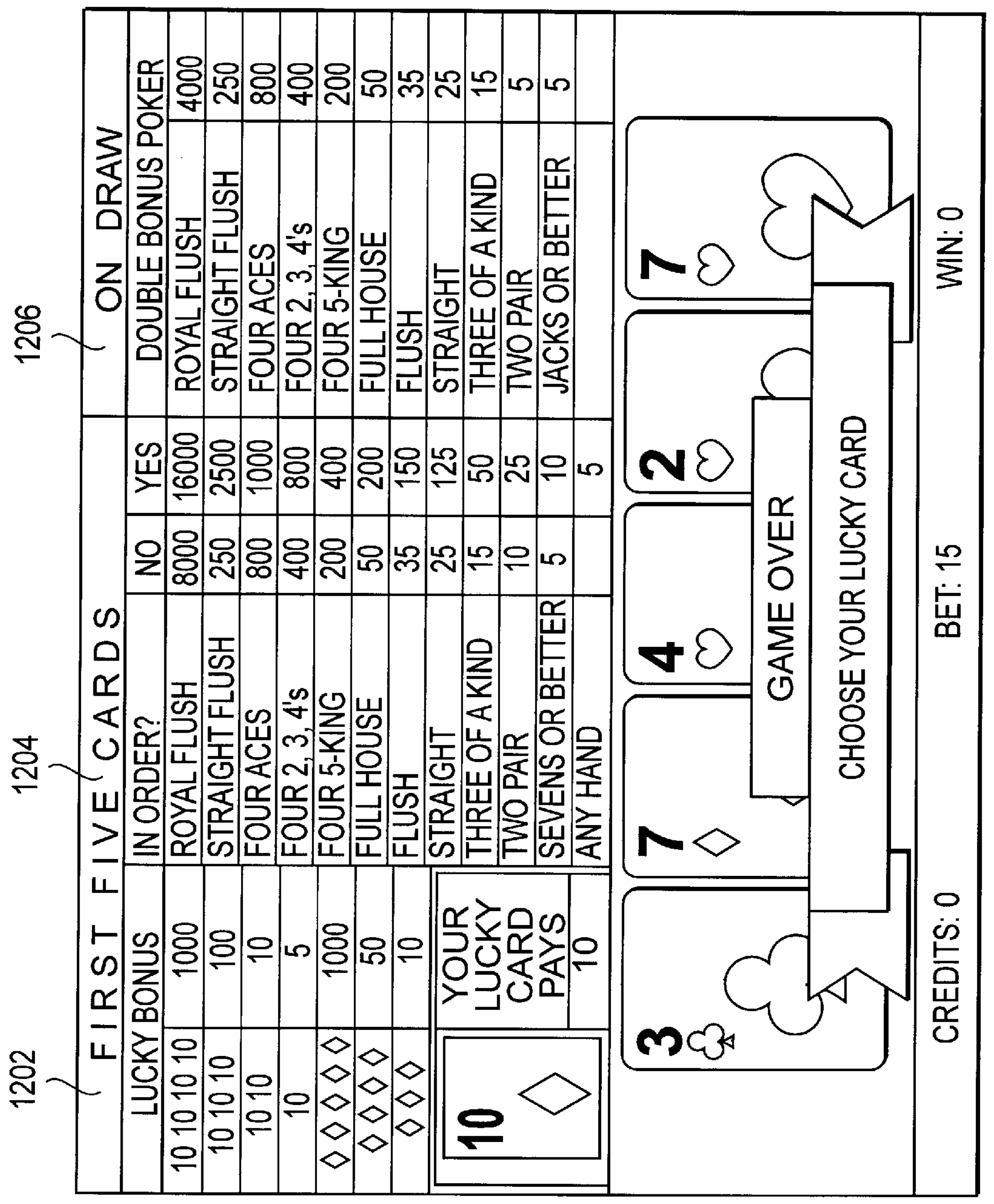
FIG. 12*a* illustrates an example of playing only a matching game and an ordering game during a game of modified poker.
Figure 12B:
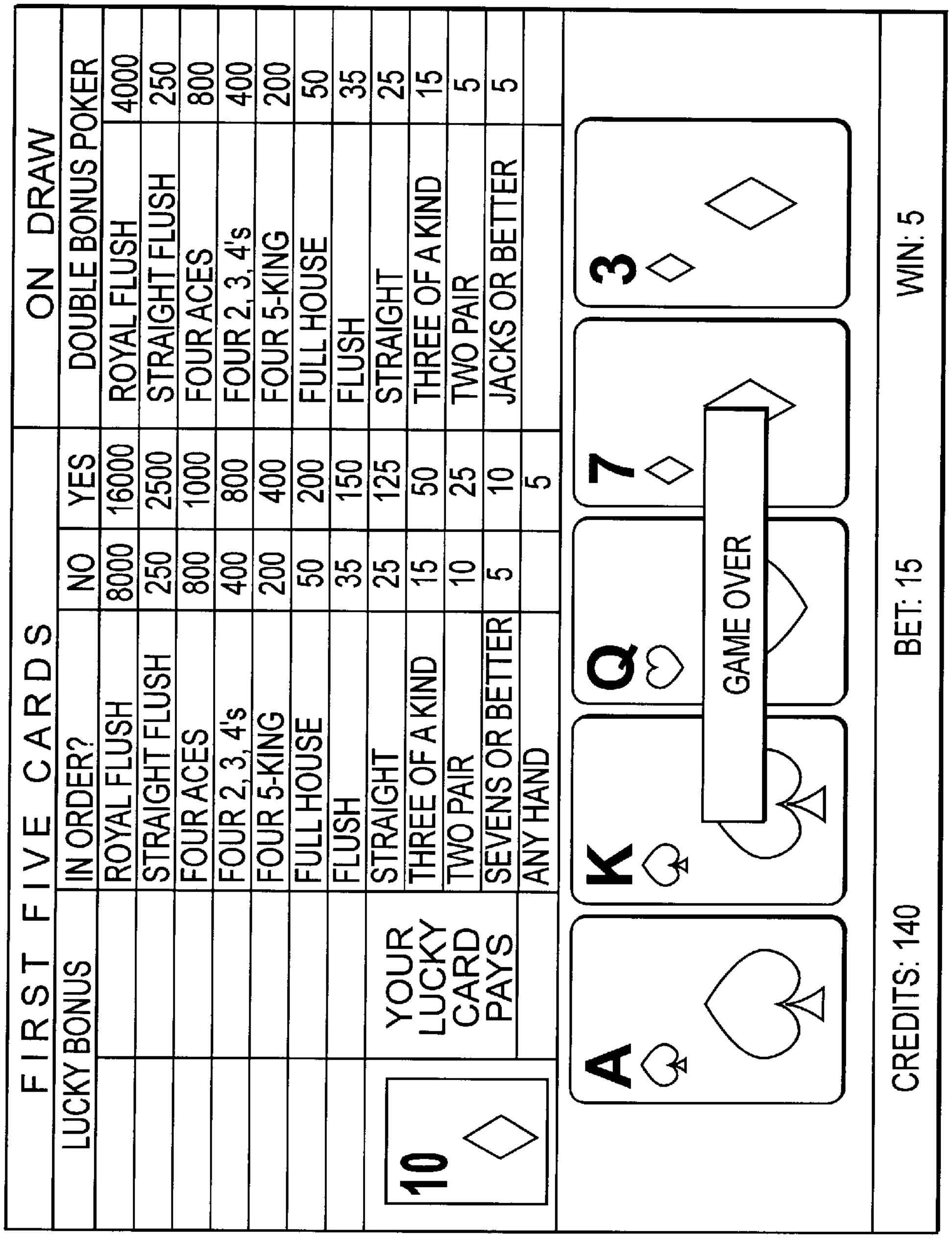
FIG. 12*b* illustrates an example of playing only an ordering game and double bonus draw poker during a game of modified poker.
Figure 12C:
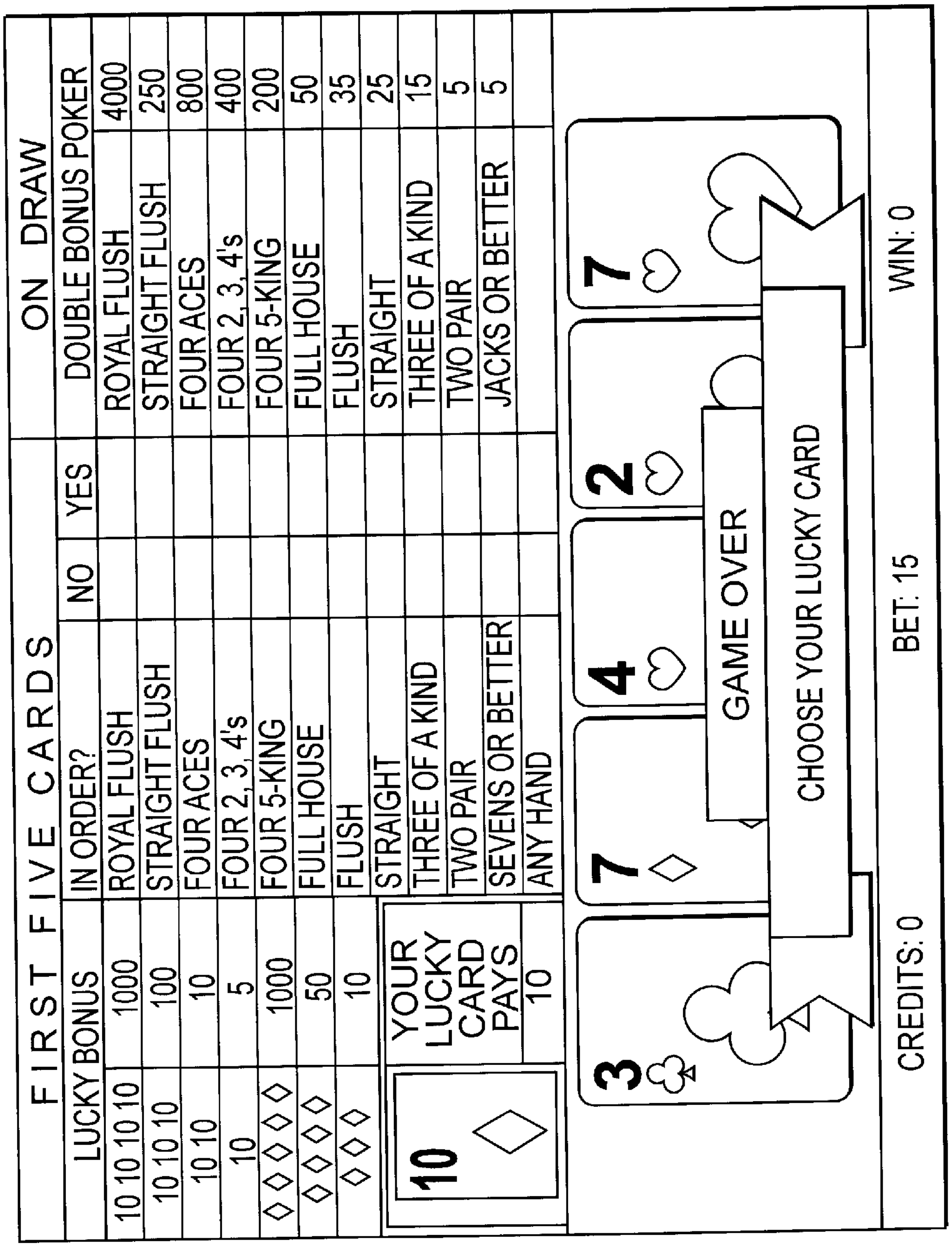
FIG. 12*c* illustrates an example of playing only a matching game and double bonus draw poker during a game of modified poker.
Figure 12D:
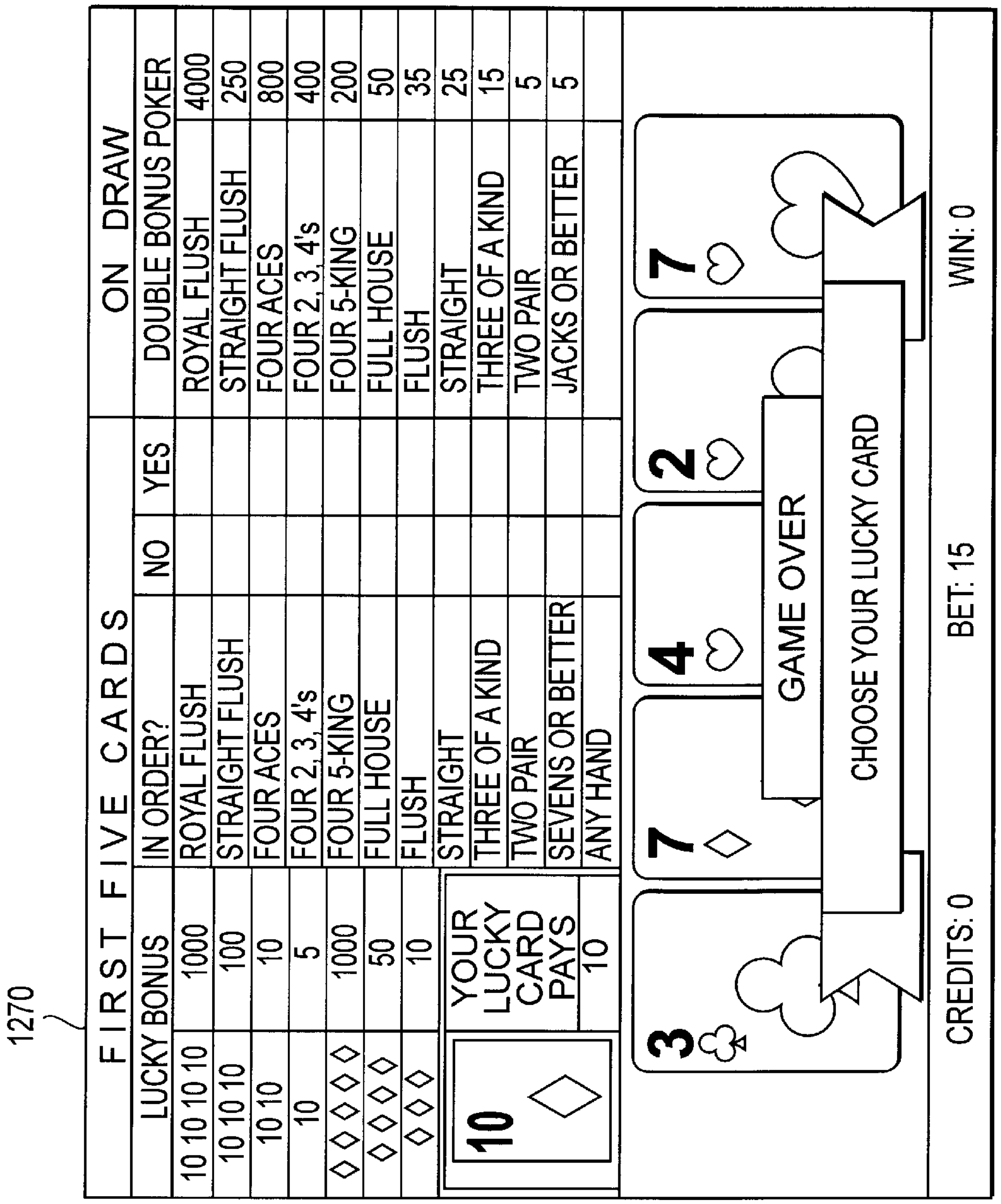
FIG. 12*d* illustrates an example of playing only a matching game during a game of modified poker.
Figure 12E:
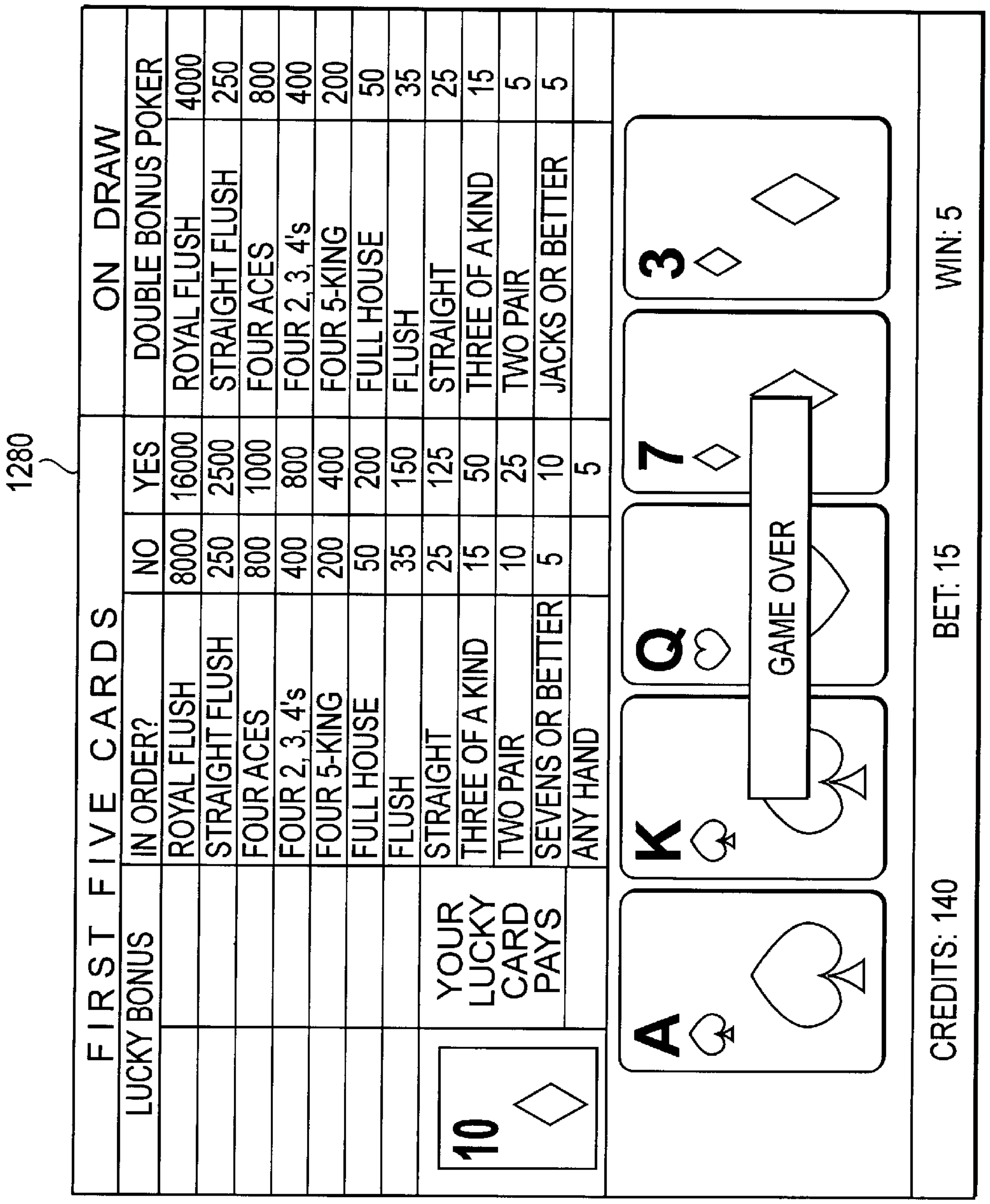
FIG. 12*e* illustrates an example of playing only an ordering game during a game of modified poker.
Figure 12F:
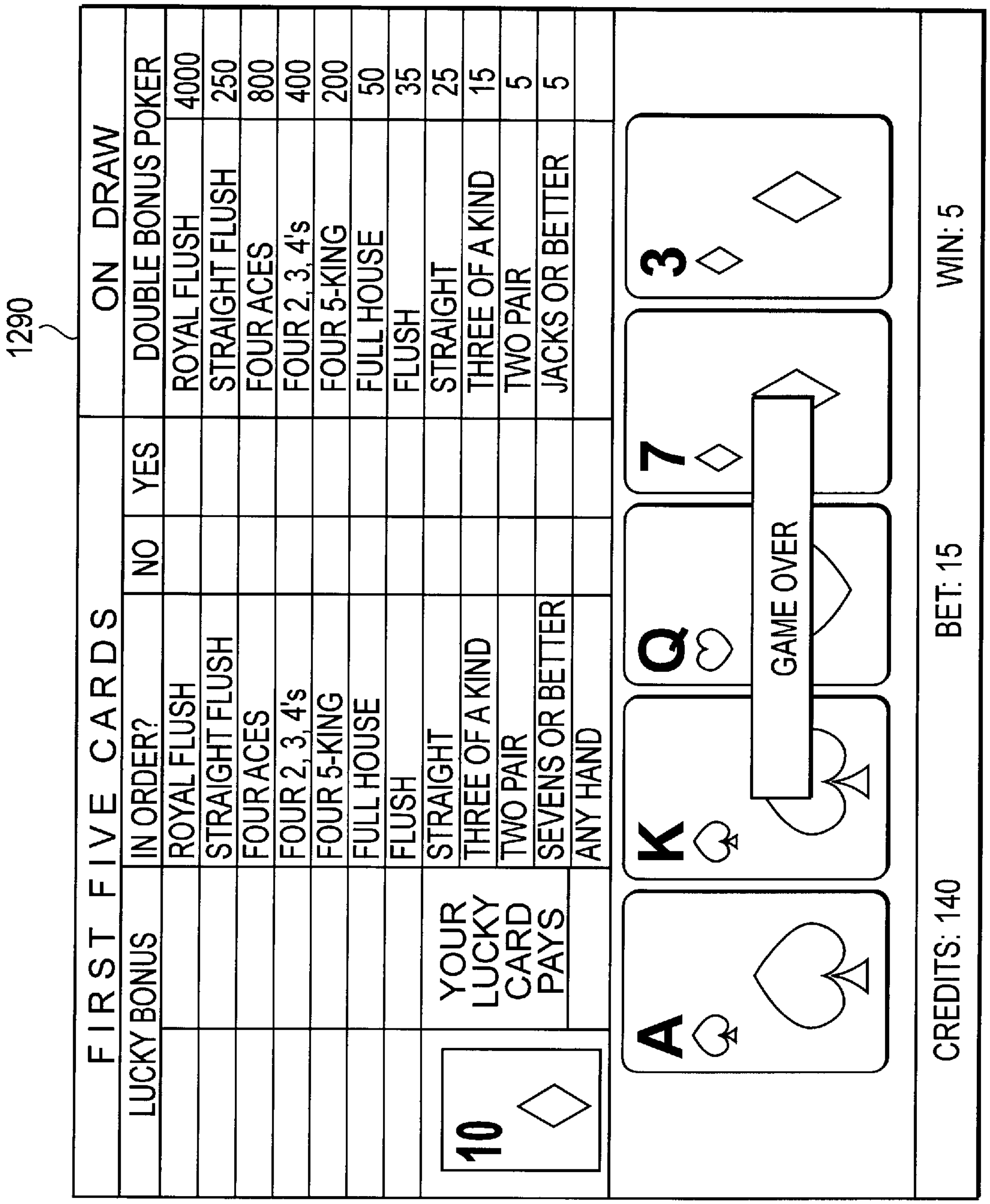
FIG. 12*f* illustrates an example of playing only double bonus draw poker during a game of modified poker.

Referring first to FIG. 12*a*, the matching bonus and in-order payout screens are highlighted with the double bonus draw poker payout screen remaining dark. As such, it is evident that the player has elected to play the matching bonus 1202 and the ordering game 1204 games and elected to skip double bonus draw poker 1206. Likewise, FIG. 12*b* indicates that the player has elected to play the ordering game and double bonus draw poker games and elected to skip the matching game; FIG. 12*c* indicates that the player has elected to play the matching game and double bonus draw poker games and elected to skip the ordering game; FIG. 12*d* indicates that the player has elected to play only the matching game and elected to skip both the ordering game and double bonus draw poker games; FIG. 12*e* indicates that the player has elected to play only the ordering game and elected to skip both the matching game and double bonus draw poker games; and FIG. 12*f* indicates that the player has elected to play only the double bonus draw poker game and elected to skip both the ordering game and the matching game.

Figure 13:
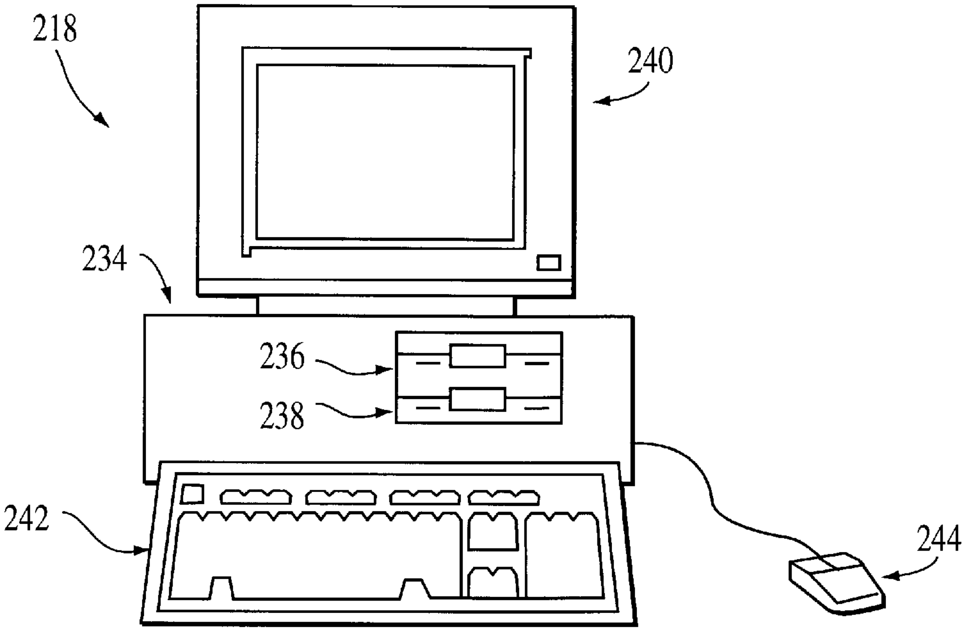
FIG. 13 illustrates one example of a central processing unit for implementing a computer process in accordance with a computer implemented stand-alone embodiment of the present invention.

Although the techniques of the present invention as shown as being implemented on the systems or gaming machine described above, it is to be understood that other systems are equally capable of implementing the above features. For example, even though the above systems are intended to be standard useable stand-alone casino gaming devices, it is also conceivable that the instant invention may be implemented in a computing unit such as that depicted in FIG. 13. In this regard, FIG. 13 is an illustration of a main central processing unit which is also capable of implementing some or all of the computer processing in accordance with a computer implemented embodiment of the present invention. The procedures described herein are presented in terms of program procedures executed on, for example, a computer or network of computers.

Viewed externally in FIG. 13, a computer system designated by reference numeral 218 has a computer 234 having disk drives 236 and 238. Disk drive indications 236 and 238 are merely symbolic of a number of disk drives which might be accommodated by the computer system. Typically, these would include a floppy disk drive 236, a hard disk drive (not shown externally) and a CD ROM indicated by slot 238. The number and type of drives vary, typically with different computer configurations. Disk drives 236 and 238 are in fact optional, and for space considerations, are easily omitted from the computer system used in conjunction with the production process/apparatus described herein.

The computer system also has an optional display 240 upon which information, such as the screens illustrated in FIGS. 7–12, may be displayed. In some situations, a keyboard 242 and a mouse 244 are provided as input devices through which a player's actions may be inputted, thus allowing input to interface with the central processing unit 234. Then again, for enhanced portability, the keyboard 242 is either a limited function keyboard or omitted in its entirety. In addition, mouse 244 optionally is a touch pad control device, or a track ban device, or even omitted in its entirety as well, and similarly may be used to input a player's selections. In addition, the computer system also optionally includes at least one infrared transmitter and/or infrared received for either transmitting and/or receiving infrared signals, as described below.

Figure 14:
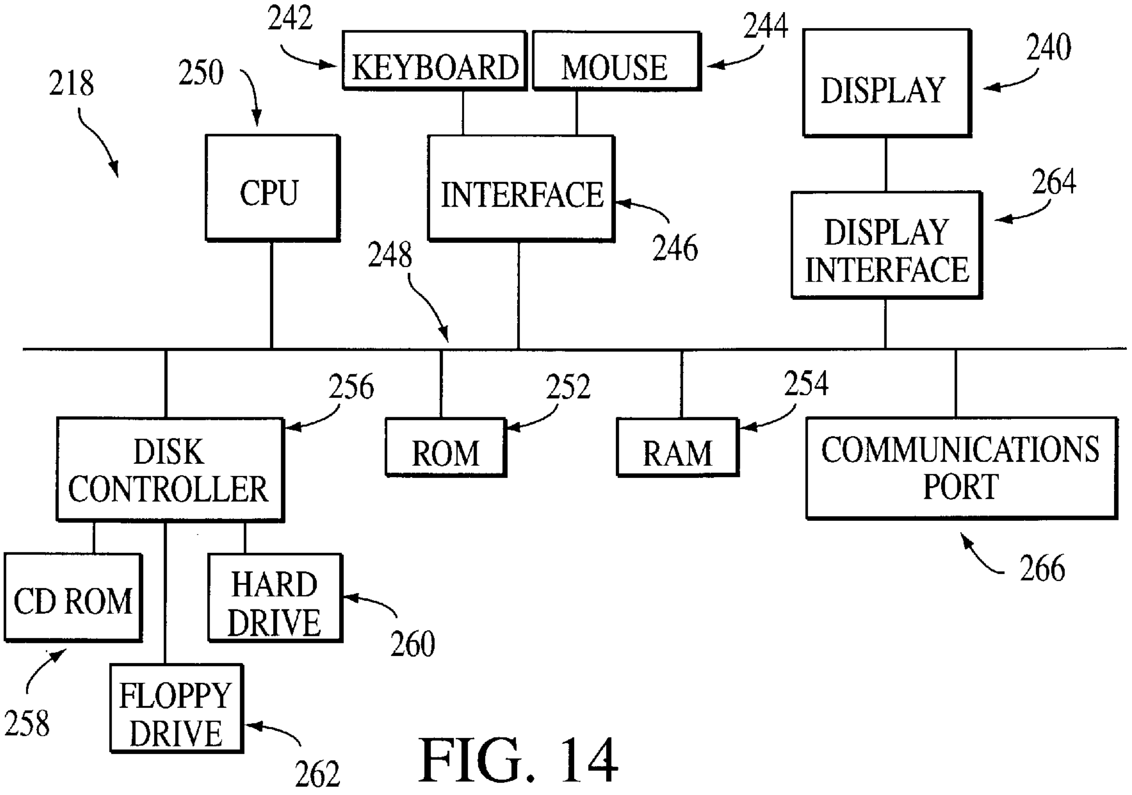
FIG. 14 illustrates one example of a block diagram of internal hardware of the central processing unit of FIG. 13.

FIG. 14 illustrates a block diagram of the internal hardware of the computer system 218 of FIG. 13. A bus 248 serves as the main information highway interconnecting the other components of the computer system 218. CPU 250 is the central processing unit of the system, performing calculations and logic operations required to execute a program. Read only memory (ROM) 252 and random access memory (RAM) 254 constitute the main memory of the computer. Disk controller 256 interfaces one or more disk drives to the system bus 248. These disk drives are, for example, floppy disk drives such as 262, or CD ROM or DVD (digital video disks) drive such as 258, or internal or external hard drives 260. As indicated previously, these various disk drives and disk controllers are optional devices.

A display interface 264 interfaces display 240 and permits information from the bus 248 to be displayed on the display 240. Again as indicated, display 240 is also an optional accessory. For example, display 240 could be substituted or omitted. Communications with external devices, for example, the other components of the system described herein, occur utilizing communication port 266. For example, optical fibers and/or electrical cables and/or conductors and/or optical communication (e.g., infrared, and the like) and/or wireless communication (e.g., radio frequency (RF), and the like) can be used as the transport medium between the external devices and communication port 266. Peripheral interface 246 interfaces the keyboard 242 and the mouse 244, permitting input data to be transmitted to the bus 248. In addition to the standard components of the computer, the computer also optionally includes an infrared transmitter and/or infrared receiver. Infrared transmitters are optionally utilized when the computer system is used in conjunction with one or more of the processing components/stations that transmits/receives data via infrared signal transmission. Instead of utilizing an infrared transmitter or infrared receiver, the computer system optionally uses a low power radio transmitter and/or a low power radio receiver. The low power radio transmitter transmits the signal for reception by components of the production process, and receives signals from the components via the low power radio receiver. The low power radio transmitter and/or receiver are standard devices in industry.

Figure 15:
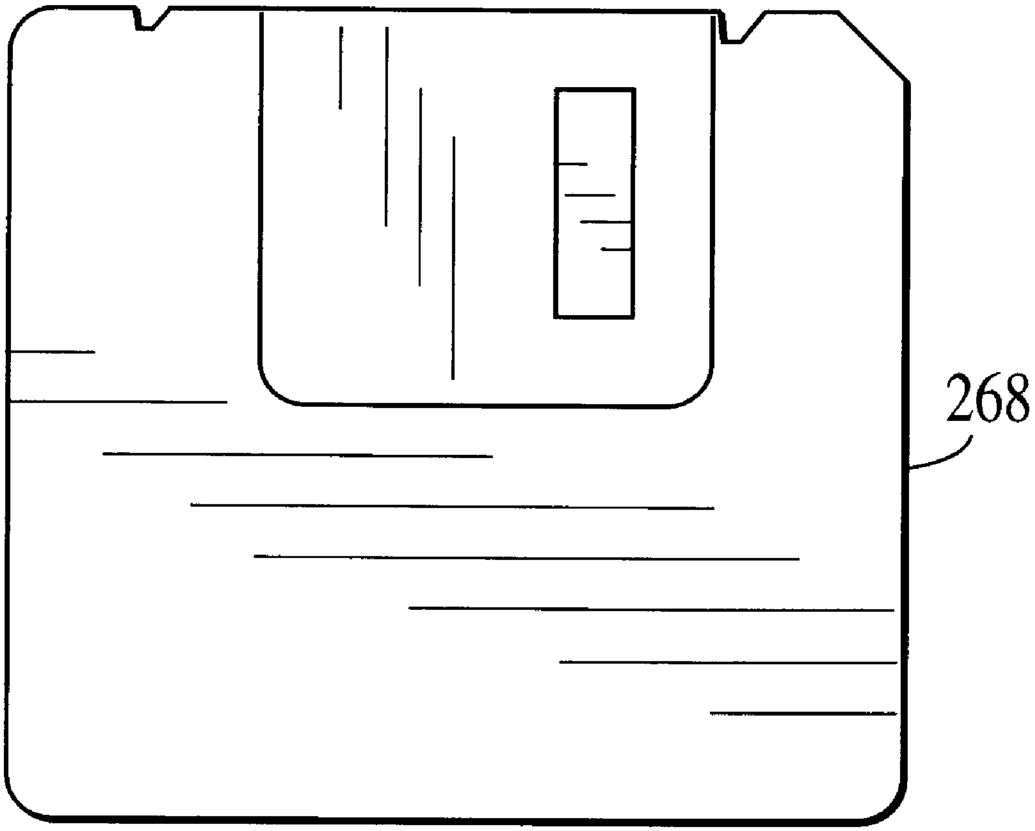
FIG. 15 illustrates one example of a memory medium which may be used for storing a computer implemented process of the present invention.

FIG. 15 is an illustration of an exemplary memory medium 268 which can be used with disk drives illustrated in FIGS. 13 and 14. Typically, memory media such as floppy disks, or a CD ROM, or a digital video disk will contain, for example, a multi-byte locale for a single byte language and the program information for controlling the computer to enable the computer to perform the functions described herein. Alternatively, ROM 252 and/or RAM 254 illustrated in FIGS. 13 and 14 can also be used to store the program information that is used to instruct the central processing unit 250 to perform the operations associated with the production process.

Although computer system 218 is illustrated having a single processor, a single hard disk drive and a single local memory, the system 218 is optionally suitably equipped with any multitude or combination of processors or storage devices. Computer system 218 is, in point of fact, able to be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993), and conventional data communications are more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration is, for example, arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and, in particular, CPU 250, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 16:
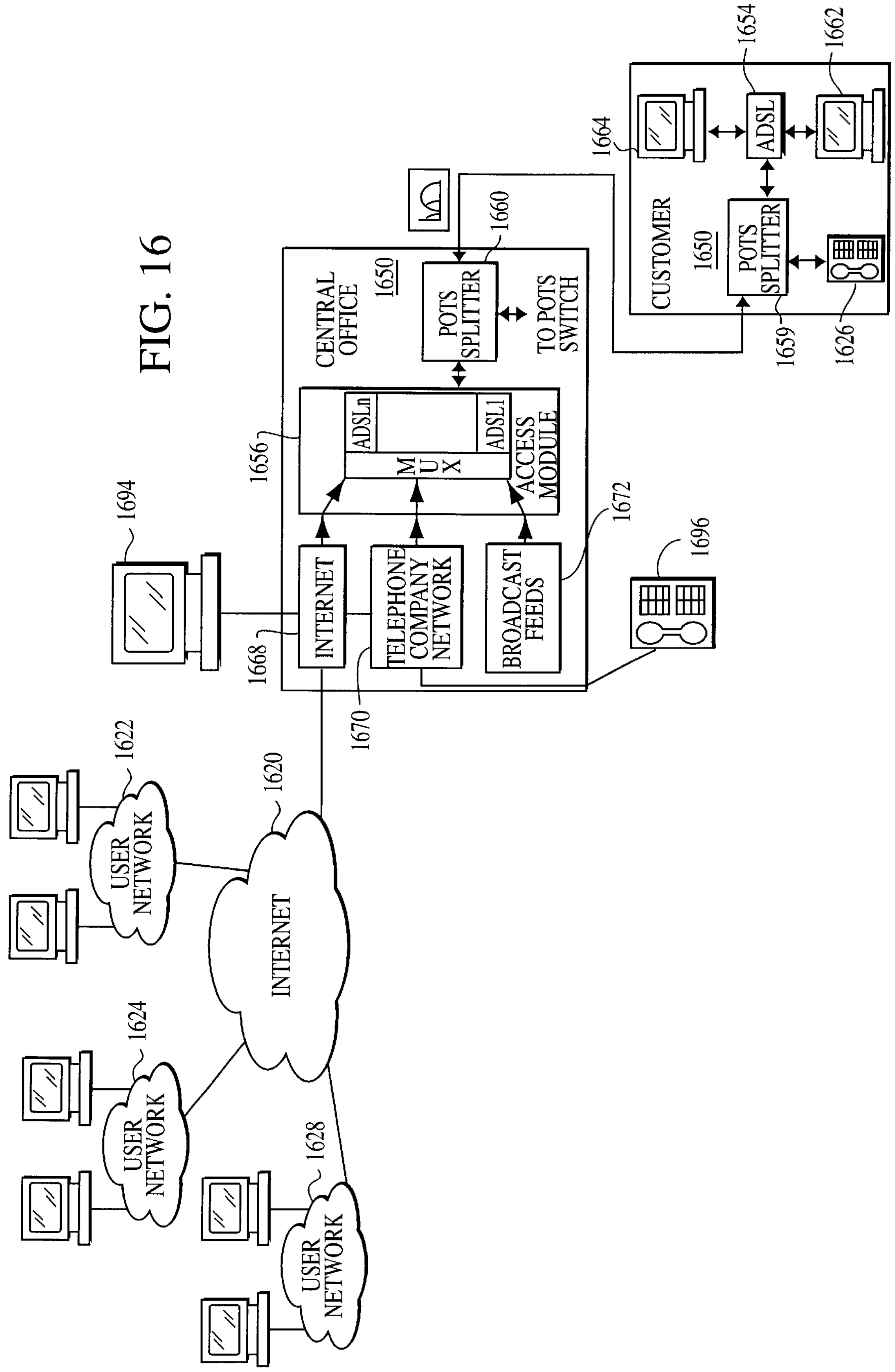
FIG. 16 illustrates an example of a combined Internet, POTS, and ADSL architecture which may be used with the present invention.

FIG. 16 is an illustration of the architecture of the combined Internet, POTS (plain, old, telephone service), and ADSL (asymmetric, digital, subscriber line) for use in accordance with the principles of the present invention. Furthermore, it is to be understood that the use of the Internet, ADSL, and POTS are for exemplary reasons only and that any suitable communications network may be substituted without departing from the principles of the present invention. This particular example is briefly discussed below.

In FIG. 16, to preserve POTS and to prevent a fault in the ADSL equipment 1654, 1656 from compromising analog voice traffic 1626, 1696 the voice part of the spectrum (the lowest 4 kHz) is separated from the rest by a passive filter, called a POTS splitter 1658, 1660. The rest of the available bandwidth—from about 10 kHz to 1 MHz—carries data at rates up to 6 bits per second for every hertz of bandwidth from data equipment 1662, 1664, and 1694. The ADSL equipment 1656 then has access to a number of destinations including significantly the Internet 1620, and other destinations 1670, 1672.

To exploit the higher frequencies, ADSL makes use of advanced modulation techniques, of which the best known is the discrete multitone (DMT) technology. As its name implies, ADSL transmits data asymmetrically—at different rates upstream toward the central office 1652 and downstream toward the subscriber 1650.

Cable television providers are providing analogous Internet service to PC users over their TV cable systems by means of special cable modems. Such modems are capable of transmitting up to 30 Mb/s over hybrid fiber/coax system, which use fiber to bring signals to a neighborhood and coax to distribute it to individual subscribers.

Cable modems come in many forms. Most create a downstream data stream out of one of the 6-MHz TV channels that occupy spectrum above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream. Then Internet architecture 1620 and ADSL architecture 1654, 1656 may also be combined with, for example, user networks 1622, 1624, and 1628.

In accordance with the principles of the present invention, in one example, a main game server implementing the process of the invention may be located on one computing node or terminal (e.g., on user network 1622, or system 1694). Then, various players may interface with the main gamer server via, for instance, the ADSL equipment discussed above, and play the combination of modified poker games from remotely located PCs. In this manner, a game owner may be able to attract players located at other parts of the country or planet.

Furthermore, the combination of modified poker games of the present invention may also be implemented manually. For instance, it is possible to play the game of the present invention as a standard table game utilizing a dealer. In addition, the game may also be played in a tournament style manner with, for instance, multiple player competing substantially simultaneously against one-another.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of playing a video card game, said method comprising the steps of:

(a) dealing a card having at least a rank from at least one deck of cards to a player, for placement into one position of a card hand having a predetermined number of positions;

(b) arranging, by said player, said dealt card in only one position of said predetermined number of positions in said card hand responsive to an ordered ranking of one of lowest ranking to highest ranking and highest ranking to lowest ranking and a best play suggestion, and placing said dealt card into said position and designating said position as not available for receiving another card;

(c) repeating steps (a) and (b) in order until all of said predetermined number of positions have been filled with said dealt cards;

(d) awarding a first portion of a payout or a first payout to said player if said dealt cards of said card hand have been arranged in said ordered ranking; and (e) awarding a second portion of said payout or a second payout to said player if said dealt cards of said card hand comprise a predetermined combination of cards resulting in a payable hand as determined according to a winning hand payout schedule.

2. The method of claim 1, wherein said winning hand payout schedule comprises a standard five card stud poker winning hand schedule.

3. The method of claim 1, wherein each of said positions of said card hand is available for receiving a card at commencement of said game, and wherein said step (b) of arranging further comprises selecting, by said player, one available position of said card hand for placement of said dealt card, placing said dealt card into said selected position, and designating said selected position as not being available for receiving said another card.

4. The method of claim 1, wherein said card game is implemented on a server interconnected via a communication network or an Internet to one or more remotely located computing nodes, such that said card game may be played at said remotely located computing nodes.

5. The method of claim 1, wherein said card game may be played substantially simultaneously by a plurality of players, such that said players compete against one another.

6. The method of claim 1, wherein said cards are dealt from one deck of cards comprising fifty-two cards, such that said video card game is played with a single deck of cards.

7. The method of claim 1, wherein said cards are dealt from more than one deck of cards.

8. The method of claim 1, wherein said cards are dealt such that said video card game uses at least one deck of cards.

9. The method of claim 1, wherein a single winning hand may be utilized to win multiple payouts.

10. A method of playing a video card game, said method comprising the steps of:

(a) dealing a card having at least a rank;

(b) arranging said dealt card in only one position in a card hand having a predetermined number of available positions and responsive to a best play suggestion, and placing said dealt card into said position and designating said selected as not available for receiving another card;

(c) repeating steps (a) and (b) in order until said predetermined number of available positions have been filled with said dealt cards; and (d) awarding at least one payout if said dealt cards in said positions have been arranged in at least one predetermined ranking order.

11. The method of claim 10, wherein said cards each have a rank, and wherein said at least one predetermined ranking order comprises one of an increasing rank order and a decreasing rank order.

12. The method of claim 10, further comprising the step of awarding another payout if said dealt cards meet predetermined criteria.

13. The method of claim 12, wherein said predetermined criteria comprise at least one of: a royal flush, a straight flush, four aces, four twos, four threes, four fours, four fives and a king, a full house, a flush, a straight, three of a kind, two pairs, and a pair of sevens or better.

14. The method of claim 10, wherein each of said positions of said card hand is available for receiving a card at commencement of said game, and wherein said step (b) of arranging further comprises selecting one available position of said card hand for placement of said dealt card, placing said dealt card into said selected position, and designating said selected position as not being available for receiving said another card.

15. The method of claim 10, wherein said card game is implemented on a server interconnected via a communication network or an Internet to one or more remotely located computing nodes, such that said card game may be played at said remotely located computing nodes.

16. The method of claim 10, wherein said card game may be played substantially simultaneously by a plurality of players, such that said players compete against one another.

17. The method of claim 10, wherein said cards are dealt from one deck of cards comprising fifty-two cards, such that said video card game is played with a single deck of cards.

18. The method of claim 10, wherein said cards are dealt from more than one deck of cards.

19. The method of claim 10, wherein said cards are dealt such that said video card games utilizes at least one deck of cards.

20. The method of claim 10, wherein a single winning hand may be utilized to win multiple payouts.

21. A method of playing a video card game, said method comprising the steps of:

(a) selecting a target card having at least one target characteristic;

(b) dealing a card having at least one card characteristic;

(c) arranging said dealt card in only one position in a card hand having a predetermined number of available positions responsive to a best play suggestion, and placing said dealt card into said position and designating said position as not available for receiving another card;

(d) repeating steps (b) and (c) in order until said predetermined number of available positions have been filled with said dealt cards;

(e) awarding a first payout if said dealt cards in said positions have been arranged in a predetermined card characteristic order;

(f) awarding a second payout if at least one card characteristic of at least one of said dealt cards matches said at least one target characteristic; and (g) awarding a third payout if said dealt cards in said card hand meet predetermined criteria.

22. The method of claim 21, wherein said step of selecting comprises selecting a target card having more than one target characteristic and wherein said step of awarding a second payout comprises awarding a bonus payout if more than one characteristic of at least one of said dealt cards matches said more than one target characteristic of said target card.

23. The method of claim 21, further comprising:

(h) utilizing said card hand to play another game.

24. The method of claim 23, wherein said another game comprises:

optionally discarding one or more cards of said card hand;

replacing any discarded cards with an equal number of replacement cards, wherein said replacement cards and said cards which were not discarded together constitute a second card hand of cards;

awarding a fourth payout if said cards in said second card hand of cards meet another predetermined criteria which optionally correspond to said predetermined criteria of step (g).

25. The method of claim 21, in said at least one target characteristic and said at least one card characteristic comprise at least one of a card suit and a card rank.

26. The method of claim 21, wherein said cards each have a rank, and wherein said predetermined order comprises one of an increasing rank order and a decreasing rank order, and wherein said awarding step (e) further comprises the step of awarding said first payout if said dealt cards have been arranged in one of said increasing rank order and said decreasing rank order.

27. The method of claim 21, wherein each of said positions of said card hand is available for receiving a card at commencement of said game, and wherein said arranging step (c) further comprises selecting one available position of said card hand for placement of said dealt card, placing said dealt card into said selected position, and designating said selected position as not being available for receiving said another card.

28. The method of claim 21, wherein said card game is implemented on a server interconnected via a communication network or an Internet to one or more remotely located computing nodes, such that said card game may be played at said remotely located computing nodes.

29. The method of claim 21, wherein said card game may be played substantially simultaneously by a plurality of players, such that said players compete against one another.

30. The method of claim 21, wherein said cards are dealt from one deck of cards comprising fifty-two cards, such that said video card game is played with a single deck of cards.

31. The method of claim 21, wherein said cards are dealt from more than one deck of cards.

32. The method of claim 21, wherein said cards are dealt such that said video card game utilizes at least one deck of cards.

33. The method of claim 21, wherein a single winning hand may be utilized to win multiple payouts.

34. A computer system for playing a card game, said system comprising:

a processor;

a memory storing a computer program controlling operation of said processor, said program including instructions for causing the processor to effect:

(a) dealing a card having at least a rank from at least one deck of cards to a player, for placement into one position of a card hand having a predetermined number of positions;

(b) allowing said player to arrange said dealt card in only one position of said predetermined number of positions in said card hand responsive to an ordered ranking of one of lowest ranking to highest ranking and highest ranking to lowest ranking and responsive to a best play suggestion, and placing said dealt card into said position and designating said position as not available for receiving another card;

(c) repeating steps (a) and (b) in order until all of said predetermined number of positions have been filled with said dealt cards;

(d) awarding a first portion of a payout or a first payout to said player if said dealt cards of said card hand have been arranged in said ordered ranking; and (e) awarding a second portion of said payout or a second payout to said player if said dealt cards of said card hand comprise a predetermined combination of cards resulting in a payable hand as determined according to a winning hand payout schedule.

35. The computer system of claim 34, further comprising an input/output device capable of allowing said player to communicate with said system.

36. The computer system of claim 34, wherein each of said card positions of said hand is available for receiving a card at commencement of said game, and wherein said arranging further comprises selecting, by said player, one available position of said card hand for placement of said dealt card, placing said dealt card into said selected position, and designating said selected position as not being available for receiving said another card.

37. The computer system of claim 34, wherein said card game is implemented on a server interconnected via a communication network or an Internet to one or more remotely located computing nodes, such that said card game may be played at said remotely located computing nodes.

38. The computer system of claim 34, wherein said card game may be played substantially simultaneously by a plurality of players, such that said players compete against one another.

39. The computer system of claim 34, wherein said cards are dealt from one deck of cards comprising fifty-two cards, such that said card game is played with a single deck of cards.

40. The computer system of claim 34, wherein said cards are dealt from more than one deck of cards.

41. The computer system of claim 34, wherein said cards are dealt such that said card game uses at least one deck of cards.

42. The computer system of claim 34, wherein a single winning hand may be utilized to win multiple payouts.

43. A computer system for playing a card game, said system comprising:

a processor;

a memory storing a computer program controlling operation of said processor, said program including instructions for causing the processor to effect:

(a) dealing a card having at least a rank;

(b) allowing said dealt card to be arranged in only one position in a card hand having a predetermined number of available positions responsive to a best play suggestion, and placing said dealt card into said position and designating said position as not available for receiving another card;

(c) repeating steps (a) and (b) in order until said predetermined number of available positions have been filled with said dealt cards; and (d) awarding at least one payout if said dealt cards in said positions have been arranged in at least one predetermined ranking order.

44. The computer system of claim 43, wherein said system comprises a video card gaming machine.

45. The computer system of claim 43, wherein each of said card positions of said hand is available for receiving a card at commencement of said game, and wherein said arranging further comprises selecting one available position of said card hand for placement of said dealt card, placing said dealt card into said selected position, and designating said selected position as not being available for receiving said another card.

46. The computer system of claim 43, wherein said card game is implemented on a server interconnected via a communication network or an Internet to one or more remotely located computing nodes, such that said card game may be played at said remotely located computing nodes.

47. The computer system of claim 43, wherein said card game may be played substantially simultaneously by a plurality of players, such that said players compete against one another.

48. The computer system of claim 43, wherein said cards are dealt from one deck of cards comprising fifty-two cards, such that said card game is played with a single deck of cards.

49. The computer system of claim 43, wherein said cards are dealt from more than one deck of cards.

50. The computer system of claim 43, wherein said cards are dealt such that said card game utilizes at least one deck of cards.

51. The computer system of claim 43, wherein a single winning hand may be utilized to win multiple payouts.

52. A computer system for playing a card game, said system comprising:

a processor;

a memory storing a computer program controlling operation of said processor, said program including instructions for causing the processor to effect:

(a) allowing a target card having at least one target characteristic to be selected;

(b) dealing a card having at least one card characteristic;

(c) allowing said dealt card to be arranged by a player in only one position in a card hand having a predetermined number of available positions responsive to a best play suggestion, and placing said dealt card into said position and designating said position as not available for receiving another card;

(d) repeating steps (b) and (c) in order until said predetermined number of available positions have been filled with said dealt cards;

(e) awarding a first payout if said dealt cards in said positions have been arranged in a predetermined card characteristic order;

(f) awarding a second payout if at least one card characteristic of at least one of said dealt cards matches said at least one target characteristic; and (g) awarding a third payout if said dealt cards in said card hand meet predetermined criteria.

53. The computer system of claim 52, wherein said step (a) comprises selecting a target card having more than one target characteristic and wherein said awarding a second payout comprises awarding a bonus payout if more than one characteristic of at least one of said dealt cards matches said more than one target characteristic of said card.

54. The computer system of claim 52, wherein said processor is further capable of:

(h) utilizing said card hand to play another game.

55. The computer system of claim 52, wherein said another game comprises:

optionally discarding one or more cards of said card hand;

replacing any discarded cards with an equal number of replacement cards, wherein said replacement cards and said cards which were not discarded together constitute a second card hand of cards; and awarding a fourth payout if said cards in said second card hand of cards meet another predetermined criteria which optionally correspond to said predetermined criteria of said step (g).

56. The computer system of claim 52, wherein said system comprises a video card gaming machine.

57. The computer system of claim 52, wherein each of said positions of said card hand is available for receiving a card at commencement of said game, and wherein said arranging either comprises selecting one available position of said card hand for placement of said dealt card, placing said dealt card into said selected position, and designating said selected position as not being available for receiving said another card.

58. The computer system of claim 52, wherein said card game is implemented on a server interconnected via a communication network or an Internet to one or more remotely located computing nodes, such that said card game may be played at said remotely located computing nodes.

59. The computer system of claim 52, wherein said card game may be played substantially simultaneously by a plurality of players, such that said players compete against one another.

60. The computer system of claim 52, wherein said cards are dealt from one deck of cards comprising fifty-two cards, such that said card game is played with a single deck of cards.

61. The computer system of claim 52, wherein said cards are dealt from more than one deck of cards.

62. The computer system of claim 52, wherein said cards are dealt such that said card game utilizes at least one deck of cards.

63. The computer system of claim 52, wherein a single winning hand may be utilized to win multiple payouts.

64. A computer readable medium storing instructions executable by a computer, the instructions instructing the computer to execute a card game, said instructions comprising:

(a) dealing a card having at least a rank from at least one deck of cards to a player, for placement into one position of a card hand having a predetermined number of positions;

(b) arranging, by said player, said dealt card in only one position of said predetermined number of positions in said card hand responsive to an ordered ranking of one of lowest ranking to highest ranking and highest ranking to lowest ranking and responsive to a best play suggestion, and placing said dealt card into said position and designating said position as not available for receiving another card;

(c) repeating steps (a) and (b) in order until all of said predetermined number of positions have been filled with said dealt cards;

(d) awarding a first portion of a payout or a first payout to said player if said dealt cards of said card hand have been arranged in said ordered ranking; and (e) awarding a second portion of said payout or a second payout to said player if said dealt cards of said card hand comprise a predetermined combination of cards resulting in a payable hand as determined according to a winning hand payout schedule.

65. The computer readable medium of claim 64, wherein each of said positions of said card hand is available for receiving a card at commencement of said game, and wherein said arranging further comprises selecting, by said player, one available position of said card hand for placement of said dealt card, placing said dealt card into said selected position, and designating said selected position as not being available for receiving said another card.

66. The computer readable medium of claim 64, wherein said card game is implemented on a server interconnected via a communication network or an Internet to one or more remotely located computing nodes, such that said card game may be played at said remotely located computing nodes.

67. The computer readable medium of claim 64, wherein said card game may be played substantially simultaneously by a plurality of players, such that said players compete against one another.

68. The computer readable medium of claim 64, wherein said cards are dealt from one deck of cards comprising fifty-two cards, such that said card game is played with a single deck of cards.

69. The computer readable medium of claim 64, wherein said cards are dealt from more than one deck of cards.

70. The computer readable medium of claim 64, wherein said cards are dealt such that said card game utilizes at least one deck of cards.

71. The computer readable medium of claim 64, wherein a single winning hand may be utilized to win multiple payouts.

72. A computer readable medium storing instructions executable by a computer, the instructions instructing the computer to execute a card game, said instructions comprising:

(a) dealing a card having at least a rank;

(b) arranging said dealt card in only one position in a card hand having a predetermined number of available positions responsive to a best play suggestion, and placing said dealt card into said position and designating said position as not available for receiving another card;

(c) repeating steps (a) and (b) in order until said predetermined number of available positions have been filled with said dealt cards; and (d) awarding at least one payout if said dealt cards in said positions have been arranged in at least one predetermined ranking order.

73. The computer readable medium of claim 72, wherein each of said positions of said card hand is available for receiving a card at commencement of said game, and wherein said arranging further comprises selecting one available position of said card hand for placement of said dealt card, placing said dealt card into said selected position, and designating said selected position as not being available for receiving said another card.

74. The computer readable medium of claim 72, wherein said card game is implemented on a server interconnected via a communication network or an Internet to one or more remotely located computing nodes, such that said card game may be played at said remotely located computing nodes.

75. The computer readable medium of claim 72, wherein said card game may be played substantially simultaneously by a plurality of players, such that said players compete against one another.

76. The computer readable medium of claim 72, wherein said cards are dealt from one deck of cards comprising fifty-two cards, such that said card game is played with a single deck of cards.

77. The computer readable medium of claim 72, wherein said cards are dealt from more than one deck of cards.

78. The computer readable medium of claim 72, wherein said cards are dealt such that said card game utilizes at least one deck of cards.

79. The computer readable medium of claim 72, wherein a single winning hand may be utilized to win multiple payouts.

80. A computer readable medium storing instructions executable by a computer, the instructions instructing the computer to execute a card game, said instructions comprising:

(a) selecting a target card having at least one target characteristic;

(b) dealing a card having at least one card characteristic;

(c) arranging said dealt card in only one position in a card hand having a predetermined number of available positions responsive to a best play suggestion, and placing said dealt card into said position and designating said position as not available for receiving another card;

(d) repeating steps (b) and (c) in order until said predetermined number of available positions have been filled with said dealt cards including the card dealt in said dealing step (b);

(e) awarding a first payout if said dealt cards in said positions have been arranged in a predetermined card characteristic order;

(f) awarding a second payout if at least one card characteristic of at least one of said dealt cards matches said at least one target characteristic; and (g) awarding a third payout if said dealt cards in said card hand meet predetermined criteria.

81. The computer readable medium of claim 80, wherein said selecting comprises selecting a target card having more than one target characteristic and wherein said awarding a second payout comprises awarding a bonus payout if more than one characteristic of at least one of said dealt cards matches said more than one target characteristic of said target card.

82. The computer readable medium of claim 80, further comprising:

instructions to effect utilizing said card hand to play another game.

83. The computer readable medium of claim 80, wherein said another game comprises:

optionally discarding one or more cards of said card hand;

replacing any discarded cards with an equal number of replacement cards, wherein said replacement cards and said cards which were not discarded together constitute a second card hand of cards; and awarding a fourth payout if said cards in said second hand of cards meet another predetermined criteria which optionally correspond to said predetermined criteria of (g).

84. The computer readable medium of claim 80, wherein each of said positions of said card hand is available for receiving a card at commencement of said game, and wherein said arranging further comprises selecting one available position of said card hand for placement of said dealt card, placing said dealt card into said selected position, and designating said selected position as not being available for receiving said another card.

85. The computer readable medium of claim 80, wherein said card game is implemented on a server interconnected via a communication network or an Internet to one or more remotely located computing nodes, such that said card game may be played at said remotely located computing nodes.

86. The computer readable medium of claim 80, wherein said card game may be played substantially simultaneously by a plurality of players, such that said players compete against one another.

87. The computer readable medium of claim 80, wherein said cards are dealt from one deck of cards comprising fifty-two cards, such that said card game is played with a single deck of cards.

88. The computer readable medium of claim 80, wherein said cards are dealt from more than one deck of cards.

89. The computer readable medium of claim 80, wherein said cards are dealt such that said card game utilizes at least one deck of cards.

90. The computer readable medium of claim 80, wherein a single winning hand may be utilized to win multiple payouts.

91. A system for playing a video card game, said system comprising:

means for dealing a card having at least a rank from at least one deck of cards to a player, for placement into one position of a card hand having a predetermined number of positions;

means for allowing said player to arrange said dealt card in only one position of said predetermined number of positions in said card hand responsive to an ordered ranking of one of lowest ranking to highest ranking and highest ranking to lowest ranking and responsive to a best play suggestion, and placing said dealt card into said position and designating said position as not available for receiving another card;

means for repeating said dealing and said arranging in order until all of said predetermined number of positions have been filled with said dealt cards;

means for awarding a first portion of a payout or a first payout to said player if said dealt cards of said card hand have been arranged in said ordered ranking; and means for awarding a second portion of said payout or a second payout to said player if said dealt cards of said card hand comprise a predetermined combination of cards resulting in a payable hand as determined according to a winning hand payout schedule.

92. A system for playing a video card game, said system comprising:

means for dealing a card having at least a rank;

means for allowing said dealt card to be arranged in only one position in a card hand having a predetermined number of available positions;

means for repeating said dealing and said arranging in order until said predetermined number of available positions have been filled with said dealt cards responsive to a best play suggestion, and placing said dealt card into said position and designating said position as not available for receiving another card; and means for awarding at least one payout if said dealt cards in said positions have been arranged in at least one predetermined ranking order.

93. A system for playing a video card game, said system comprising:

means for allowing a target card having at least one target characteristic to be selected;

means for dealing a card having at least one card characteristic;

means for allowing said dealt card to be arranged in only one position in a card hand having a predetermined number of available positions responsive to a best play suggestion, and placing said dealt card into said position and designating said position as not available for receiving another card;

means for repeating said dealing and said arranging in order until said predetermined number of available positions have been filled with said dealt cards including the dealt card;

means for awarding a first payout if said dealt cards in said positions have been arranged in a predetermined card characteristic order;

means for awarding a second payout if at least one card characteristic of at least one of said dealt cards matches said at least one target characteristic; and means for awarding a third payout if said dealt cards in said card hand meet predetermined criteria.

94. The system of claim 93, further comprising:

means for optionally allowing one or more cards of said card hand to be discarded;

means for replacing any discarded cards with an equal number of replacement cards, wherein said replacement cards and said cards which were not discarded together constitute a second card hand of cards; and means for awarding a fourth payout if said cards in said second card hand of cards meet another predetermined criteria which optionally correspond to said predetermined criteria associated with said third payment.

* * * * *